(12) United States Patent
Sutoh

(10) Patent No.: US 6,678,770 B1
(45) Date of Patent: Jan. 13, 2004

(54) PCI BUS CONTROL SYSTEM HAVING INTELLIGENT DEVICES THAT OWN AND MANAGE NON-INTELLIGENT DEVICES FOR RELAYING INFORMATION FROM NON-INTELLIGENT DEVICES

(75) Inventor: Hideo Sutoh, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/579,173

(22) Filed: May 25, 2000

(30) Foreign Application Priority Data

May 28, 1999 (JP) .......................................... 11-149279

(51) Int. Cl.$^7$ ................................................ G06F 1/10
(52) U.S. Cl. ........................ 710/110; 710/309; 710/310; 710/263
(58) Field of Search ................................ 710/8–10, 14, 710/15, 110, 305, 306, 307, 311, 312, 313–315, 260, 261, 263, 267–268, 309, 310, 308

(56) References Cited

U.S. PATENT DOCUMENTS

| | | | | |
|---|---|---|---|---|
| 5,761,451 A | * | 6/1998 | Abert et al. ................. | 710/113 |
| 5,790,811 A | * | 8/1998 | Hewitt ........................ | 710/115 |
| 5,815,731 A | * | 9/1998 | Doyle et al. ................. | 710/10 |
| 5,838,935 A | * | 11/1998 | Davis et al. ................. | 710/314 |
| 5,842,025 A | * | 11/1998 | Joffe .......................... | 710/241 |
| 5,848,249 A | * | 12/1998 | Garbus et al. ............... | 710/314 |
| 5,901,297 A | * | 5/1999 | Fisch et al. .................. | 710/114 |
| 5,983,024 A | * | 11/1999 | Fye ............................. | 710/36 |
| 6,023,736 A | * | 2/2000 | Lambth et al. ............... | 710/10 |
| 6,041,364 A | * | 3/2000 | Lortz et al. .................. | 709/301 |
| 6,073,198 A | * | 6/2000 | Meyer et al. ............... | 710/110 |
| 6,119,191 A | * | 9/2000 | Neal et al. ................... | 710/307 |
| 6,223,232 B1 | * | 4/2001 | Adusumilli et al. .......... | 710/66 |
| 6,230,216 B1 | * | 5/2001 | Chambers et al. ............ | 710/4 |
| 6,266,770 B1 | * | 7/2001 | Porterfield et al. ............ | 713/1 |
| 6,272,582 B1 | * | 8/2001 | Streitenberger et al. .... | 710/311 |
| 6,324,609 B1 | * | 11/2001 | Davis et al. ................. | 710/119 |
| 6,493,777 B1 | * | 12/2002 | Eby et al. .................... | 710/110 |

* cited by examiner

Primary Examiner—Paul R. Myers
Assistant Examiner—Raymond N Phan
(74) Attorney, Agent, or Firm—Akin, Gump, Strauss, Hauer & Feld, L.L.P.

(57) ABSTRACT

In a peripheral component interconnect (PCI) bus system in which both intelligent and non-intelligent devices are connected to the PCI bus, each non-intelligent device is owned and managed by an intelligent device. The intelligent device owning a non-intelligent device provides access to the service functions of the non-intelligent device, making these service functions available even to other devices not possessing device drivers for the non-intelligent device. Accordingly, the PCI bus master does not have to access all devices connected to the PCI bus.

32 Claims, 53 Drawing Sheets

| DEVICE ID | | MEANING |
|---|---|---|
| HEX | BINARY | |
| AXXX H | 1010 XXXX XXXX XXXX | INTELLIGENT DEVICE SUPPORTING EXTENDED PCI SPECIFICATION |
| 5XXX H | 0101 XXXX XXXX XXXX | NON-INTELLIGENT DEVICE SUPPORTING EXTENDED PCI SPECIFICATION |
| OTHER THAN ABOVE | | DEVICE OR FUNCTION NOT SUPPORTING EXTENDED PCI SPECIFICATION |

X : DON'T-CARE

FIG. 13

| PCI STANDARD COMMANDS: USED DURING OPERATION | | | |
|---|---|---|---|
| COMMAND | CODE | DIREC-TION | DESCRIPTION |
| RECEIVE REQUEST | 00000001H | H→S<br>S→H | USED TO TRASMIT A DATA BLOCK FROM AN UPPER LAYER<br>1ST ARGUMENT: PCI ADDRESS OF DATA<br>2ND ARGUMENT: SIZE OF DATA IN BYTES |
| RECEIVE ACKNOWLEDGE | 00000002H | H→S<br>S→H | ACKNOWLEDGES RECEPTION OF DATA, OR RECEPTION OF A COMMAND NOT REQUIRING A REPLY<br>1ST ARGUMENT: PCI ADDRESS OF LAST BLOCK<br>2ND ARGUMENT: NUMBER OF BLOCKS RECEIVED<br>TIMEOUT: 2 SECONDS |
| NEGATIVE RECEIVE ACKNOWLEDGE | 00000003H | H→S<br>S→H | ACKNOWLEDGES RECEPTION OF DATA, AND REQUESTS RETRANSMISSION OF SAME DATA<br>1ST ARGUMENT: PCI ADDRESS OF FIRST BLOCK THAT COULD NOT BE RECEIVED SUCCESSFULLY<br>2ND ARGUMENT: 0<br>TIMEOUT: 2 SECONDS |

FIG. 14

PCI PERSONAL COMMANDS: USED MAINLY IN INITIALIZATION

| COMMAND | CODE | DIRECTION | DESCRIPTION |
|---|---|---|---|
| RESET REQUEST | 00001000H | H→S | PCI-LEVEL RESET COMMAND; THE DEVICE RECEIVING THIS COMMAND RESETS ITSELF<br>1ST ARGUMENT: 0<br>2ND ARGUMENT: 0 |
| FACTORY RESET REQUEST | 00003000H | H→S | THE DEVICE RECEIVING THIS COMMAND MUST RETURN ITS PCI SETTINGS TO THE SETTINGS MADE AT THE FACTORY<br>1ST ARGUMENT: 0<br>2ND ARGUMENT: 0 |
| DEVICE PROFILE RECEIVE REQUEST | 000000F0H | H→S | USED TO TRANSMIT A DEVICE PROFILE<br>1ST ARGUMENT: PCI ADDRESS OF DATA TO BE TRANSMITTED<br>2ND ARGUMENT: SIZE OF DATA IN BYTES |
| DEVICE PROFILE TRANSMIT REQUEST | 000000F5H | S→H | REQUEST TO PCI BUS MASTER FOR RETRANSMISSION OF A DEVICE PROFILE<br>1ST ARGUMENT: 0<br>2ND ARGUMENT: 0 |

FIG. 41

| FUNCTION NO. | HEX | BINARY | NOTES |
|---|---|---|---|
| 0 | 00000001 H | X000 0000 0000 0000 0000 0000 0000 0001 | PCI BUS MASTER |
| 1 | 00000002 H | X000 0000 0000 0000 0000 0000 0000 0010 | |
| 2 | 00000004 H | X000 0000 0000 0000 0000 0000 0000 0100 | |
| 3 | 00000008 H | X000 0000 0000 0000 0000 0000 0000 1000 | |
| 4 | 00000010 H | X000 0000 0000 0000 0000 0000 0001 0000 | |
| 5 | 00000020 H | X000 0000 0000 0000 0000 0000 0010 0000 | |
| 6 | 00000040 H | X000 0000 0000 0000 0000 0000 0100 0000 | |
| 7 | 00000080 H | X000 0000 0000 0000 0000 0000 1000 0000 | |
| 8 | 00000100 H | X000 0000 0000 0000 0000 0001 0000 0000 | |
| 9 | 00000200 H | X000 0000 0000 0000 0000 0010 0000 0000 | |
| 10 | 00000400 H | X000 0000 0000 0000 0000 0100 0000 0000 | |
| 11 | 00000800 H | X000 0000 0000 0000 0000 1000 0000 0000 | |
| 12 | 00001000 H | X000 0000 0000 0000 0001 0000 0000 0000 | |
| 13 | 00002000 H | X000 0000 0000 0000 0010 0000 0000 0000 | |
| 14~29 | | (OMITTED) | |
| 30 | 40000000 H | X100 0000 0000 0000 0000 0000 0000 0000 | ALSO VALID |
| 31 | | | SET/CLEAR FLAG |

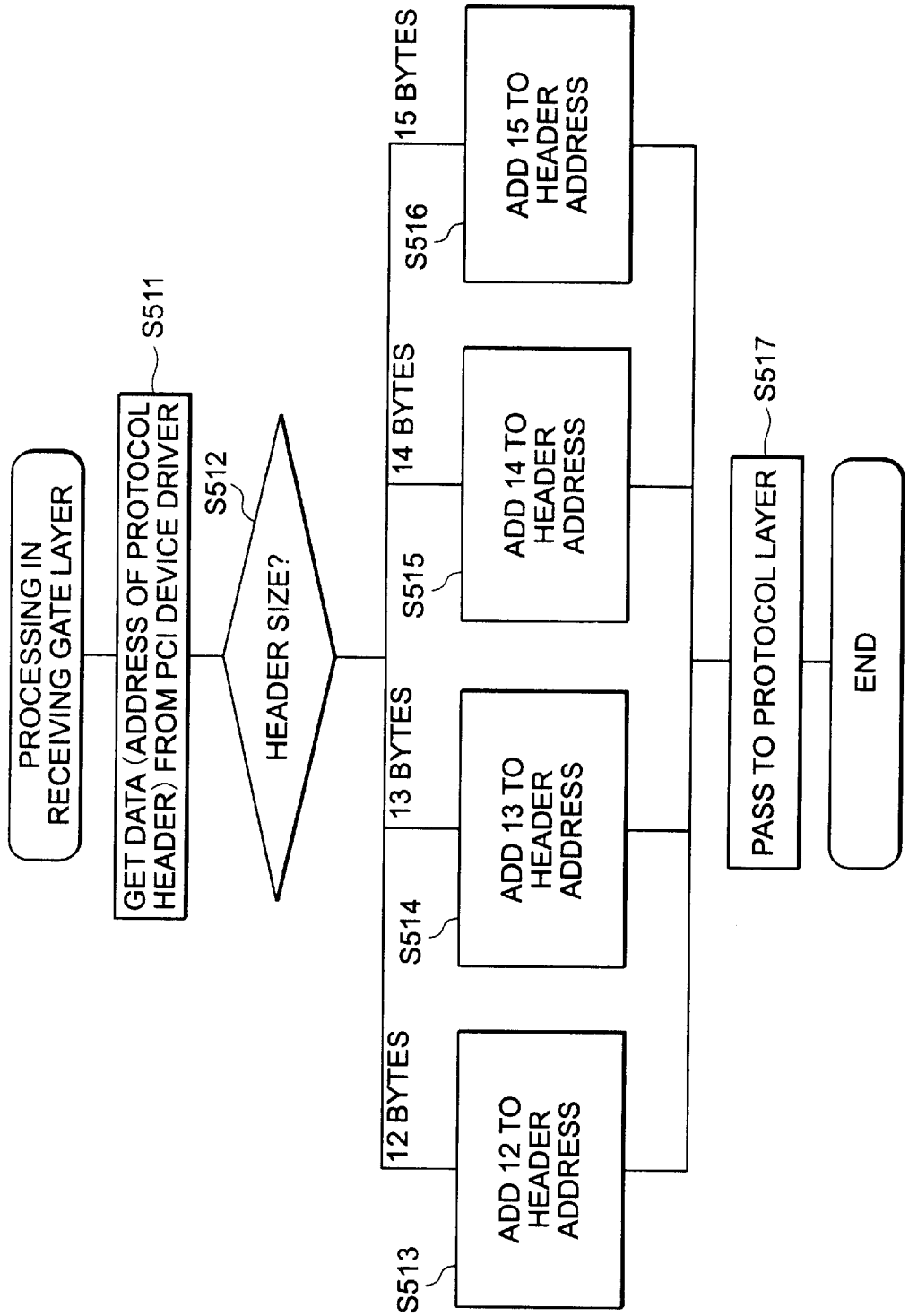

PCI BUS CONTROL SYSTEM HAVING INTELLIGENT DEVICES THAT OWN AND MANAGE NON-INTELLIGENT DEVICES FOR RELAYING INFORMATION FROM NON-INTELLIGENT DEVICES

BACKGROUND OF THE INVENTION

The present invention relates to a control system for the peripheral component interconnect bus, more commonly known as the PCI bus.

The PCI bus is used to connect peripheral devices to a host processor in a computing device such as a personal computer. One feature of the PCI bus is that it requires extensive initialization by software each time the computer is switched on or reset. In a typical personal computer system, the peripheral devices are non-intelligent, and the entire initialization process is carried out by the host processor itself, acting as the PCI bus master. Subsequent communication on the PCI bus is also controlled centrally by the host processor.

A problem with this centralized initialization and control scheme is that since the host processor must access all of the devices connected to the bus, it needs to have drivers for all of these devices. Furthermore, the host processor must sometimes copy data from one device to another even if the data are irrelevant to the host processor itself.

Use of, the PCI bus is not limited to personal computers; it can be used advantageously for interconnecting both embedded and peripheral components in many types of computing systems and other systems, some of which may have a plurality of intelligent devices residing on the same PCI bus. Various further problems arise in these systems, however, including the problem of how to establish communication among a plurality of intelligent devices, how to assign responsibility for managing non-intelligent devices, and how to carry out the initialization process in an orderly manner. The present invention addresses these problems.

SUMMARY OF THE INVENTION

One object of the present invention is to enable services provided by non-intelligent devices to be initialized and managed by intelligent devices;

Another object is to simplify the identification of intelligent and non-intelligent devices;

Another object is to simplify communication with intelligent devices during low-level initialization;

Another object is to simplify communication among intelligent devices during higher-level initialization;

Another object is to facilitate the control of higher-level initialization;

Another object is to facilitate the transmission of data divided into a plurality of blocks;

Another object is to facilitate the processing of transmitted data.

The invented PCI bus control system operates in a PCI bus environment having a PCI bus master and a plurality of connected devices, including both intelligent devices which can initiate PCI bus transactions, and non-intelligent devices which cannot do so. Each non-intelligent device is owned and managed by an intelligent device, which relays access requests from other devices to the non-intelligent device. The services provided by non-intelligent devices can thus be initialized and managed by intelligent devices.

Intelligent and non-intelligent devices are preferably distinguished by a predetermined number of leading bits in a configuration register, provided in each device, that is read during, initialization. Intelligent and non-intelligent devices can thus be easily distinguished.

In the memory address space of the PCI bus system, the area allocated to each intelligent device preferably begins with a predefined communication area, which becomes available for sending commands and requests as soon as the memory address space has been mapped. This simplifies communication between the PCI bus master and the intelligent devices during low-level initialization.

Each intelligent device preferably also has a device control table including device profiles of the device functions of other devices, and has a PCI interrupt request register for receiving interrupt requests from other intelligent devices. For any two intelligent device functions X and Y, the device profile of function Y in the device control table of function X preferably includes a pointer to the PCI interrupt request register of function Y, and a pointer to a mailbox area in the device profile of function X in the device control table of function Y. This arrangement facilitates communication during higher-level initialization. The device control tables are preferably created and distributed by the PCI bus master. The PCI interrupt request register is preferably bit-mapped.

The PCI bus master itself may coordinate the higher-level initialization process, or it may select another device to do so, in which case the PCI bus master operates as a temporary initialization master during the selection of the other device. The selected device becomes a 'device master.' Allowing other devices to become the device master simplifies the control of higher-level initialization.

When a series of data blocks are transmitted from a transmitting device to a receiving device on the PCI bus, by being copied by the receiving device, the data blocks preferably have headers giving the data address and size, each header being linked by a pointer to the header of the next data block in the series. The headers may also indicate whether or not the data blocks must be copied to contiguous areas. These arrangements facilitate the rapid copying of data, and the copying of data from diverse areas into a single continuous area.

The PCI bus control system may have a hierarchical processing structure with an upper layer, an intermediate layer, and a lower layer. When passing data from the upper layer to the lower layer, the intermediate layer attaches its own header to the data. The attached header is preferably padded to align the data on a predetermined type of boundary. This facilitates the processing of the data by a device receiving the data.

BRIEF DESCRIPTION OF THE DRAWINGS

In the attached drawings:

FIGS. 13 and 14 list PCI commands sent and received through the communication area in FIG. 12;

FIG. 41 further illustrates the bit mapping in FIG. 39;

FIG. 55 is a flowchart illustrating the calculation of data addresses passed to an upper layer;

DETAILED DESCRIPTION OF THE INVENTION

Figure 1:
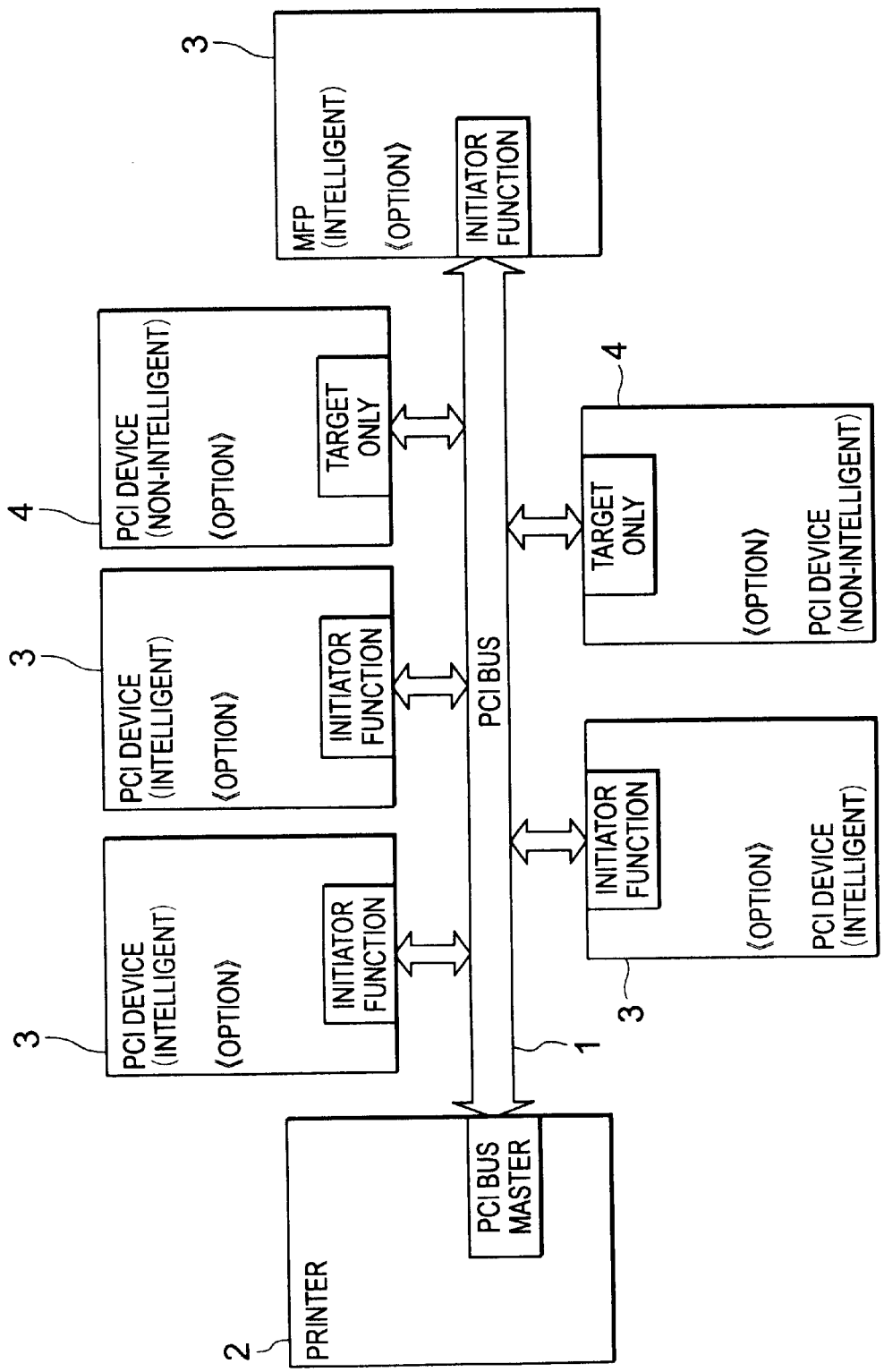
FIG. 1 is a simplified block diagram of a PCI bus system.

Embodiments of the invention will be described with reference to the attached drawings, in which like parts are indicated by like reference characters.

In the following description, a device designed for connection to a PCI bus will be referred to as a PCI device. A PCI device may include a plurality of functions, referred to as its device functions. At least one device connected to the PCI bus must be able to initiate bus cycles, referred to as bus transactions, by driving certain signal lines on the PCI bus.

Any device that initiates a PCI bus transaction is conventionally referred to as a PCI bus master. In the following description, however, the term 'PCI bus master' will be reserved for the device that first takes charge of initialization of the PCI bus system following power-up or a system reset.

A PCI device, other than the PCI bus master, that can initiate PCI bus transactions will be referred to below as an intelligent device. Other PCI devices, which can only become targets of PCI bus transactions, will be referred to as non-intelligent.

The PCI bus system in the first embodiment includes both intelligent and non-intelligent devices. A feature of the first embodiment is that each non-intelligent device is owned and managed by an intelligent device.

Referring to FIG. 1, the PCI bus 1 in the first embodiment interconnects a printer 2, several intelligent devices 3, and several non-intelligent devices 4. The non-intelligent devices 4 are PCI devices. The intelligent devices 3 include PCI devices and a multifunction product (MFP). The printer 2 is the PCI bus master. The other devices 3, 4 may be circuit boards or cards, such as interface boards and adapter cards, that can be installed as options in slots in the printer 2, or various other types of devices that can be connected externally to the printer 2.

Each intelligent device 3 has its own central processing unit (CPU) and software system, possibly including drivers for one or more non-intelligent devices 4. The functions of the intelligent devices 3 include accessing the non-intelligent devices 4, and managing requests from other devices for access to the non-intelligent devices 4. The printer or PCI bus master 2 also has its own CPU and software.

Figure 2:
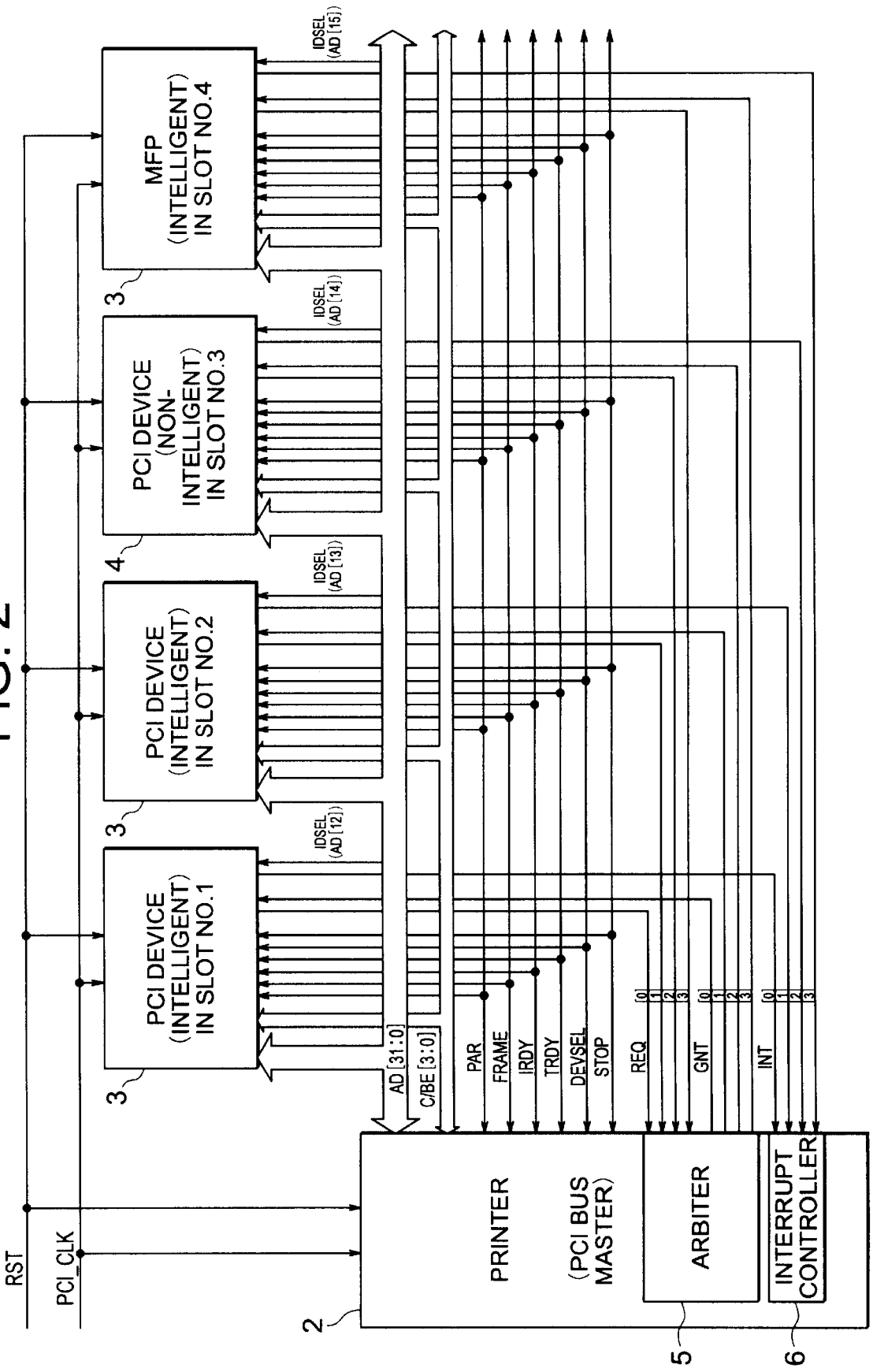
FIG. 2 is a more detailed block diagram of a PCI bus system, showing signal lines.

The PCI bus comprises a plurality of signal lines, which are coupled in parallel to the various interconnected devices 2, 3, 4. For reference, FIG. 2 illustrates the main PCI bus signal lines, and Table 1 briefly describes their functions.

TABLE 1

PCI Bus Signal Lines

| | |
|---|---|
| CLK | 33-megahertz clock signal |
| RST# | Reset signal |
| AD [31:0] | Address and data signals |
| C/BE [3:0] | Command (with address); byte enable (with data) |
| PAR | Even parity bit for AD and C/BE |
| FRAME# | Indicates the beginning of a bus transaction |
| IRDY# | Initiator device ready |
| TRDY# | Target device ready |
| STOP# | Termination request from the target device |
| DEVSEL# | Acknowledgment signal from the target device |
| PERR# | Data parity error |
| SERR# | Fatal system error, or address parity error |
| LOCK# | Locks the target device, preventing other access |
| REQ [3:0] | Request for right to initiate bus transactions |
| GNT [3:0] | Bus grant; reply to REQ |
| INT# [3:0] | Interrupt signal lines |
| IDSEL | Selection signal in configuration transactions |

: active low

Most of the PCI bus signal lines can be driven by any connected device, but there are several exceptions. The clock and reset signals in FIG. 2 are supplied from an external source; the request (REQ) signals are sent from intelligent devices 3 to an arbiter 5 which grants the right to initiate bus transactions to one device at a time; the bus grant signals (GNT) are sent from the arbiter 5 to the intelligent devices 3; the IDSEL signal is sent from the PCI bus master 2 during initialization; and the interrupt signals are sent from intelligent devices 3 to an interrupt controller 6. The arbiter 5 and interrupt controller 6 may be internal components of the PCI bus master 2, as illustrated in FIG. 2.

The IDSEL signal is commonly branched from one of the address/data (AD) signal lines, using a different AD signal line for each device. In FIG. 2, IDSEL is branched from AD[12] for device number one, AD[13] for device number two, and so on. These device numbers are, for example, the slot numbers of slots in which PCI devices can be installed. The IDSEL signal is used to select the target device in a configuration transaction. In particular, IDSEL is used by the PCI bus master 2 in probing the PCI bus to discover what devices are connected to the bus.

The PCI bus system has three address spaces: a memory address space, an input/output (I/O) address space, and a configuration address space. In the address phase of a PCI bus transaction, the command placed on the C/BE signal lines indicates which address space is meant by the address placed on the AD signal lines. The command also indicates whether the bus transaction is a read transaction or a write transaction; that is, whether the target device should send or receive data. In the data phase, which follows the address phase, the C/BE signal lines indicate which of the AD signal lines carry meaningful data. The amount of data transmitted in parallel on these signal lines can range from one byte (eight bits) to four bytes (thirty-two bits).

Figure 3:
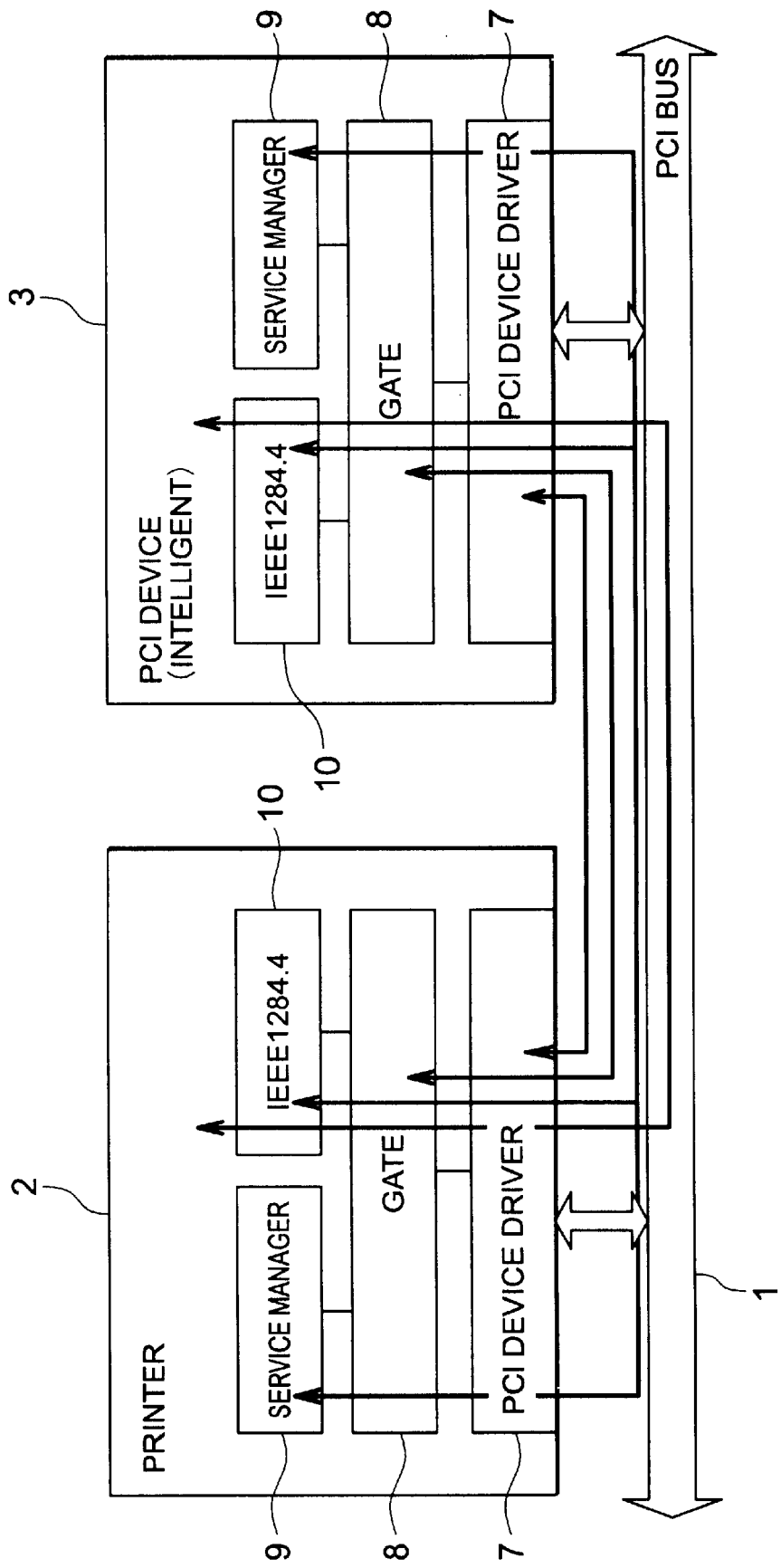
FIG. 3 is a block diagram showing an example of the hierarchical software structure in a PCI bus control system.

The software in the PCI bus control system as a whole has the hierarchical structure shown in FIG. 3. In this structure, PCI device drivers 7 communicate through a gate layer 8 with upper layers such as a service manager 9, an IEEE 1284.4 protocol layer 10, and still higher layers (not visible). IEEE 1284.4, incidentally, is a standard signaling method for a bidirectional peripheral interface for personal computers. A service manager 9 manages a service such as printing. The gate layer 8 in each device provides a single interface through which a plurality of upper layers can communicate with a plurality of device drivers. The PCI device drivers 7 send and receive signals on the PCI bus 1.

In a transaction between the two devices shown in FIG. 3, the different layers in one device communicate with their peer layers in the other device. In an IEEE 1284.4 data transfer, for example, the PCI device driver 7 in the receiving device processes data prepared for transmission by the PCI device driver 7 in the transmitting device. Similarly, the receiving gate layer 8 processes information provided by the transmitting gate layer 8, and the receiving IEEE 1284.4 layer 10 processes information provided by the transmitting IEEE 1284.4 layer 10. Data created in the layer above the transmitting IEEE 1284.4 layer 10 are processed in a corresponding layer above the receiving IEEE 1284.4 layer 10. The data prepared and processed at each level in the hierarchy may include a header pertaining to that layer, and headers pertaining to higher layers, as well as the payload data.

When the devices connected to the PCI bus are initialized initialization proceeds from lower to higher layers in the hierarchy shown in FIG. 3. At the lowest level, standard PCI initialization procedures such as the probing of the PCI bus and the initialization of PCI bus drivers 7 are carried out. This is followed by gate initialization, then by service manager initialization. These processes proceed in the PCI bus master 2 and intelligent devices 3, while the non-intelligent devices 4 await initialization by the intelligent devices 3.

The first embodiment extends the PCI initialization process by allowing the PCI bus master 2 to assign a pre-owner to each non-intelligent device 4. The higher-level initialization processes are also extended to determine final ownership. The extended initialization processes will be described below. Detailed descriptions of the standard initialization processes will be omitted here, but further information about PCI initialization will be given in the second embodiment.

Figure 4:
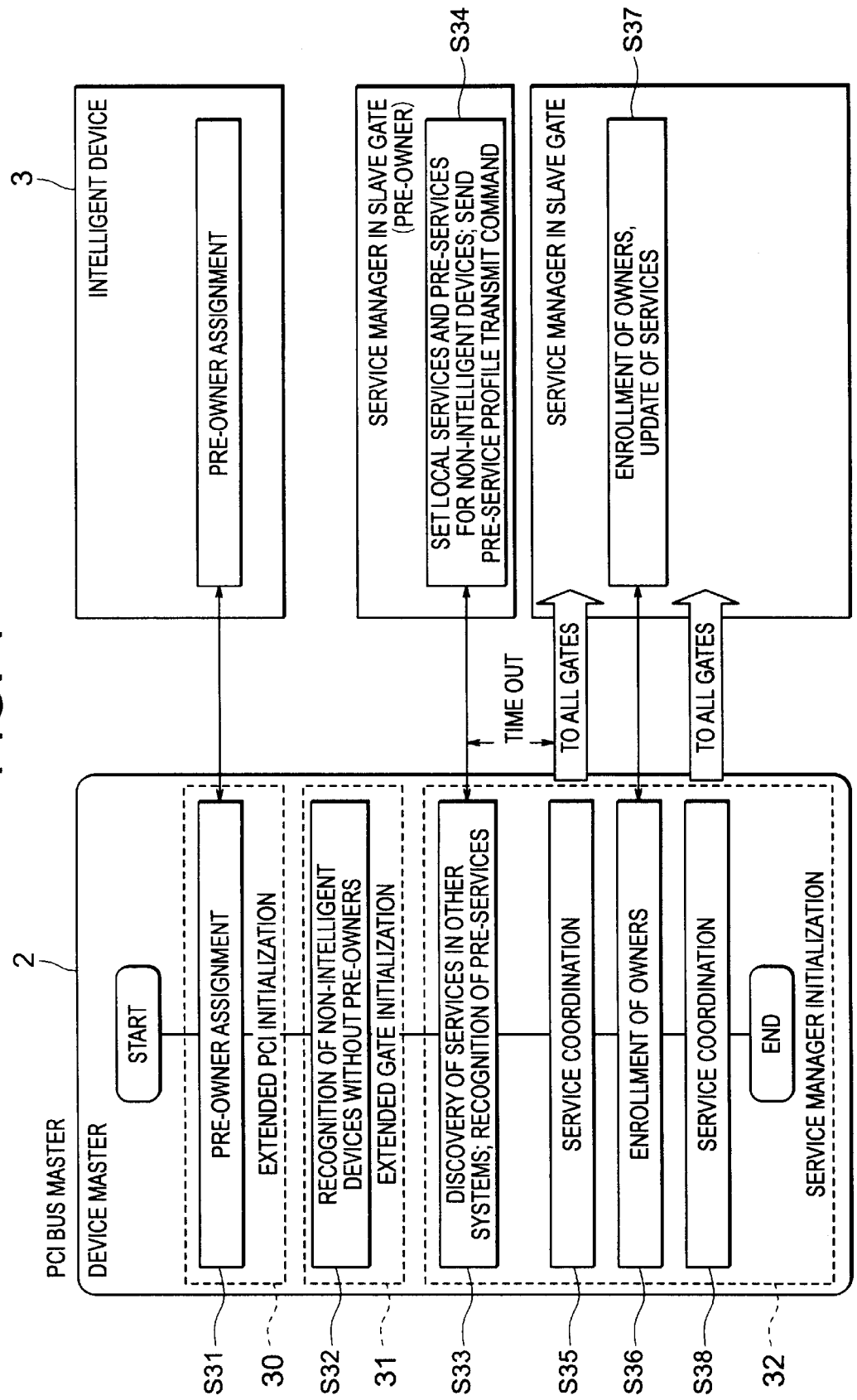
FIG. 4 is a flowchart of a hierarchical initialization process illustrating a first embodiment of the invention.

FIG. 4 illustrates the overall flow of the extended initialization processes. The extended initialization process comprises an extended PCI initialization process 30, an extended gate initialization process 31, and a service-manager initialization process 32.

In the extended PCI initialization process 30, the PCI bus master 2 assigns pre-owners to non-intelligent devices 4 (step S31). The pre-owner of a non-intelligent device 4 is an intelligent device 3 that can access the non-intelligent device 4.

Non-intelligent devices 4 without pre-owners are recognized in the extended gate initialization process 31 (step S32).

The service manager initialization process 32 includes the discovery of services in other systems (step S33). The discovered services may include pre-services ascribed by intelligent devices 3 to non-intelligent devices 4. Information about pre-services is obtained when a service manager in an intelligent device 3 sends a 'pre-service profile transmit' command (step S34). After information about the services present in the system has been obtained, the services are coordinated (step S35), and ownership of the services is assigned by enrolling owners (step S36). The information describing the services may be updated by their new owners (step S37), after which further service coordination is carried out (step S38).

The service manager initialization process 32 is coordinated by a device designated as a device master. The device master in the first embodiment is the PCI bus master 2. The term 'slave gate' appearing in FIG. 4 refers to a gate layer in a device other than the device-master device.

The 'timeout' in FIG. 4 indicates that the device master waits for a certain time after step S33, to give other devices an opportunity to complete step S34, then proceeds to step S35. Timeout notations in subsequent drawings have similar meanings, mention of which may be omitted to avoid needless repetition.

In order for pre-ownership to be assigned, each non-intelligent device 4 residing on the PCI bus needs an intelligent device 3 that can become its pre-owner. The role of a pre-owner is to respond to requests from the PCI bus master 2 for information related to the non-intelligent devices 4 it owns. For example, the pre-owner provides information needed for service manager initialization, which the non-intelligent device 4 cannot provide itself because it lacks the necessary software and communication functions.

Figure 5:
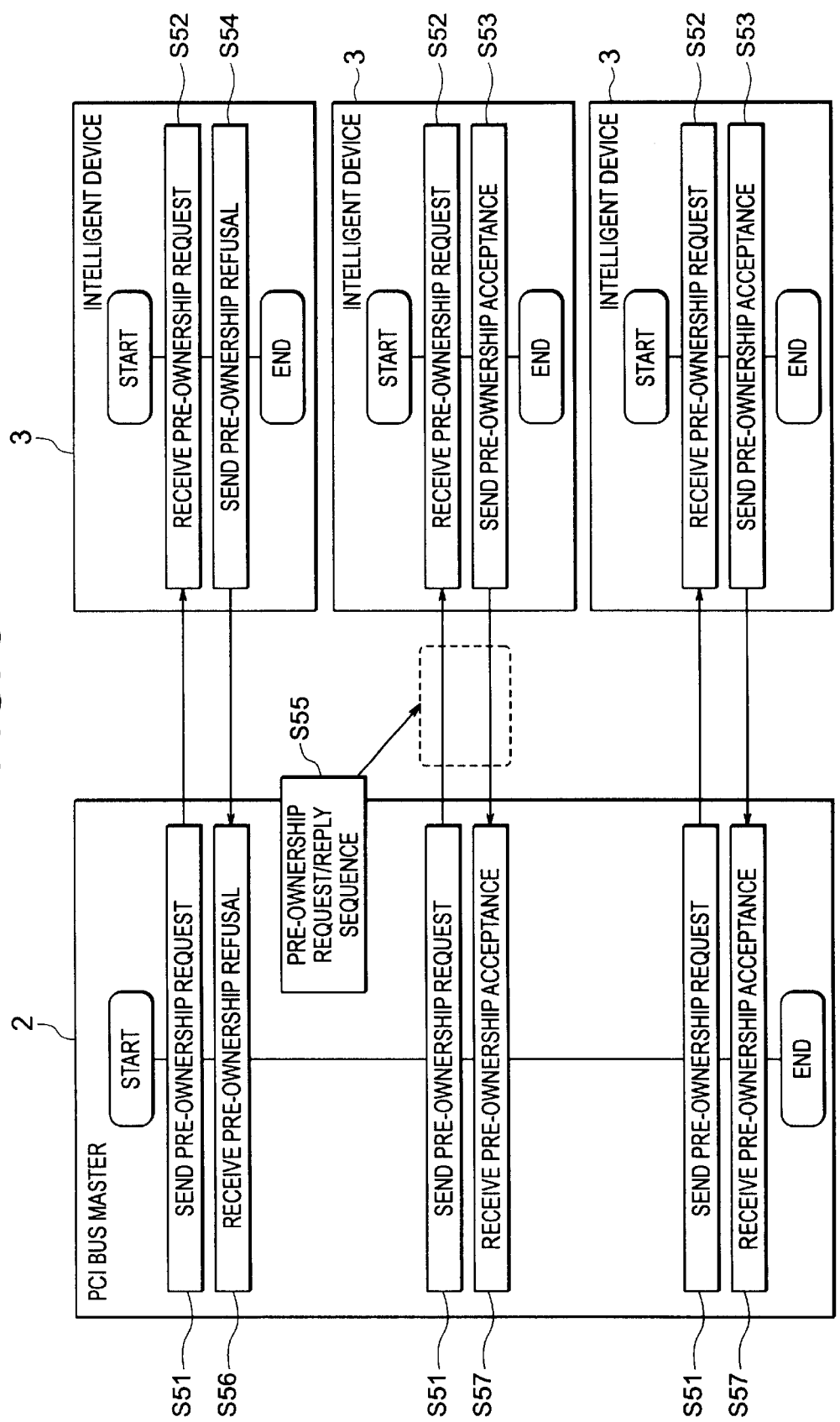
FIG. 5 is a flowchart illustrating the enrollment and reply sequence for pre-ownership of non-intelligent devices.

To determine pre-ownership, the PCI bus master 2 issues a request for pre-ownership of a particular non-intelligent device 4 to all intelligent devices 3 residing on the bus, one after another, as illustrated in FIG. 5. The request for pre-ownership is sent as a command from the PCI bus master 2 (step S51) When an intelligent device 3 receives this command (step S52), it must reply in one of the following ways:
(1) by accepting the request (step S53), if the intelligent device 3 is qualified for pre-ownership; for example, if the intelligent device has a device driver for the non-intelligent device 4; or
(2) by refusing the request (step S54), if the intelligent device 3 is not qualified for pre-ownership.

The transmission of a request for pre-ownership and the transmission of the reply to the request are referred to as the pre-ownership request/reply sequence (S55). Regardless of whether the PCI bus master 2 receives a refusal (step S56) or an acceptance (step S57) of a pre-ownership request, it continues transmitting the same request to other intelligent devices until all intelligent devices 3 have replied to the request.

Figure 6:
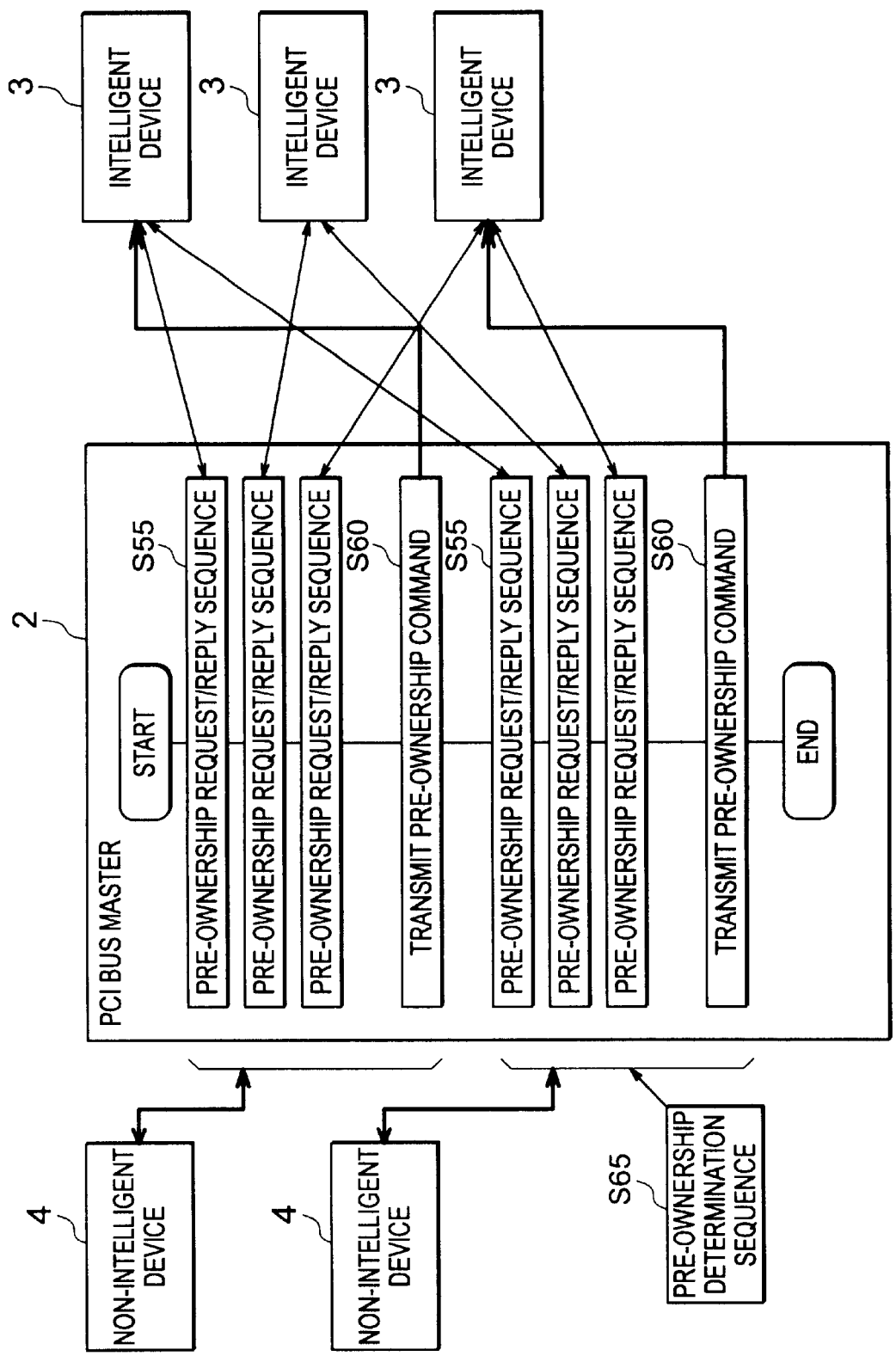
FIG. 6 is a flowchart illustrating the pre-ownership determination sequence.

FIG. 6 illustrates the sequence by which pre-ownership is determined. For each non-intelligent device 4, after the pre-ownership request/reply sequence S55 has been repeated a number of times equal to the number of intelligent devices 3, if any intelligent devices 3 have accepted the ownership request, the PCI bus master 2 selects one of them to be the pre-owner, and sends the selected intelligent device 3 a command informing it that it now 'pre-owns' the non-intelligent device 4 (step S60). This pre-ownership determination sequence S65, comprising multiple pre-ownership request/reply sequences S55 and one pre-ownership command transmission S60, is repeated once for each non-intelligent device 4 residing on the PCI bus.

The intelligent device 3 that receives a pre-ownership command replies by transmitting an acknowledgment (not shown). An intelligent device 3 that has become the pre-owner of a non-intelligent device 4 can accept a request for pre-ownership of another non-intelligent device 4, and may thus become the pre-owner of a plurality of non-intelligent devices 4.

A more detailed description of the extended gate initialization process 31 will be deferred to the tenth embodiment.

The service manager initialization process 32 is coordinated by the device that has become the device master. Normally, as in this embodiment, the device that functions as the PCI bus master 2 during the initialization of PCI device drivers and gates continues as device master during the subsequent initialization processing.

Figure 7:
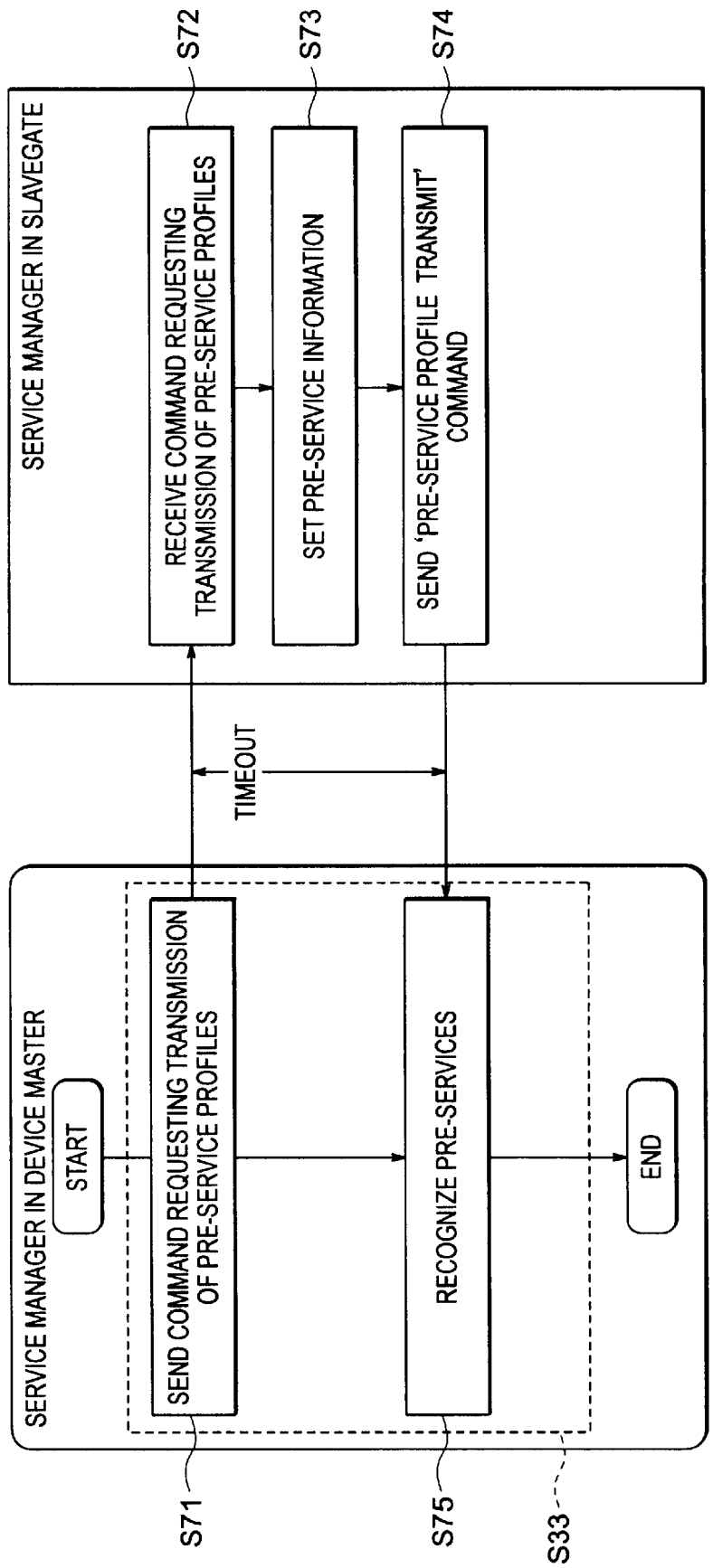
FIG. 7 is a flowchart illustrating service manager initialization in the first embodiment.

FIG. 7 illustrates the process of pre-service recognition in the service manager initialization process.

As noted earlier, the service manager initialization process includes a discovery process S33 in which the device master collects information about the services provided by other systems. In this process, a service manager in the device master sends commands requesting transmission of pre-service profiles to service managers in other devices (step S71). A service profile or pre-service profile contains information indicating the type of services a device provides. When a pre-owner receives this command (step S72), the pre-owner must collect information about the services provided by the non-intelligent devices 4 it owns and set this information in a profile (step S73). The pre-owner does not yet have the right to determine whether and how the services of the non-intelligent devices 4 it pre-owns will ultimately be provided to other devices, so the services reported by the pre-owner to the device master, by sending the 'pre-service profile transmit' command (step S74), are defined as pre-services. The device master receives this command, receives the device profiles, and recognizes the pre-services (step S75).

Figure 8:
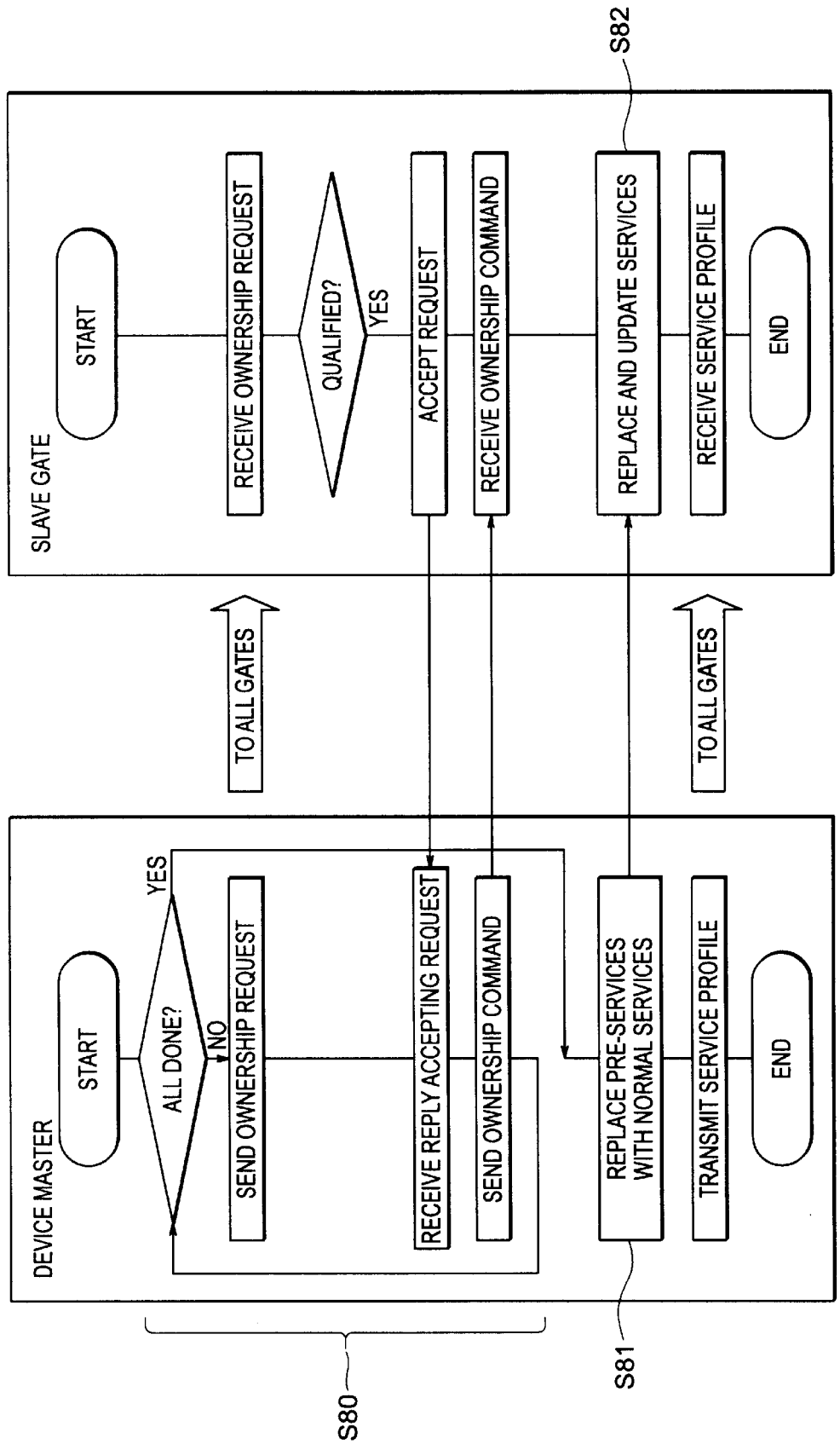
FIG. 8 is a flowchart illustrating service coordination in the first embodiment.

When the device master recognizes the pre-services present in all systems, before converting the pre-services to normal services, it carries out a process that assigns a unique owner to the pre-services. FIG. 8 illustrates this process (step S80). A detailed description will be omitted as it is similar to the process of assigning pre-owners.

When the process of assigning owners to the services in all non-intelligent devices 4 has ended (successfully or unsuccessfully), the device master replaces the pre-service descriptions with normal service descriptions (step S81) and waits for service updates from the new owners. The service managers in other devices make matching replacements and update the services they now own (step S82). When there is a service update from an owner, the device master again updates its service profiles, reorganizes the services, and transmits the resulting service profiles to the other intelligent devices.

The device that takes over ownership of a pre-service in this process is free to submit any of the following responses to the device master.

Response (1): To monopolize a pre-service, the owner performs the 'deletion of service' process, so that the service cannot be accessed via the owner from another process. It must be accessed by a device driver dedicated to the service.

Response (2): To act as the distributor of a shared service, the owner performs a 'change of service' as a new service in the service profile, and allocates the right to use the pre-service to requests from other processes.

Response (3): To act as the access master of a shared service, it performs a 'change of service' as a new service in the service profile, and provides the new service in response to requests from other processes.

In subsequent system operations, requests for a service provided by, a non-intelligent device 4 are channeled through the intelligent device 3 that owns the non-intelligent device 4. Accordingly, only this intelligent device 3 needs to have a device driver for the non-intelligent device 4. The intelligent device 3 can also arbitrate between competing requests and provide other management functions that would conventionally have to be provided by the PCI bus master 2.

In the first embodiment, as described above, an intelligent device 3 is provided as an owner of a non-intelligent device 4 that lacks functions for initiating communication on the PCI bus, so the following effects can be expected.

First, the PCI bus master does not necessarily need to have functions (device drivers) for accessing all connected devices. If a SCSI board is connected through the PCI bus, for example, according to the specifications of this embodiment, the PCI bus master 2 can use the services provided by the SCSI board without having a SCSI driver. Devices other than the PCI bus master, connected to the same PCI bus, can also expect to gain this benefit. Incidentally, SCSI stands for Small Computer Systems Interface.

Second, the processing load on the PCI bus master 2 in PCI communications can be reduced, because much of the communication with non-intelligent devices 4 is handled by the intelligent devices 3.

Next, a second embodiment will be described. The second embodiment modifies the first embodiment by determining whether devices connected to the PCI bus support an extended PCI specification. The extended PCI specification includes extended initialization as described in the first embodiment, and provides communication areas, which will be described in the third embodiment, for the initialization of PCI device drivers.

Figure 9A:
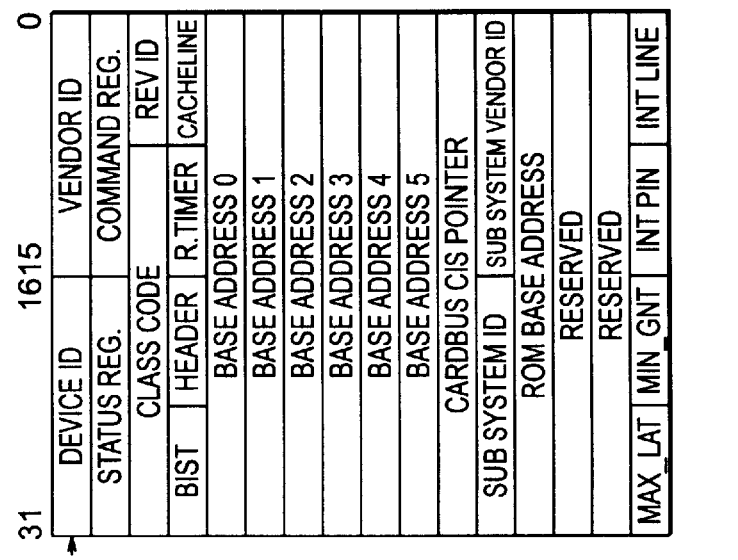
FIG. 9A illustrates the configuration registers of a PCI device.

All PCI devices have a set of configuration registers as illustrated in FIG. 9A. Some of these registers store fixed information provided by the device itself, such as information identifying and classifying the device. Other registers store information written by the PCI bus master during the initialization process, such as the base addresses of PCI memory address areas and I/O address areas that are assigned to the devices. Still other registers have bits that are set and cleared during operation, such as bits indicating error status, or bits enabling and disabling the use of certain functions that the device may perform as a PCI agent. The numbers at the top of FIG. 9A (and similar numbers that will appear in other drawings) are bit numbers.

The PCI configuration registers have a standard layout or normal format that begins with a sixteen-bit register storing a device identifier or device ID. The device ID is selected by the manufacturer or vendor of the device. In the second embodiment, the first four bits of the device ID indicate whether the device supports the extended PCI specification, and if so, whether the device is an intelligent or a non-intelligent device.

Figures 10, 11:
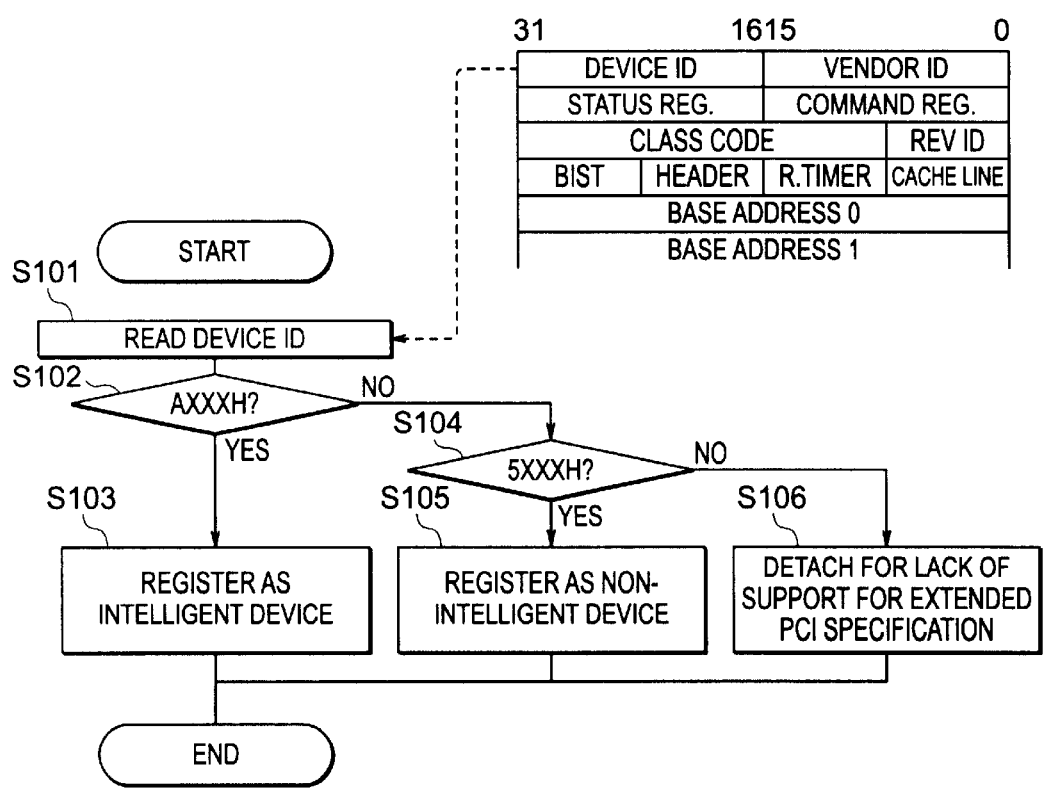
FIG. 10 explains the meaning of the first four bits of the device ID register in the second embodiment.
FIG. 11 illustrates two of the steps in the extended PCI initialization process in the second embodiment.

The device ID in the second embodiment conforms to the specifications shown in FIG. 10. If the value of the first four bits is the hexadecimal (hex) digit AH (binary 1010), the device is an intelligent device supporting the extended PCI specification. If the value is hexadecimal 5H (binary 0101), the device is a non-intelligent device supporting the extended PCI specification. Any other value indicates that the device (or device function) does not support the extended PCI specification. The X's in FIG. 10 indicate don't-care digits or bits, which may have any value.

The vendor ID register in FIG. 9A stores a sixteen-bit code assigned to the manufacturer or vendor of the device by the PCI Special Interest Group (PCI SIG). If all sixteen bits are read as '1' (hexadecimal FFFFH), the manufacturer or vendor is not identified; this means either that no device is installed, or that the device is designated as a target.

The other registers in FIG. 9A conform to the conventional PCI configuration-register format, so detailed descriptions will be omitted, except to note that REG. stands for register, REV for revision, BIST for built-in self test, R. for latency, CIS for card information structure, ROM for read-only memory, MAX_LAT for maximum latency, MIN_GNT for minimum grant, and INT for interrupt.

Figure 9B:
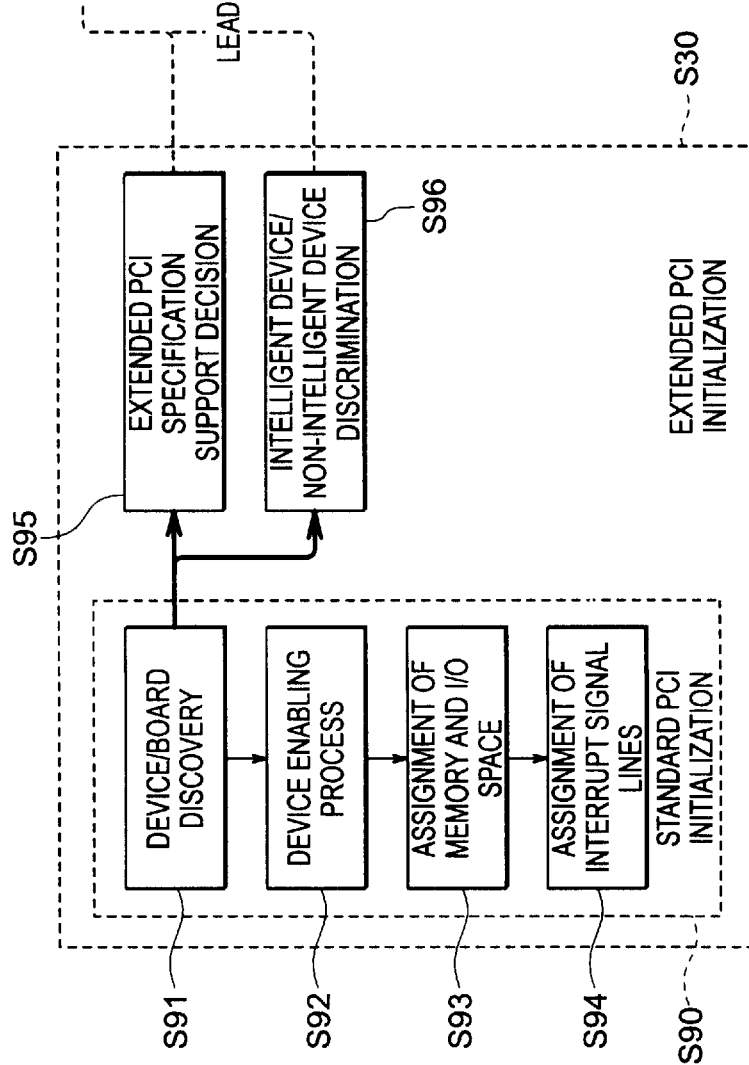
FIG. 9B illustrates an extended PCI initialization process performed in a second embodiment of the invention.

As indicated in FIG. 9B, the PCI initialization process carried out by the PCI bus master 2 in the second embodiment includes a standard PCI initialization process S90, which is carried out within the extended PCI initialization process S30. The standard PCI initialization process includes a device/board discovery step S91, in which the PCI bus master 2 probes the PCI bus by sending signals (IDSEL etc.) that elicit an acknowledging response (DEVSEL#) from each connected device in turn; a device enabling step S92, in which the PCI bus master 2 activates the PCI interface circuit or chip in each device; a memory and I/O space assignment step S93, in which the PCI bus master 2 allocates parts of the PCI address memory space and PCI I/O address space to each device function, and sets corresponding addresses in the base address configuration registers, thereby mapping the PCI memory space and I/O space; and an interrupt assignment step S94, in which the PCI bus master 2 assigns an interrupt signal line to each device.

The extended PCI initialization process includes an extended PCI specification support decision step S95 and an intelligent-device/non-intelligent-device discrimination step S96. These steps S95, S96 are carried out as adjuncts to the device/board discovery step S91. As part of the device/board discovery step S91, the PCI bus master 2 reads the device ID and vendor ID of each device. In the extended PCI initialization steps S95, S96, the PCI bus master 2 examines the first four bits of the device ID to determine whether the device (or board) supports the extended PCI specification, and if so, whether the device (or board) functions as an intelligent device 3 or a non-intelligent device 4.

The flowchart in FIG. 11 illustrates this process in more detail. First, the PCI bus master 2 reads the device ID from the top configuration register in the device or board (step S101), and compares the first four bits of the device ID with hexadecimal AH (step 102). If the first four bits are hexadecimal AH (binary 1010), the device is registered as an intelligent device (step S103).

If the first four bits are not hexadecimal AH, they are compared with hexadecimal 5H (step S104). If the first four bits are hexadecimal 5H (binary 0101), the device is registered as a non-intelligent device (step S105). If the first four bits are not hexadecimal 5H, the device is logically detached, so that it cannot be accessed from the system (step S106), because it does not support the extended PCI specification.

As described above, the second embodiment uses predetermined leading configuration-register bits, which are read when the PCI bus system is first initialized, to indicate whether a device supports the extended PCI specification, and if so, whether it is an intelligent or non-intelligent device. One effect is that intelligent devices can easily be distinguished from non-intelligent devices, even when it is not known in advance which type of device will be connected to the PCI bus. Another effect is that devices can be identified as intelligent or non-intelligent more quickly in this way than by waiting to see whether or not they respond to commands and requests. A third effect is that devices conforming to the extended PCI specification can be identified within the standard PCI initialization process.

Next, a third embodiment will be described. The third embodiment provides communication areas for use in the initialization of device drivers. One communication area is provided in the PCI bus master, and another communication area is provided for each device function in each device. The communication areas are used for communication between the PCI bus master and the device functions during extended PCI initialization.

Figure 12:
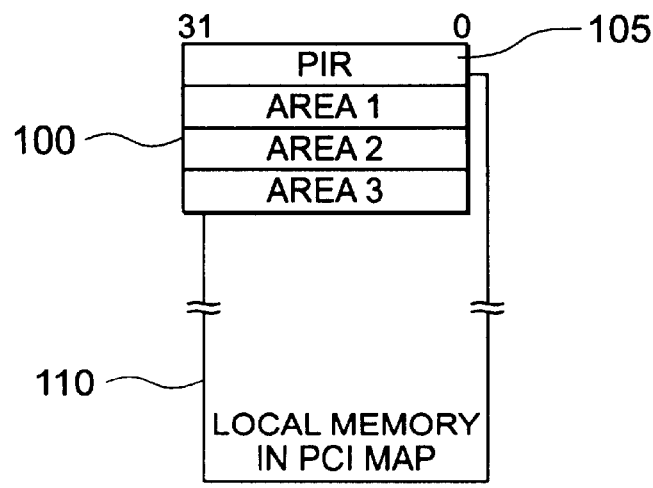
FIG. 12 illustrates a communication area used in a third embodiment.

Referring to FIG. 12, the communication area 100 includes a PCI interrupt request register (PIR) 105 and three general-purpose areas (AREA1, AREA2, AREA3), each thirty-two bits long. The communication area 100 thus has a predetermined size of sixteen bytes. Among the general-purpose areas, AREA1 stores requests and command codes for the device function; AREA2 and AREA3 store command arguments. The PCI interrupt request register 105 is hardwired so as to generate an interrupt in the PCI device or function to which the communication area 100 belongs when any one or more of its constituent bits is set to '1.'

The PCI communication areas 100 are physically located in local memory internal to the devices to which they belong, but they are mapped into the PCI memory address space. The communication area 100 of the PCI bus master 2 has a fixed address (00000000H) at the top of the PCI memory address space. The communication area 100 of each other device function is located at the top of the part 110 of the PCI memory address space mapped to the device function.

FIGS. 13 and 14 list the extended PCI commands considered in the third embodiment. The symbol H→S indicates that the command can be sent from the host device, that is, from the PCI bus master 2, to a slave function in another device. The symbol S→H indicates that the command can be sent from the slave function to the host device. The PCI standard commands listed in FIG. 13 can be transmitted in both directions. The PCI personal commands listed in FIG. 14 can be transmitted in only one direction. The only commands that can be applied to a non-intelligent device 4 are the reset request and factory reset request.

Figure 15:
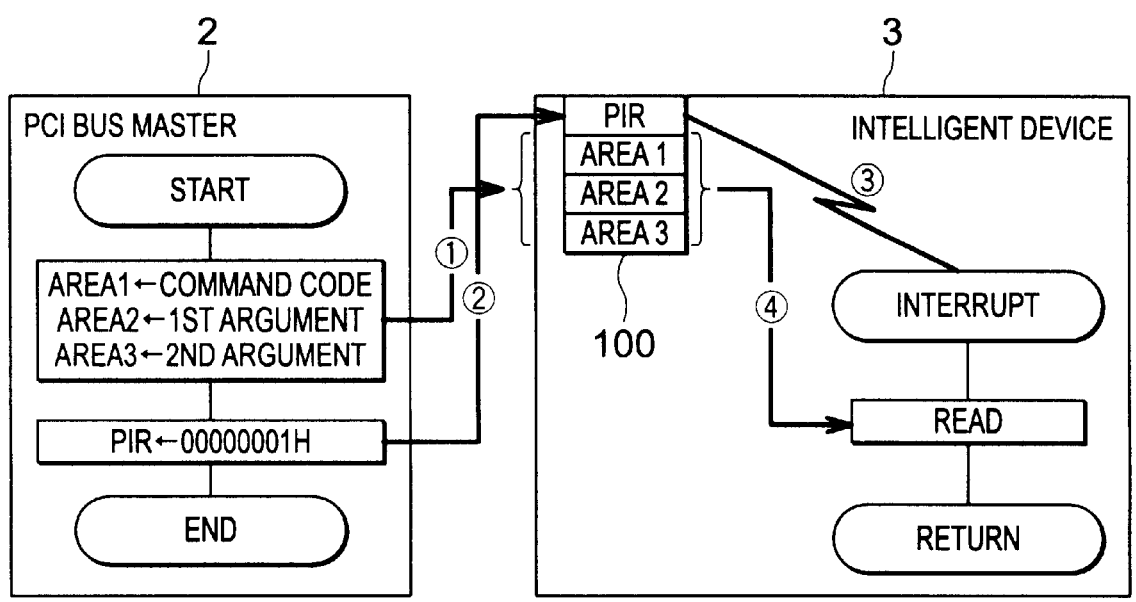
FIG. 15 illustrates the sending of an extended PCI command from the PCI bus master to an intelligent device.

FIG. 15 illustrates the sending of an extended PCI command from the PCI bus master 2 to an intelligent device 3 in the third embodiment. As indicated by the circled numeral one (1), the PCI bus master 2 places the command code in the first area (AREA1) of the communication area 100 of the intelligent device 3, and places the first and second arguments in the other two areas (AREA2 and AREA3). Next (2), the PCI bus master 2 sets a bit in the PCI interrupt request register in the intelligent device 3 by writing a non-zero value such as hexadecimal 1H (00000001H). This generates an interrupt (3) in the intelligent device 3. The interrupt-handling routine reads the command code from AREA1, and reads the arguments from AREA2 and AREA3 of the communication area 100 (4).

After control returns from the interrupt-handling routine, the intelligent device 3 analyzes the command and takes appropriate action. The intelligent device 3 must respond to the command within two seconds, or else the PCI bus master 2 will time out. If a time-out occurs, the command is normally not retransmitted.

Figure 16:
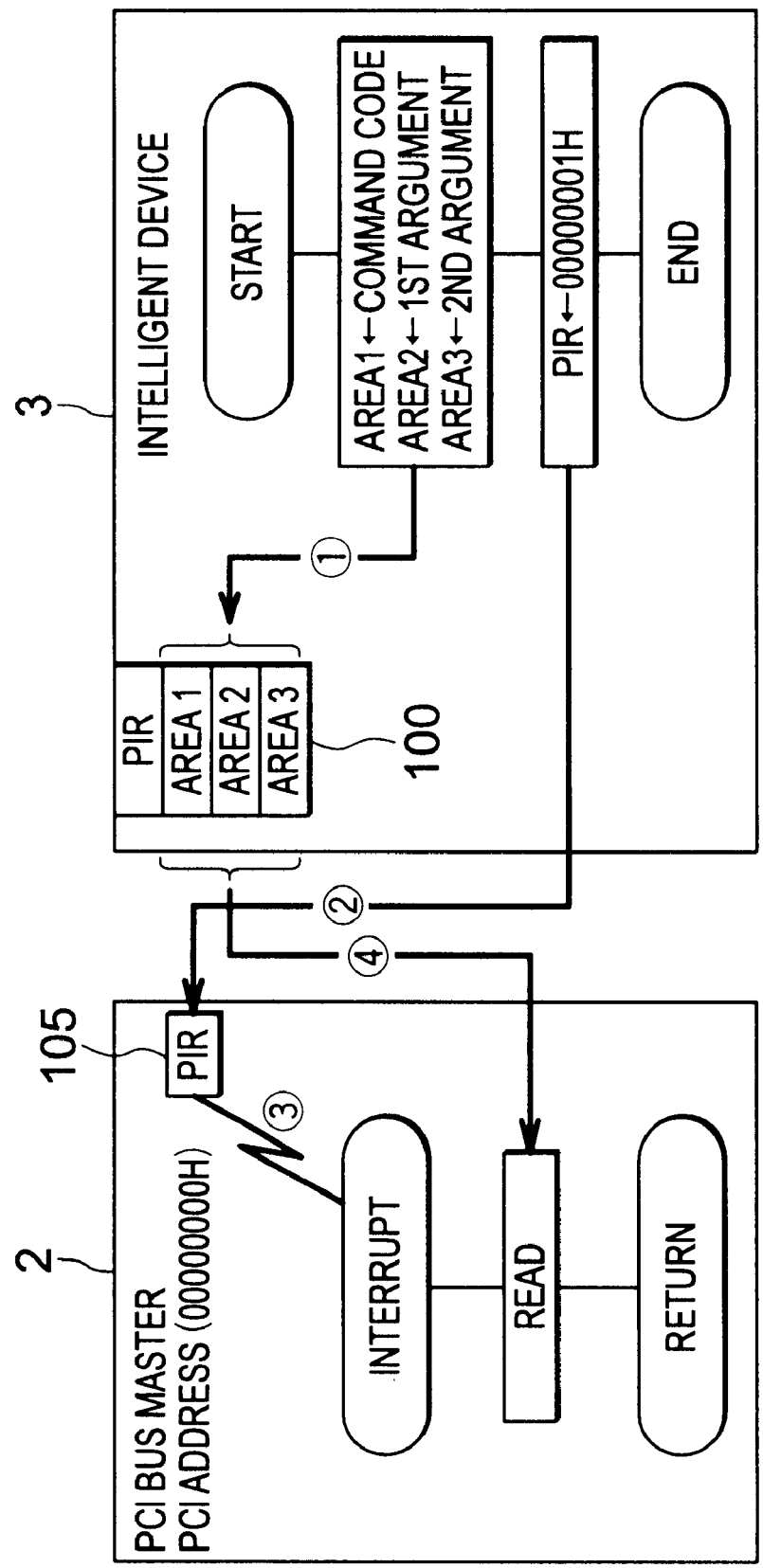
FIG. 16 illustrates the sending of an extended PCI command from an intelligent device to the PCI bus master.

FIG. 16 illustrates the sending of an extended PCI command from an intelligent device 3 to the PCI bus master 2. The intelligent device 3 places the command code and its arguments in AREA1, AREA2, and AREA3 of its own communication area 100 (1), then initiates a bus transaction that writes a non-zero value (such as 00000001H) in the PCI interrupt request register 105 in the PCI bus master 2. This generates an interrupt (3) in the PCI bus master 2. The interrupt-handling routine in the PCI bus master 2 then initiates a bus transaction that reads the communication area 100 in the intelligent device 3 to obtain the command code and arguments (4). If a response is required, the PCI bus master 2 must respond to the command within two seconds to avoid a time-out. If a time-out occurs, normally the intelligent device 3 does not retransmit the command.

A method by which the PCI bus master 2 can identify the device or function that sent the command, and thus know which communication area 100 to read, will be described in the seventh embodiment.

By providing a communication area 100 at the beginning of the memory address area mapped to each device function, as described above, the third embodiment assures that each intelligent device will have at least a small general-purpose area in the PCI memory address space, even if the device makes no other use of this address space (even if the device uses only the I/O address space).

Placing the communication areas at the beginning of the memory area lassigned to each device function simplifies the initialization of these memory areas. That is, since the first sixteen bytes of each device function's PCI memory address space are predefined as a communication area 100, the PCI bus master 2 does not have to perform extra processing to establish a communication area for each device during the initialization stage, which can be shortened accordingly.

There is also an advantage in having a separate communication area 100 for each device function, in that the PCI bus master can initialize each device function independently, and can proceed without having to wait for a response from another device function.

Next, a fourth embodiment will be described. The fourth embodiment provides a continue flag in the PCI header attached to transmitted data.

Figure 17:
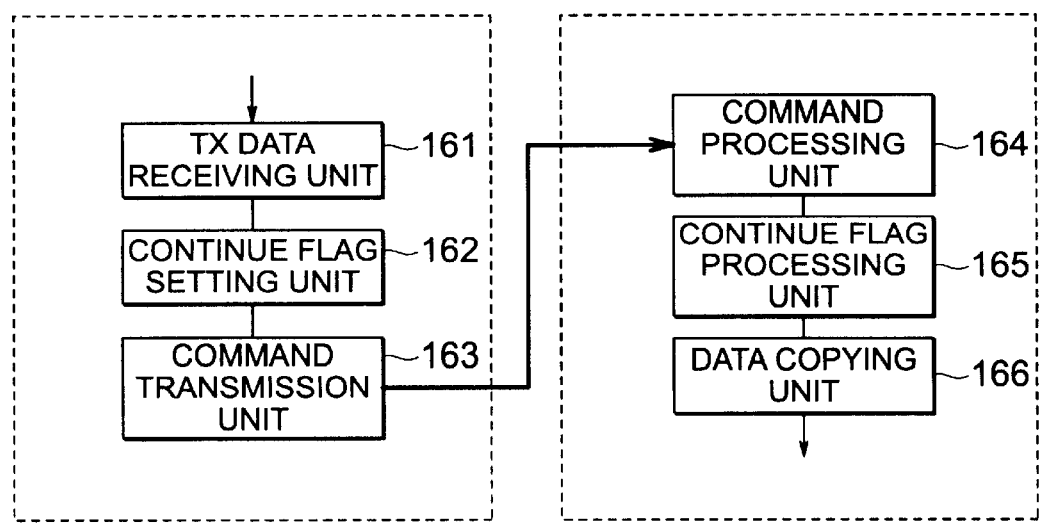
FIG. 17 is a block diagram of data transmitting and receiving software in a fourth embodiment of the invention.

Referring to FIG. 17, the data transmission software in each device includes a transmit (TX) data receiving unit 161 that receives transmit data from an upper layer, a continue flag setting unit 162 that sets and clears the continue flag, and a command transmission unit 163 that transmits commands, for the purpose of transferring data to a device specified by the upper layer. The transmit data receiving unit b161 and command transmission unit 162 are conventional units; the continue flag setting unit 162 is added in this embodiment.

The data receiving software in the receiving device includes a command processing unit 164 that processes the commands sent from the transmitting device, a continue flag processing unit 165 that checks the continue flag, and a data copying unit 166 that copies data for use by an upper layer, as directed by the command processing unit 164 and continue flag processing unit 165. The command processing unit 164 and data copying unit 166 are conventional units; the continue flag processing unit 165 is added in the present embodiment.

Figure 18:
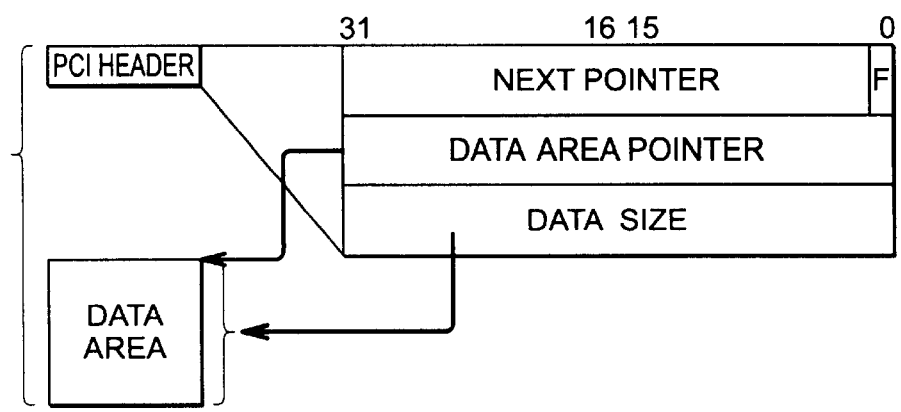
FIG. 18 illustrates the structure of a PCI header in the fourth embodiment.

Referring to FIG. 18, the PCI header comprises a pointer to the next PCI header, referred to as a next pointer, which is used to link PCI headers when a series of data blocks are transmitted. In the present embodiment, the least significant bit of the next pointer is designated as the continue flag F. This flag is set to '1' to indicate that the next data block in the series must be copied to an area contiguous with the area to which current data block is copied. Contiguity is not required when the continue flag is cleared to '0.'

The PCI header also includes a data area pointer indicating the area from which the current data block is to be copied, and a data size field indicating the size of the current data block.

Figure 19:
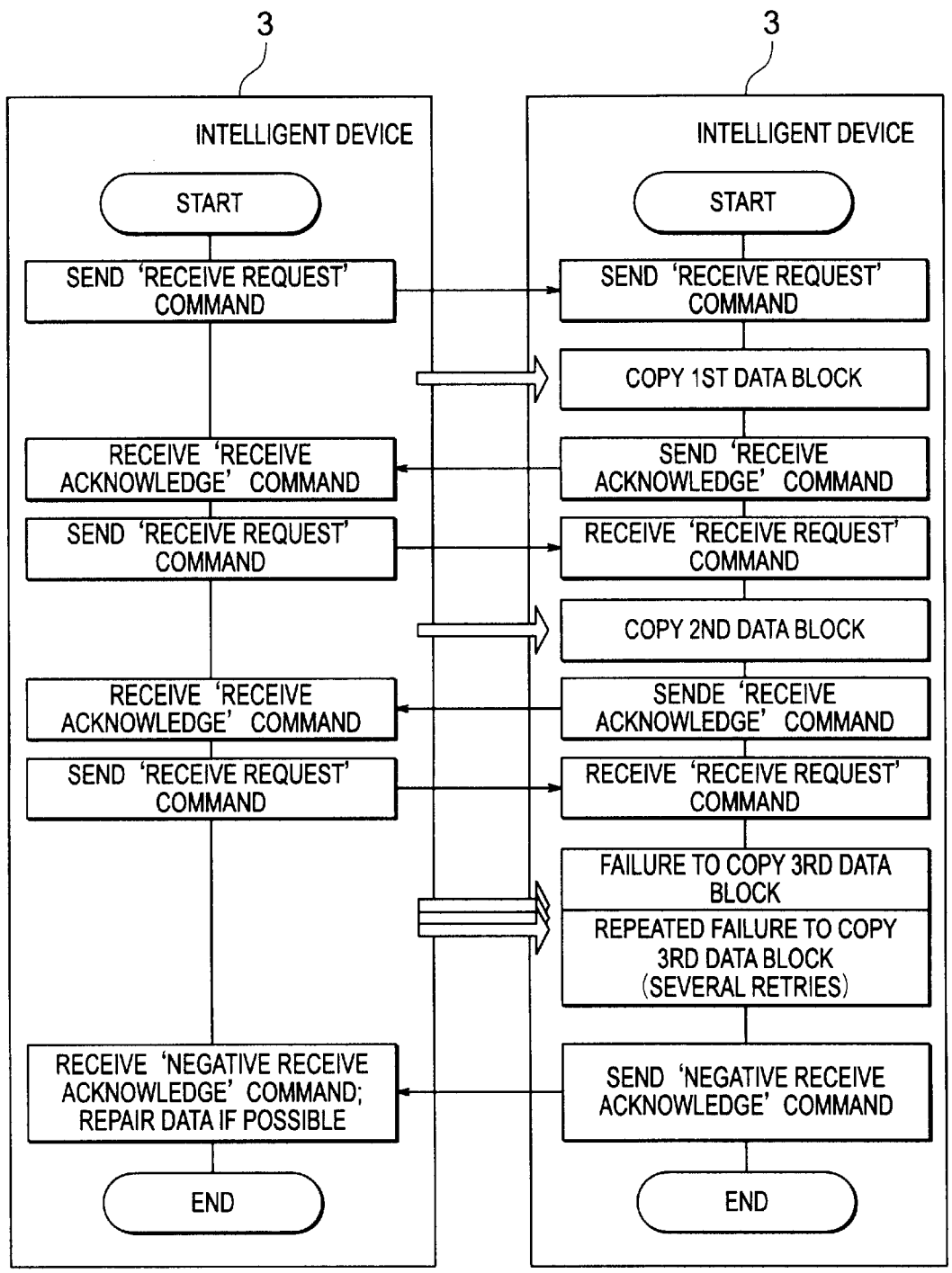
FIG. 19 is a flowchart illustrating the transmission of data from one intelligent device to another.

FIG. 19 illustrates the transmission of data from one intelligent device 3 to another. For each data block, the transmitting device sends a command requesting the receiving device to receive data. The receiving device copies the data block from the address indicated in the PCI header, then transmits an; acknowledgment. If unable to copy the data block, even after several retries, the receiving device transmits a negative acknowledgment. When the transmitting device receives a negative acknowledgment, it attempts to repair the data, if possible.

Figure 20:
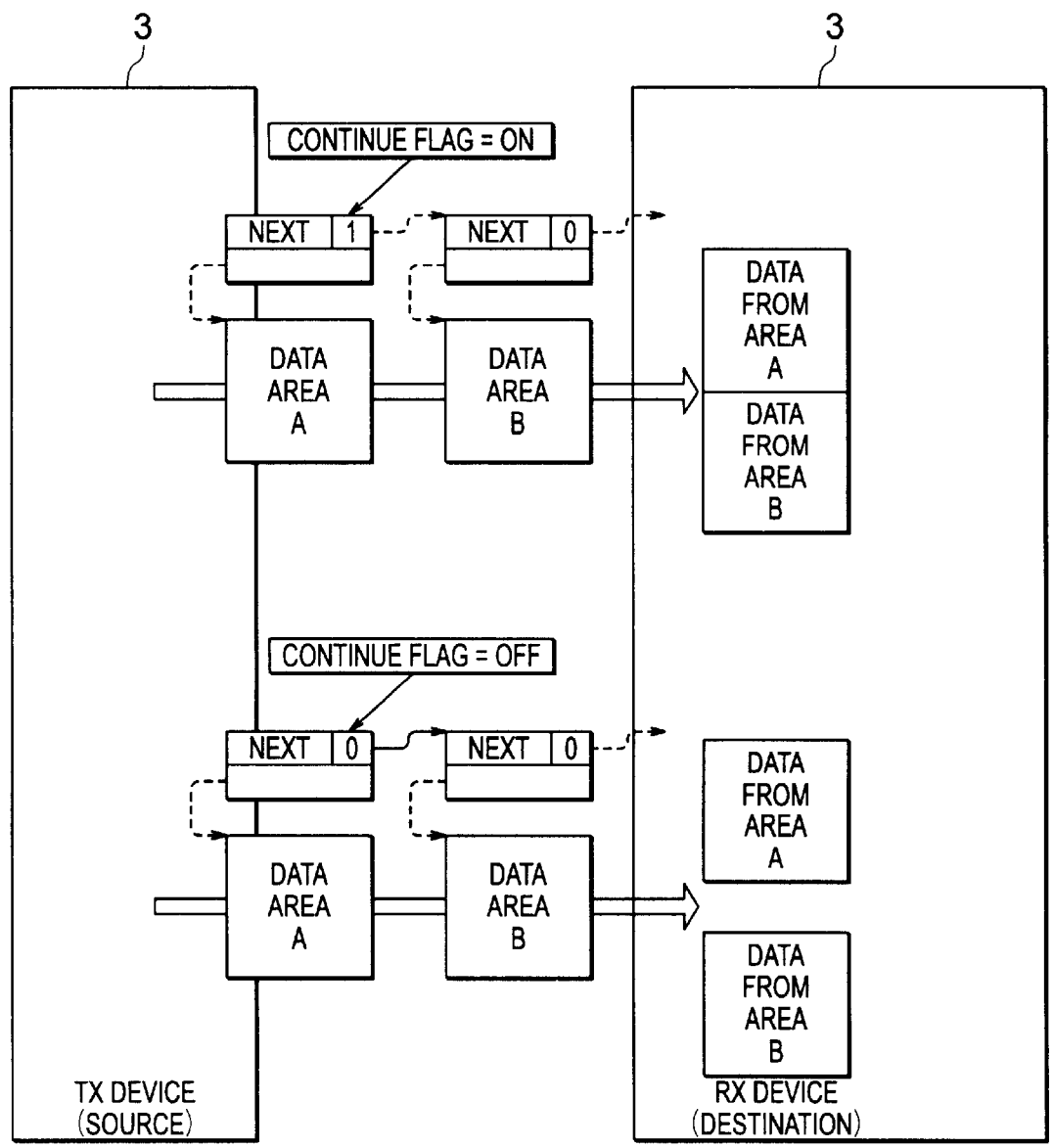
FIG. 20 illustrates the function of the continue flag in the data transmission process.

FIG. 20 illustrates the role of the continue flag F in this process. Two data blocks are transmitted, one from data area A and one from data area B. If the continue flag of the first data block is set to '1' or 'on,' the receiving (RX) device copies the two blocks into contiguous areas. If the continue flag of the first data block is cleared to '0' or 'off,' the receiving device may copy the two data blocks to areas that are not contiguous.

Figure 21:
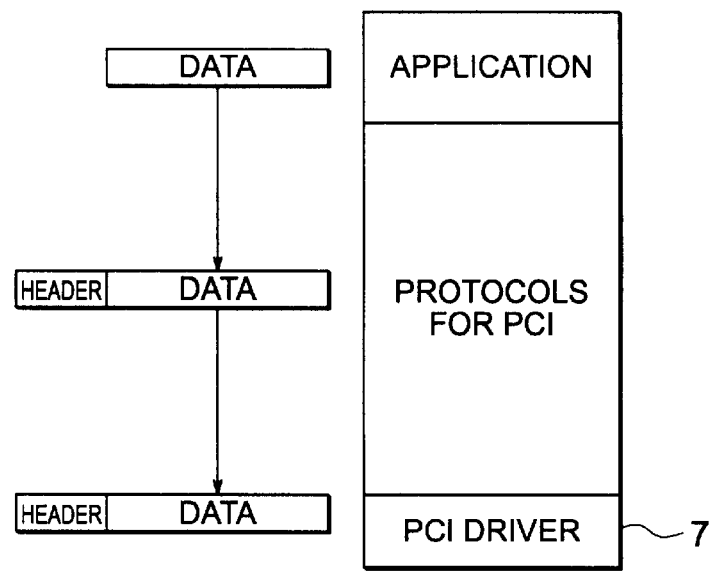
FIG. 21 illustrates the conventional attachment of a protocol header to application data.

The continue flag is particularly useful when the first data block is a protocol header added by a protocol layer above the gate layer in the transmitting device, and the second block is a data block provided by a still higher application layer. Referring to FIG. 21, if the protocol layer attaches its header directly in front of the application data, then the PCI driver 7 can generate a PCI header in which the data area pointer indicates the top of the protocol header, and the data size field indicates the combined size of the protocol header and data. This ensures that the receiving device will place the data immediately after the protocol header.

Figure 22:
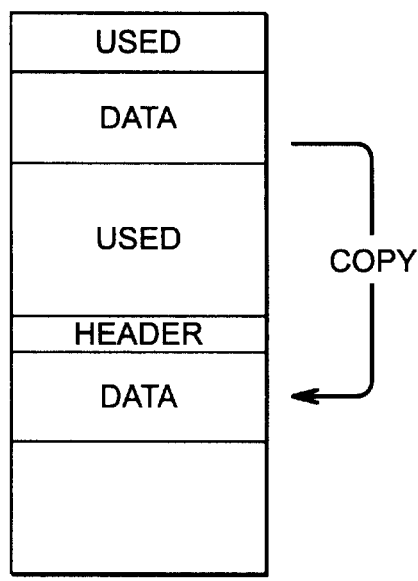
FIG. 22 illustrates the copying of data to enable a protocol header to be attached.

Referring to FIG. 22, however, it may happen that the data blocklprepared by the application layer is one of a series of consecutive data blocks, in which case the memory areas immediately preceding and following the data block are already being used (to store other data blocks in the series). To attach a protocol header in the conventional manner, the protocol layer must copy the data block, as shown in FIG. 22, to a free area in which there is space for both the data block and its protocol header.

In the fourth embodiment, the PCI driver can transmit the protocol header and data as separate blocks. In FIG. 19, the protocol header is stored in data area A, and the data block prepared by the upper layer is stored in (non-contiguous) data area B. By setting the continue flag, the PCI driver can assure that in copying data from these two non-contiguous areas A and B, the receiving device will place the protocol header copied from area A where it belongs, immediately in front of the data copied from area B. Accordingly, it is not necessary for the transmitting device to copy the data to a new location as in FIG. 22.

Much needless copying can be saved in this way. Frequently, there is a limit on the amount of data the protocol layer can transmit at one time, forcing the data prepared by the upper layer to be divided into separate blocks, each with a separate protocol header. If the data must be divided into two separate blocks, for example, the PCI device driver transmits the two data blocks and their protocol headers as four separate blocks A, B, C, D. The next pointers in the PCI headers of blocks A, B, C indicate the addresses of the PCI headers of blocks B, C, D, respectively. The continue flags are set in the PCI headers of blocks A and C, which contain the protocol headers as data. The continue flag of block B, which contains the first half of the upper-level data, may be set or cleared as required. The continue flag of block D, which contains the second half of the upper-level data, is cleared.

Avoiding the need to copy data to new locations merely in order to insert protocol headers is only one effect of the fourth embodiment.

Figure 23:
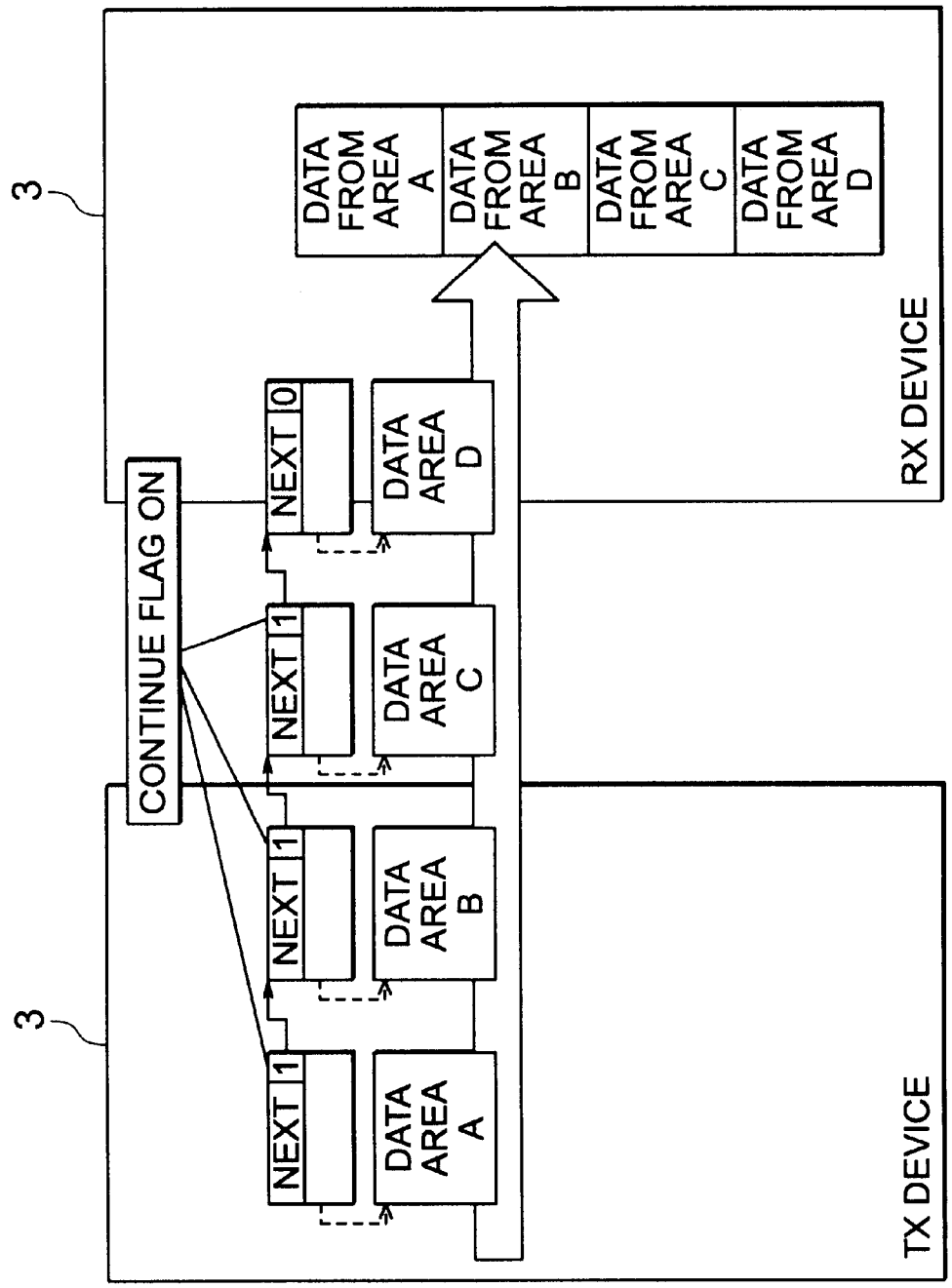
FIG. 23 illustrates the copying of four data blocks in the fourth embodiment.

Another effect is that the transmitting device can transmit an unlimited amount of data, stored in diverse areas, and be sure that the data will be copied into consecutive areas by the receiving device, without first having to assemble the data into a single continuous area. For example, FIG. 23 shows an example in which data from four separate areas A, B, C, D are copied to a single continuous area. The receiving device is then able to process the copied data efficiently, without the need for extra effort (extra copying of data) on the part of the transmitting device.

A further advantage is that by tracing PCI headers having next pointers with the continue flag set, and adding up the data sizes, the receiving device can easily find out how much contiguous free area it will need to copy the data.

Next, a fifth embodiment will be described. The fifth embodiment provides device control tables through which different device functions can communicate according to a single standard procedure. In the fifth embodiment, each device function also has a communication area as described in the third embodiment.

Figure 24:
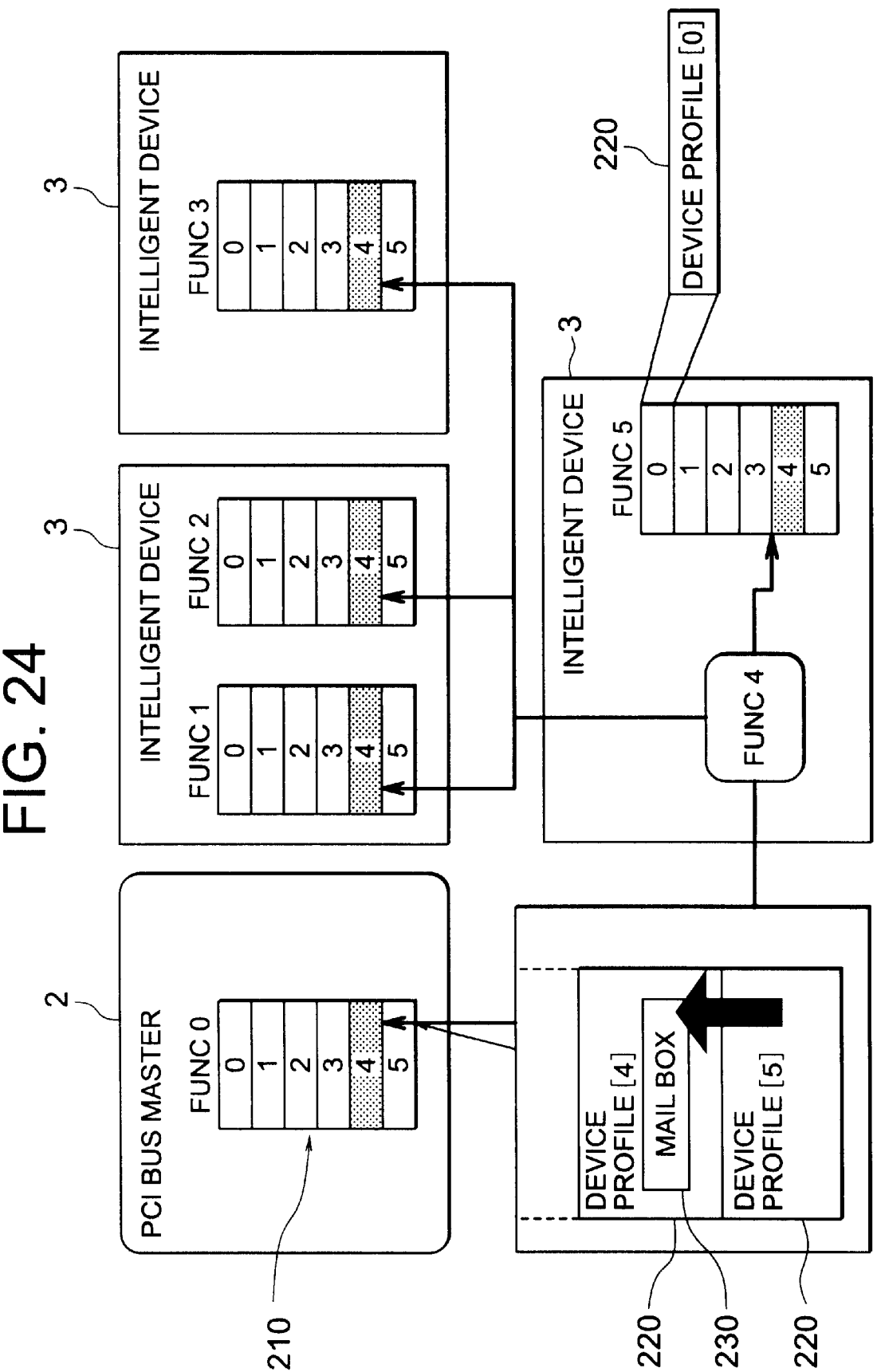
FIG. 24 is a block diagram showing intelligent devices with device control tables in a fifth embodiment.

Referring to FIG. 24, a device control table 210 is an array of device profiles 220, comprising one profile for each device or device function in the PCI bus system. In FIG. 24 the PCI bus (not visible) interconnects the PCI bus master 2 and three intelligent devices 3, which have a total of six intelligent functions, each with a separate device control table. The six intelligent device functions, and their control tables, are identified as FUNC0 to FUNC5. Each device function has a device profile 220 in each of the six device control tables 210. Hatching is used to indicate the device profile of device function FUNC4 in the device control tables 210 of the other five functions. Each of the hatched device profiles includes a mailbox 230 in which the corresponding device function can receive commands from FUNC4.

Non-intelligent devices and functions have been omitted to simplify the drawing. FUNCX will also be indicated as FUNC(X) or FUNCTION(X) in subsequent drawings (X=0 to 5).

Figure 25:
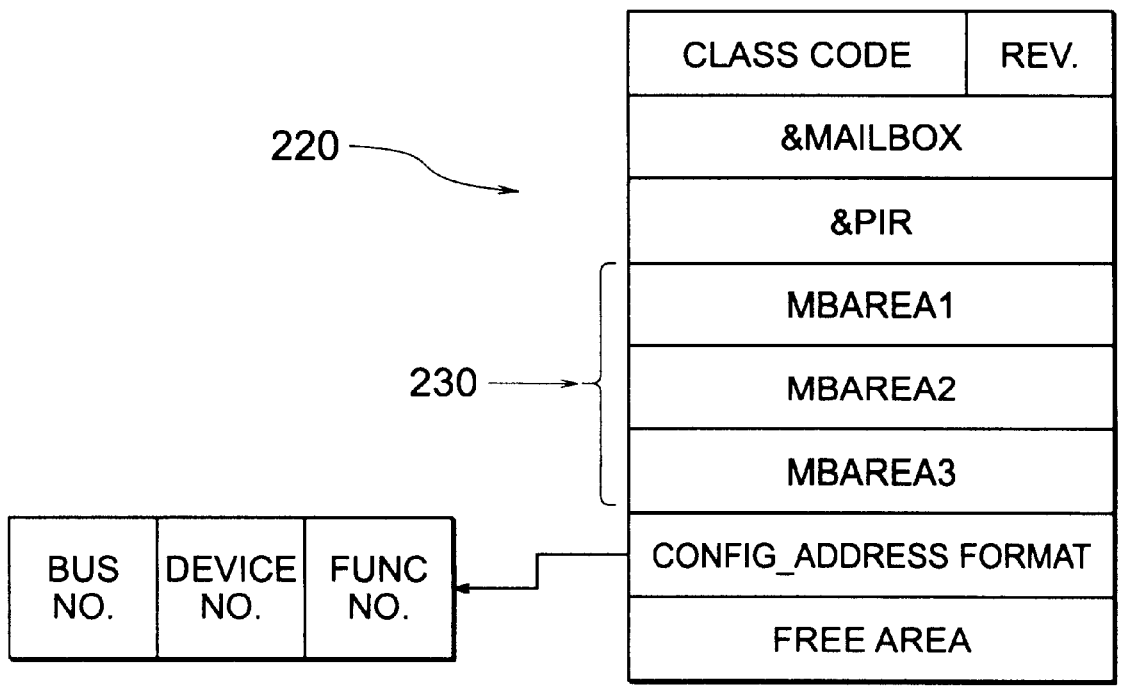
FIG. 25 illustrates the structure of a device profile in a device control table.

FIG. 25 shows the detailed structure of a device profile 220. The class code of the device function and the revision number (REV.) of the device profile are followed by a mailbox pointer (&MAILBOX) and a PCI interrupt request register pointer (&PIR), then by a mailbox 230 comprising three areas (MBAREA1, MBAREA2, MBAREA3). The mailbox 230 is followed by an area formatted as a configuration address area (including the bus number, device number, and function number of the device function), and a free area used as a work area by device drivers.

Figure 26:
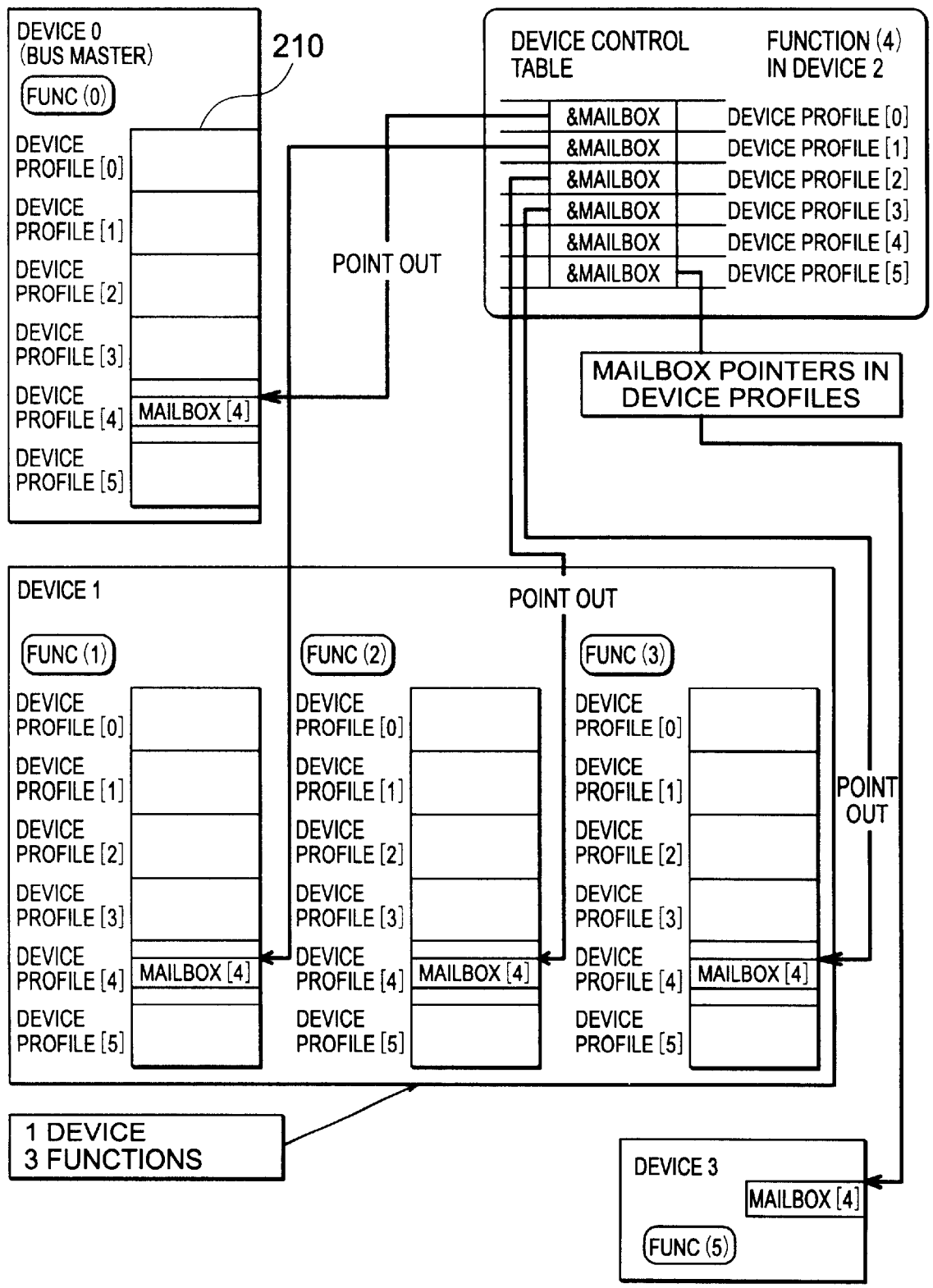
FIG. 26 illustrates mailbox pointer relationships in the device control tables.

The mailbox pointers are arranged as shown in FIG. 26. For reasons of space, FUNC(1), FUNC(2), and FUNC(3) are now shown disposed in one intelligent device (device 1), FUNC(4) in another intelligent device (device 2, not visible), and FUNC(5) in a third intelligent device (device 3).

In the device control table of FUNC(4), for example, the mailbox pointer in the device profile of FUNC(0) (device profile[0]) points to the mailbox in the device profile of FUNC(4) in the device control table 210 of FUNC(0). Similarly, the mailbox pointer in the device profile of FUNC(Y) (device profile[Y]) points to the mailbox in the device profile of FUNC(4) in the device control table of FUNC(Y) for other values of Y (Y=1, 2, 3, 5). Thus all of the mailbox pointers in FUNC(4)'s device control table point out to other devices.

More generally, in the device control table of any device function X, the mailbox pointer in the device profile of device function Y indicates the address of the mailbox in the device profile of device function X in the device control table of device function Y, where X and Y take on values from zero to five.

A non-intelligent device 4 does not have a PCI interrupt request register or mailboxes, so in the device profile of a non-intelligent device, the mailbox pointer and the PCI interrupt request register pointer are both set to minus one (&MAILBOX=-1, &PIR=-1).

Figure 27:
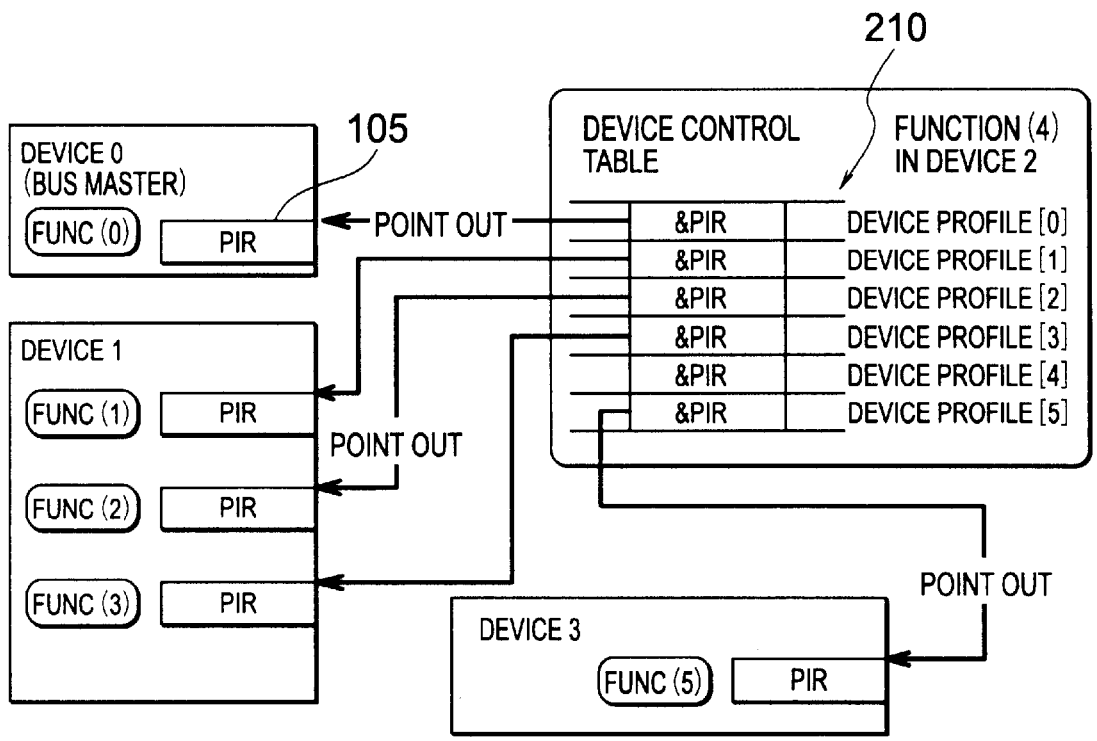
FIG. 27 illustrates PCI interrupt request register pointer relationships.

The PCI interrupt request register pointers are arranged as shown in FIG. 27. In the device control table 210 of device function(4), for example, the PCI interrupt request register pointer in the device profile of device function(0) or FUNC (0) indicates the address of the PCI interrupt request register (PIR) 105 in the communication area of FUNC (0). Similarly, the PCI interrupt request register pointer in the device profile of function FUNC(Y) indicates the address of the PCI interrupt request register in the communication area of FUNC(Y) for other values of Y (Y=1, 2, 3, 5).

More generally, in the device control table of any device function X, the PCI interrupt request register pointer in the device profile of any device function Y indicates the address of the PCI interrupt request register in the communication area of device function Y, where X and Y take on values from zero to five.

Figure 28:
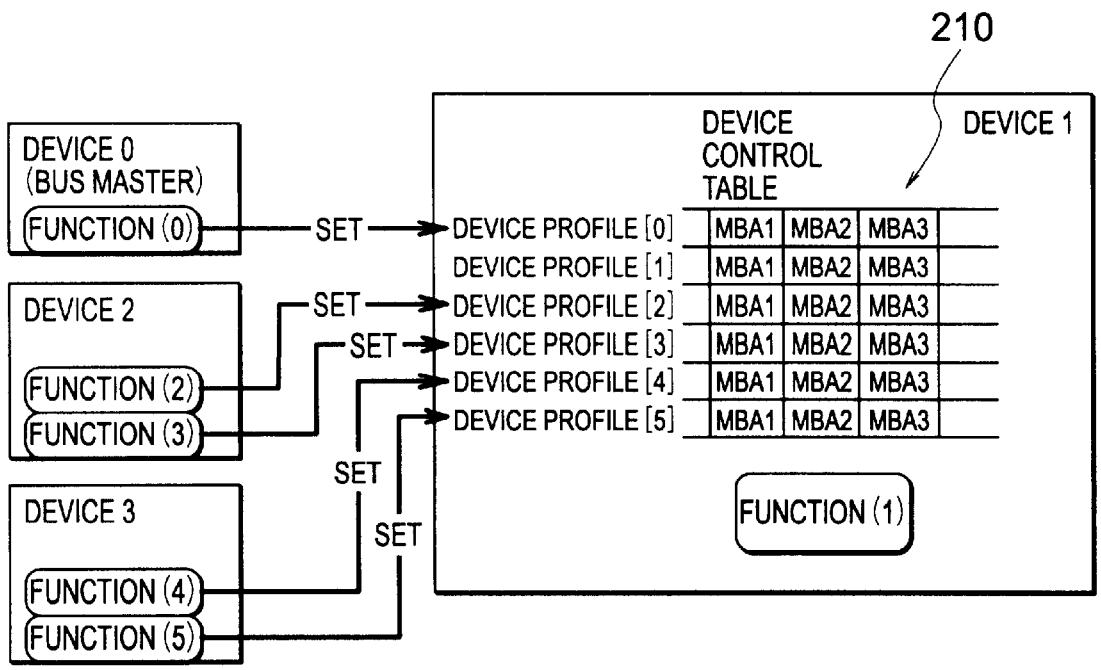
FIG. 28 illustrates the use of mailboxes to send commands to a device function.

Referring to FIG. 28, when function(0) in the PCI bus master (device 0) issues a command to function(1) in device 1, it sets the command code and command arguments in the mailbox of its own device profile in the device control table 210 of function(1). Mailbox areas MBAREA1, MBAREA2, MBAREA3 are indicated as MBA1, MBA2, MBA3 in FIG. 28. Similarly, function(X) (X=2 to 5) uses the mailbox in its device profile in the device control table of function(1) to send commands to function(1).

Figure 29:
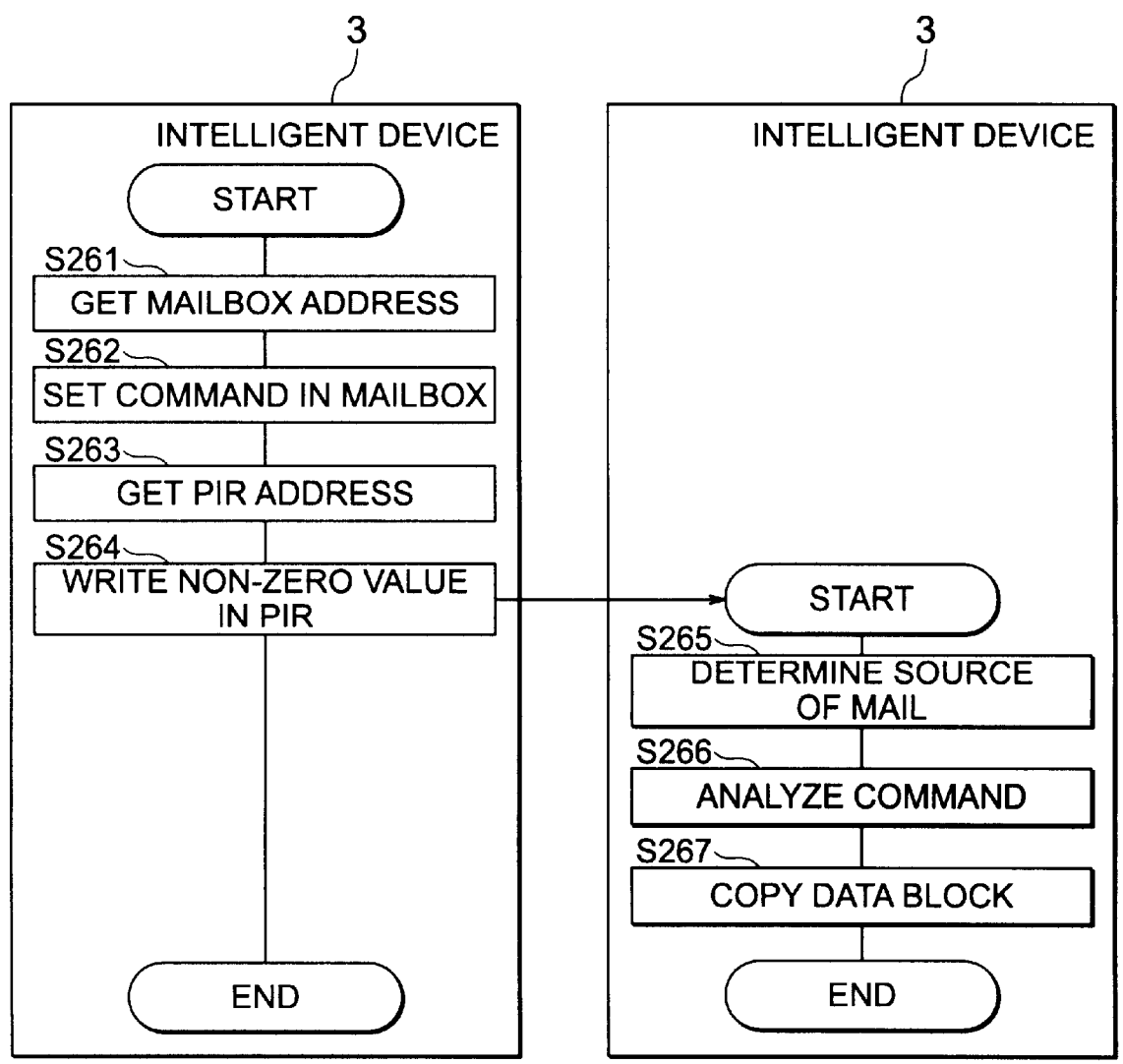
FIG. 29 is a flowchart illustrating the transmitting and receiving of a command in the fifth embodiment.

FIG. 29 illustrates the standard procedure for transmitting and receiving a command in the fifth embodiment. The transmitting device function first looks up the address of its mailbox in the receiving device function's device control table, by checking the corresponding mailbox pointer in its own device control table (step S261). Next, the transmitting device function sets the command in area MBAREA1 and the command arguments in areas MBAREA2 and MBAREA3 in its own mailbox in the receiving device function's device control table (step S262), thereby sending mail to the receiving device function. The transmitting device function then looks up the address of the PCI interrupt request register located in the receiving device function's communication area (step S263) and sets a non-zero value in the PCI interrupt request register of the receiving device function (step S264).

The receiving device function, alerted by the interrupt, now determines the source of the received mail (step S265). The normal way to do this is to check the mailboxes in its device control table one by one, starting from the device profile of function(0); another method will be shown in the seventh embodiment. After finding the mail, the receiving device function analyzes the command (step S266). If the command was a request to receive data, the receiving device function copies a data block (step S267) of the size indicated in MBAREA3, starting from the address indicated in MBAREA2.

Figure 30:
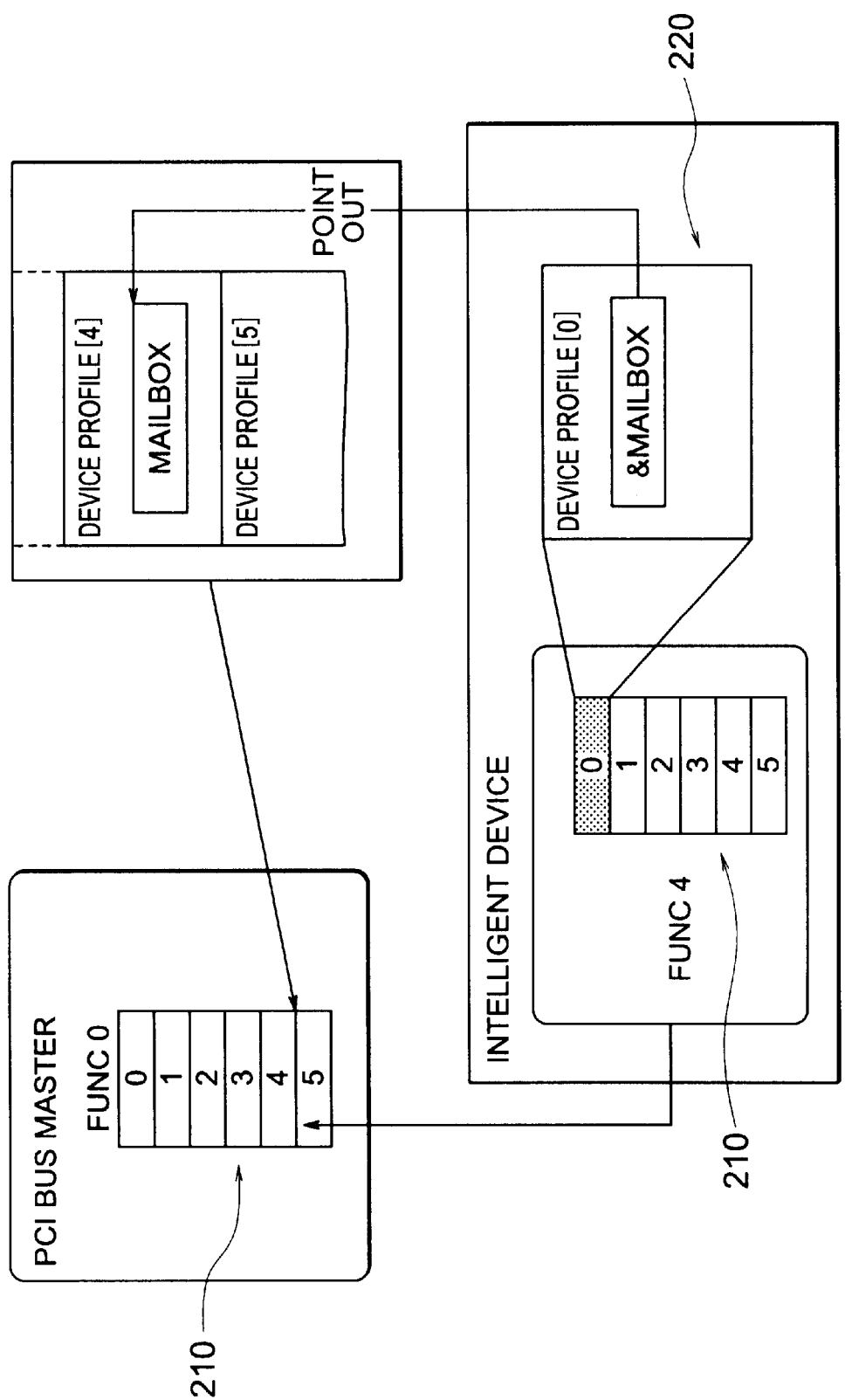
FIG. 30 illustrates the finding of a mailbox address.

The step S261 of looking up the mailbox address is illustrated in FIG. 30, for the case in which FUNC4 sends mail to FUNC0. By checking its own device control table 210, FUNC4 finds the mailbox address indicated by the mailbox pointer &MAILBOX in the device profile 220 of FUNC0. This pointer indicates the address of the mailbox in the device profile of FUNC0 in the device control table 210 of FUNC0, in which FUNC4 will next set mail.

Figure 31:
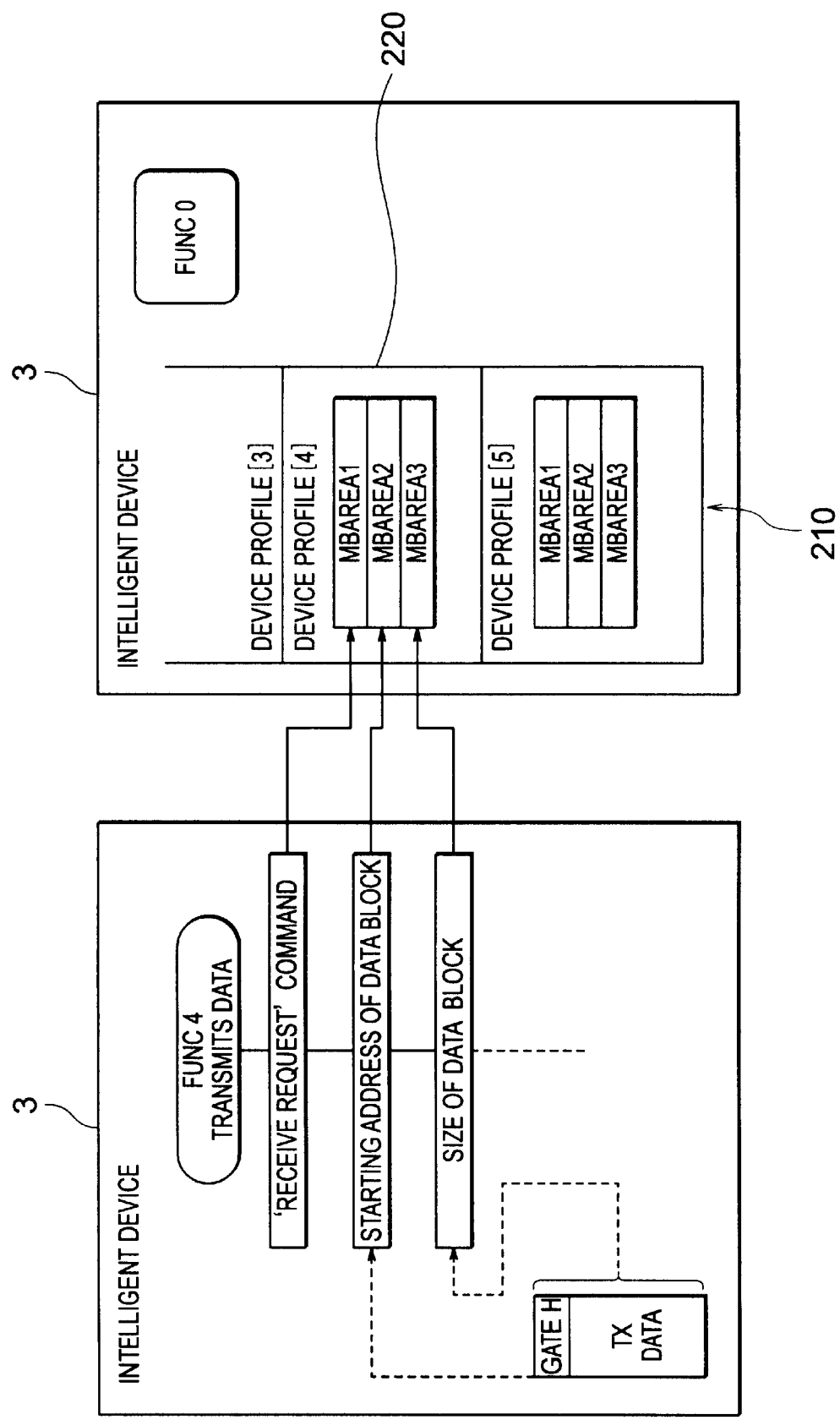
FIG. 31 is a flowchart illustrating the sending of a command to a mailbox.

FIG. 31 illustrates the mail-sending step S262 when the mail is a request to receive data. FUNC4 places the command code of this 'receive request' command in mailbox area MBAREA1 of its device profile 220 in the device control table 210 of FUNC0. The address at which the data block begins, more specifically, the address at which the gate header (H) of the block begins, is set in MBAREA2. The size of the data block, including the gate header, is set in MBAREA3.

A gate header, incidentally, is a header attached to the data block by the gate layer 8. Further details will be given in the ninth embodiment.

Figure 32:
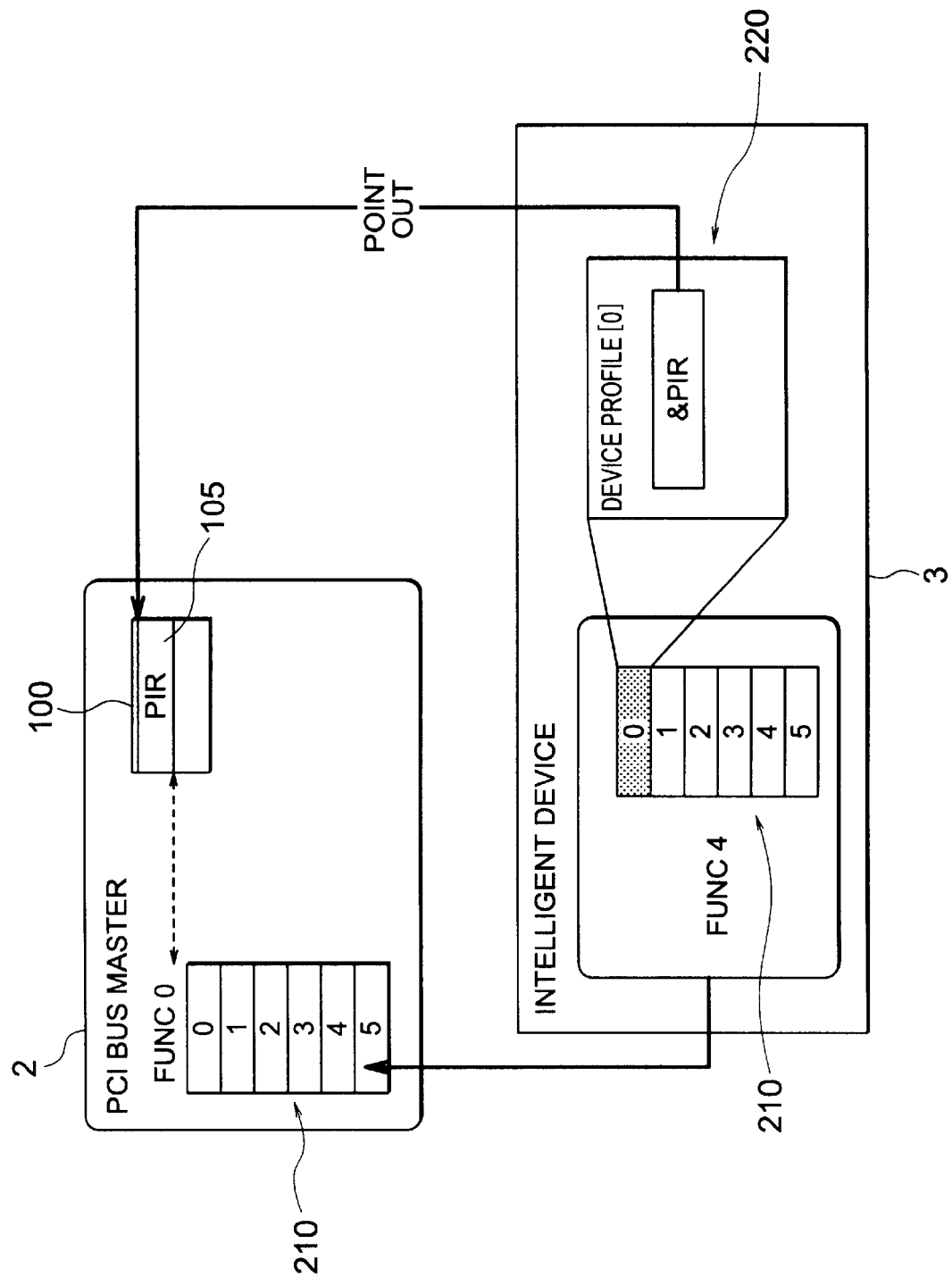
FIG. 32 illustrates the finding of a PCI interrupt request register address.

FIG. 32 illustrates the step S263 of looking up the PCI interrupt request register address. By checking its own device control table 210, FUNC4 finds the address indicated by the PCI interrupt request register pointer &PIR in the device profile 220 of FUNC0. This pointer indicates the address of the PCI interrupt request register 105 in the communication area 100 of FUNC0.

Figure 33:
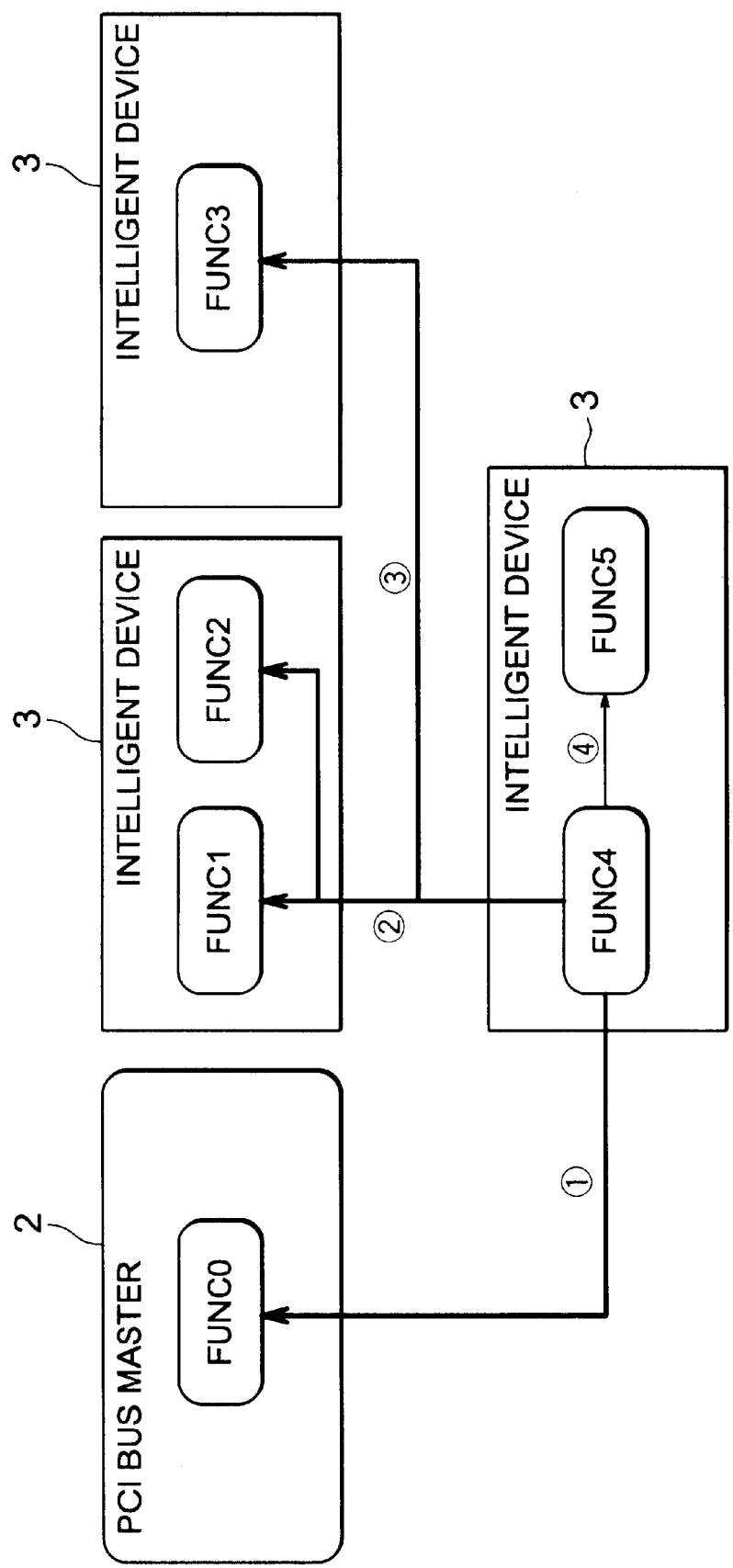
FIG. 33 is a block diagram illustrating the effects of the fifth embodiment.

FIG. 33 illustrates the effects of the fifth embodiment.

One effect is that FUNC4, for example, uses the same procedure to communicate (1) with the sole function FUNC0 in the PCI bus master, (2) with two different functions FUNC1 and FUNC2 disposed in a single intelligent device, (3) with a single function FUNC3 disposed in another intelligent device, and (4) with yet another function FUNC5 disposed in the same intelligent device as FUNC4 itself. This standardized communication procedure simplifies the design of the device functions.

Another effect is that functions in two different intelligent devices 3 can communicate with one another without requiring intervention by the PCI bus master 2.

Next, a sixth embodiment will be described. The sixth embodiment provides means of creating the device control tables used in the fifth embodiment.

Figure 34:
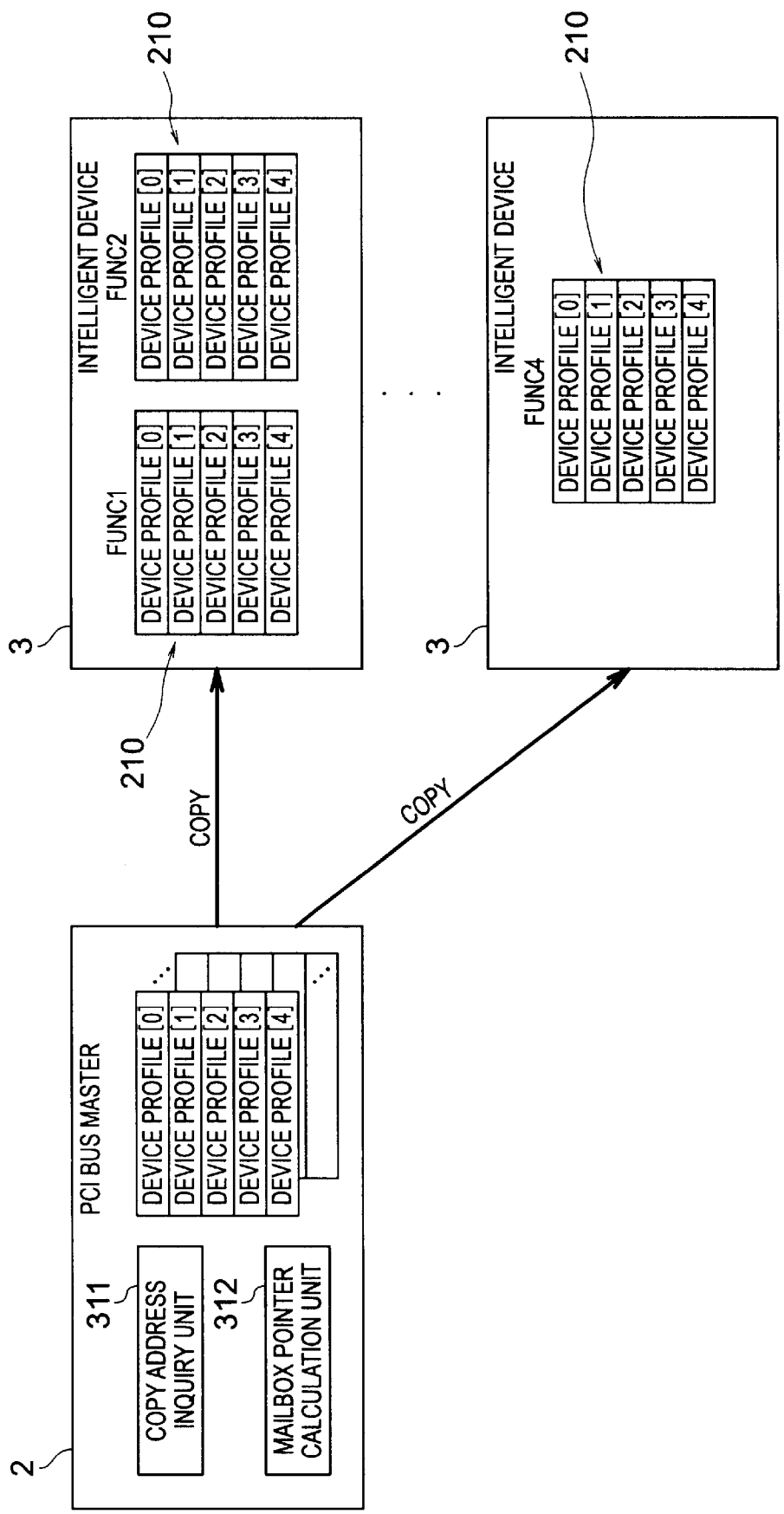
FIG. 34 illustrates the distribution of device control tables in a sixth embodiment.

Referring to FIG. 34, in the sixth embodiment the PCI bus master 2 creates and distributes the device control tables 210. For this purpose, the PCI bus master includes a copy address inquiry unit 311 that finds the addresses to which the device control tables will be copied, and a mailbox pointer calculation unit 312 that calculates the values of the mailbox pointers.

Figure 35:
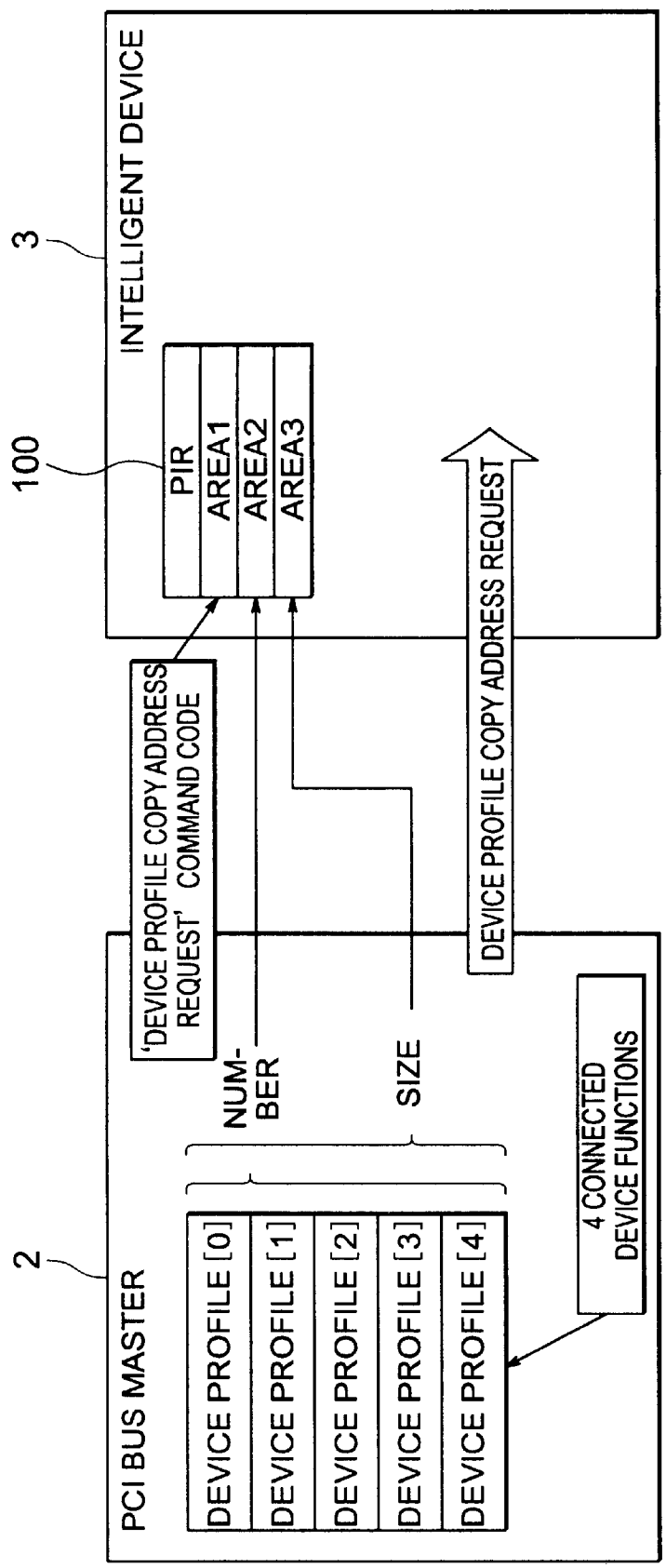
FIG. 35 illustrates the transmission of a command prior to the creation of the device control tables.

After the PCI bus master 2 has scanned the PCI bus to determine the number of connected device functions, the copy address inquiry unit 311 calculates the size of the device control table, and sends each device function a command informing it of the calculated size. The command also asks for the address of the area in which the device function will store its device control table. This process is illustrated in FIG. 35, which shows only the PCI bus master 2 and one other intelligent device 3. The size of the device control table is calculated by multiplying the size of one device profile by the number of device functions. In the example shown, there are four device functions connected to the PCI bus master device function, hence five functions in all, numbered from zero to four. Following the communication procedure explained in the third embodiment, the PCI bus master 2 writes a command requesting the address to which the device control table will be copied in AREA1 of the communication area 100 of each intelligent device function. Because a device control table is a collection of device profiles, this command will be referred to as a 'device profile copy address request.' The two arguments placed in AREA2 and AREA3 are the number of device functions, and the calculated size of the device control table.

Figure 36:
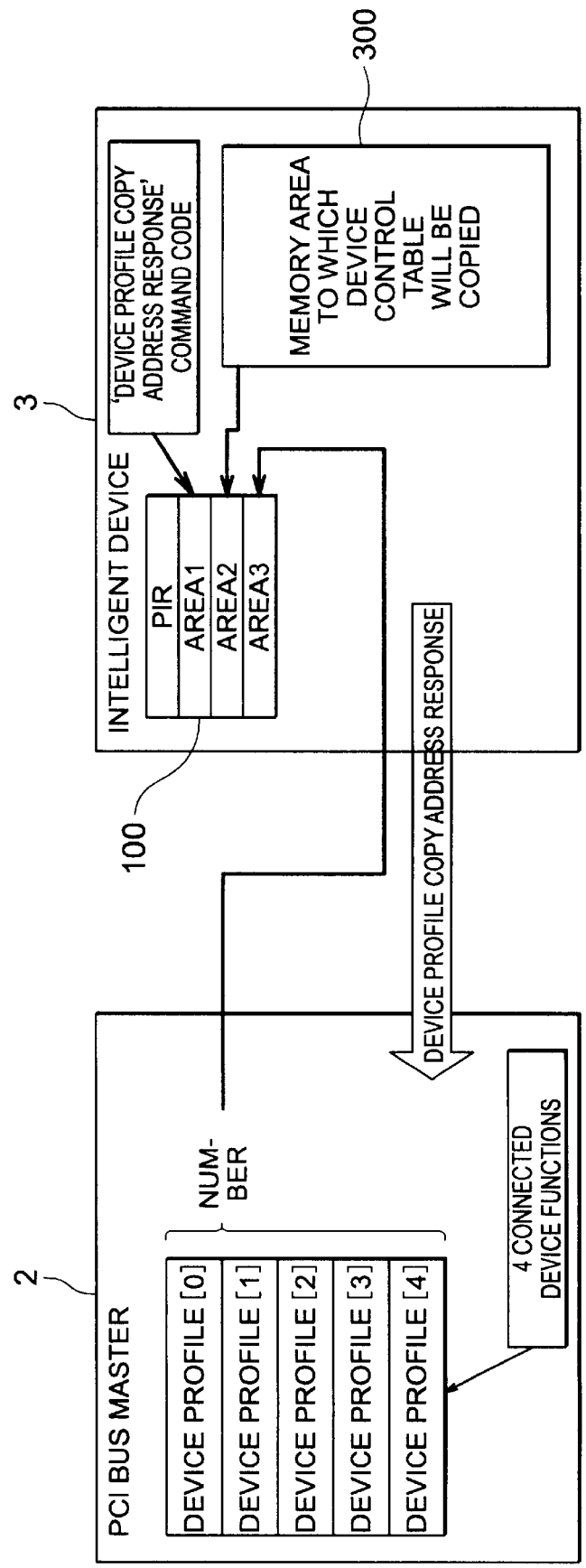
FIG. 36 illustrates the reply to the command in FIG. 35.

A device function receiving this command responds as shown in FIG. 36, by selecting a memory area 300 of the calculated size, placing a command indicating a response to the request in AREA1, and placing the starting address of the selected memory area 300 in AREA2. AREA3 continues to hold the argument placed therein by the PCI bus master 2.

Figure 37:
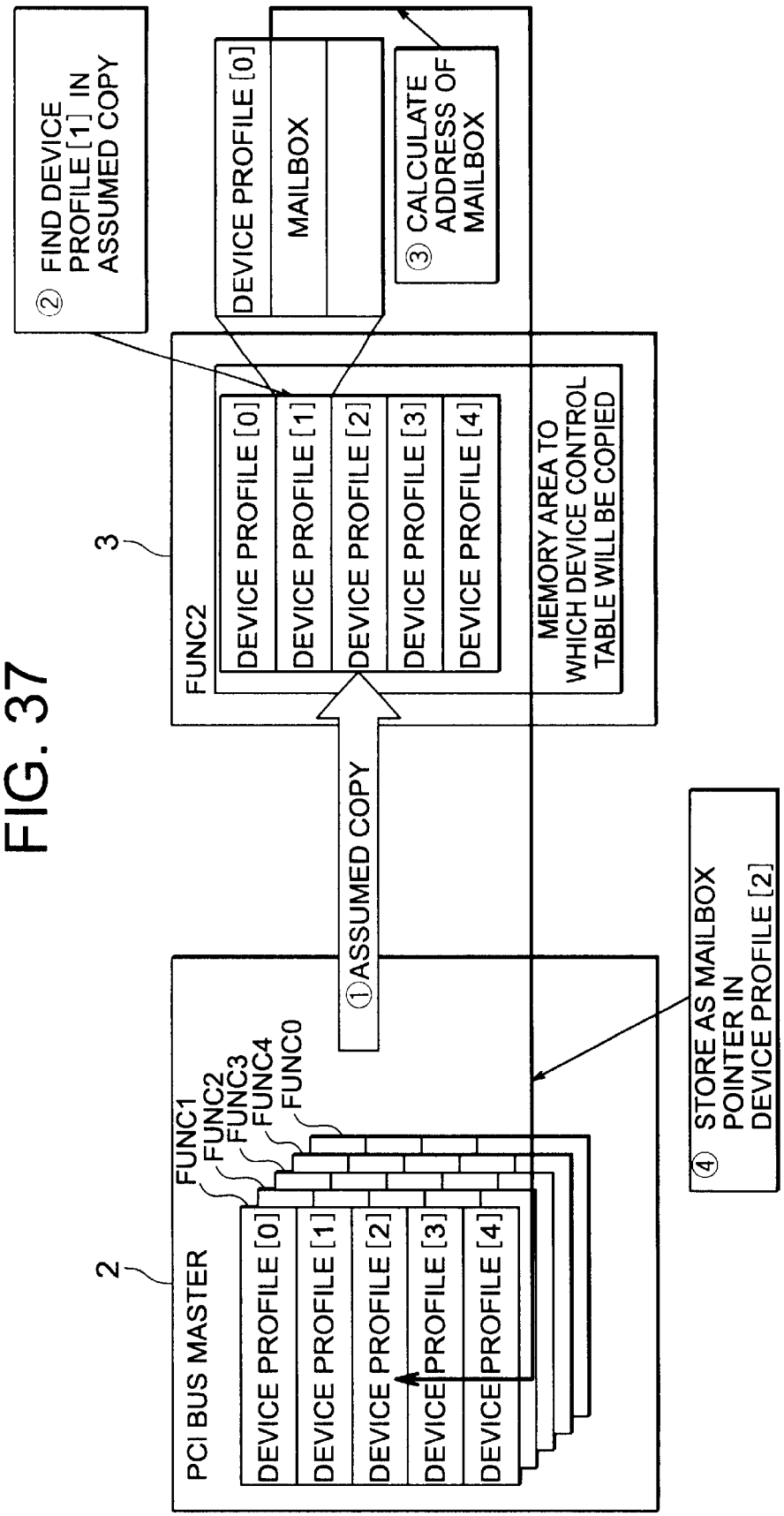
FIG. 37 illustrates the procedure for the calculation of mailbox pointers for the device control tables.

The mailbox pointer calculation unit 312 calculates the mailbox pointer values as illustrated in FIG. 37. This drawing illustrates the calculation of the mailbox pointer that will be placed in the device profile of FUNC2 in the device control table of FUNC1, and used by FUNC1 to send commands to FUNC2. First (1), the mailbox pointer calculation unit 312 assumes that FUNC2 has copied the device control table that will be prepared by the PCI bus master 2 to the address reported by FUNC2. Next (2), the device profile of FUNC1 is found in this assumed copy of the device control table. Then (3), the address of the mailbox in this device profile is calculated. Finally (4), the calculated mailbox address is placed as the mailbox pointer in the device profile of FUNC2 in the device control table that will be copied and used by FUNC1.

Figure 38A:
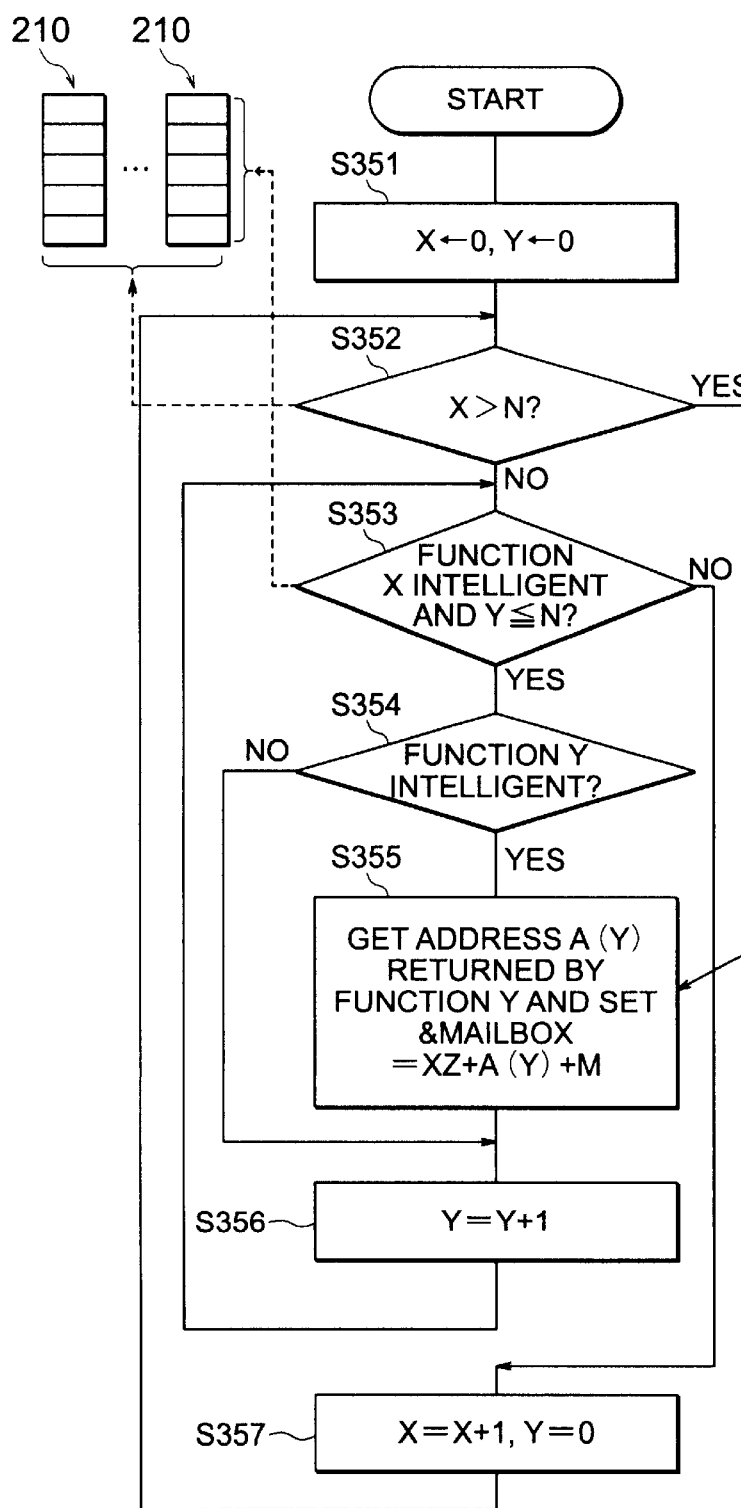
FIG. 38A is a flowchart illustrating the calculation and setting of mailbox pointers in more detail.
Figure 38B:
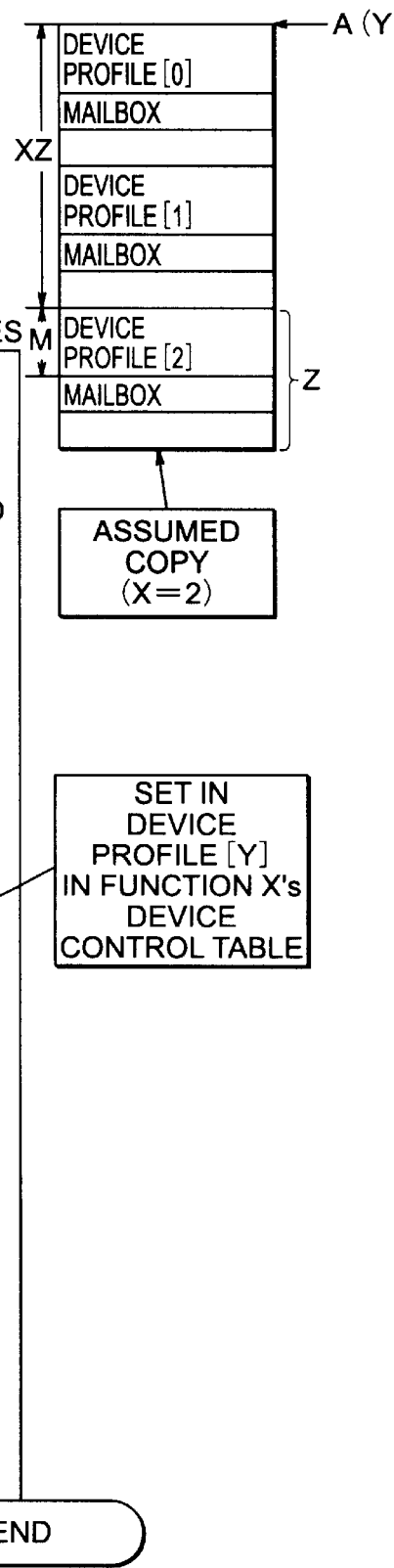
FIG. 38B illustrates the meaning of various symbols in FIG. 38A.

This process is carried out for each device profile in each device control table. Referring to FIG. 38A, the mailbox pointer calculation unit 312 executes a double loop using variables X and Y, which are numbers designating different functions, a constant Z equal to the size of one device profile, and a constant M equal to the offset of the mailbox area in the device profile. N is the last function number; that is, X and Y range from zero to N, inclusive. A(Y) denotes the starting address of the memory area selected by function Y in response to the request made by the copy address inquiry unit 311. FIG. 38B illustrates these values when X is equal to two.

The process in FIG. 38 begins by setting X and Y to zero (step S351). X is the function number of the current function for which a device control table 210 is being created; Y is the function number of a device profile in this table. Decisions are made as to whether all device control tables have been processed (step S352), and if not, whether the current function X is intelligent and there are any remaining device profiles to be processed in its device control table (step S353). If there are, and if the current device profile is that of an intelligent device (step S354), a mailbox pointer is calculated according to the formula:

$$\&MAILBOX = XZ + A(Y) + M$$

This mailbox pointer (&MAILBOX) is written in the device profile of function Y in the device control table of function X (step S355); then Y is incremented to proceed to the next device profile in that table (step S356), and the process returns to step S353. When all device profiles in the current device control table have been processed, Y is reset to zero and X is incremented to proceed to the next device control table (step S357), and the process returns to step S352.

Following the setting of mailbox pointers and other information in the device control tables, the PCI bus master 2 issues commands to have the intelligent device functions copy the device control tables 210 to the memory areas they have selected.

One advantage of having the PCI bus master 2 initialize the device profiles in all of the device control tables is that the other intelligent devices 3 do not need to have processing units analogous to the copy address inquiry unit 311 and mailbox pointer calculation unit 312, so their software can be simplified.

Another advantage is that items can be added to the device profile format more easily, since only the processing performed by the PCI bus master 2 has to be changed.

Next, a seventh embodiment will be described. The seventh embodiment employs a bit-mapped PCI interrupt request register, in addition to the device control tables of the fifth embodiment.

Figure 39:
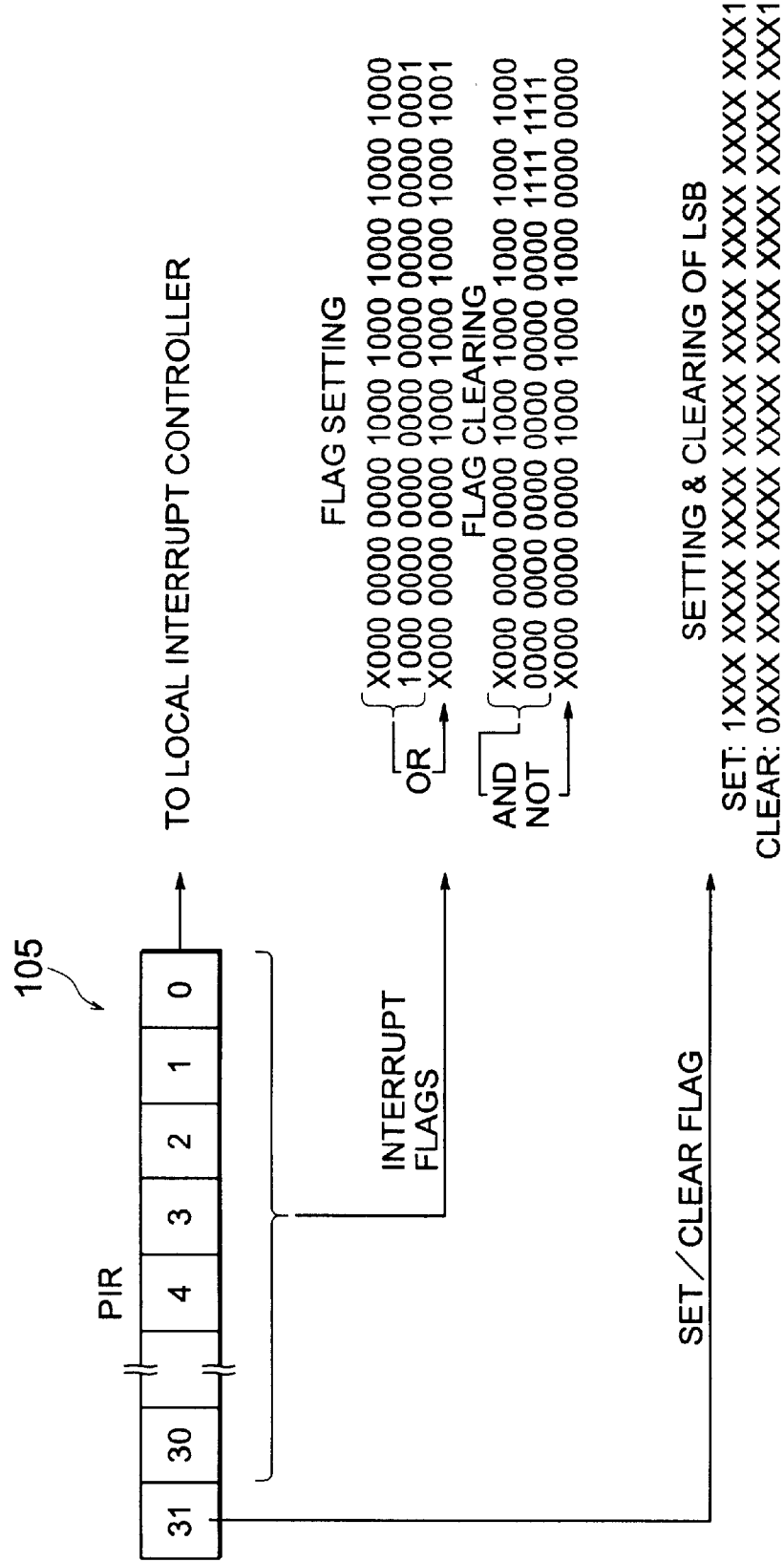
FIG. 39 illustrates the PCI interrupt request register according to a seventh embodiment of the invention.

Referring to FIG. 39, the PCI interrupt request register (PIR) 105 is a thirty-two-bit register. The most significant bit (bit 31) is used as a set/clear flag. The other bits (bits 0 to 30) are interrupt flags corresponding to different device functions in the PCI bus system. The interrupt flag bits are connected to an interrupt controller (not visible) in the local device function so that whenever any one or more of these flag bits are set to '1,' an interrupt is generated.

To set one or more of the interrupt flag bits to '1,' it is necessary to write a thirty-two-bit value having 1's in the positions of the bits to be set, and in the set/clear flag, and 0's in other bit positions. The written value, except for the most significant bit, is ORed with the existing PIR contents, as illustrated.

To clear one or more of the interrupt flag bits to '0,' it is necessary to write a thirty-two-bit value having 1's in the positions of the bits to be cleared and 0's in the other bit positions, including the position of the set/clear flag. The written value is complemented, then ANDed with the existing PIR contents, except for the most significant bit.

For example, the least significant bit (LSB, bit 0) is set by writing a value in which the least significant bit and the most significant bit (bit 31) are both set to '1,' and is cleared by writing a value in which the least significant bit is set to '1' and the most significant bit is cleared to '0.'

Figure 40:
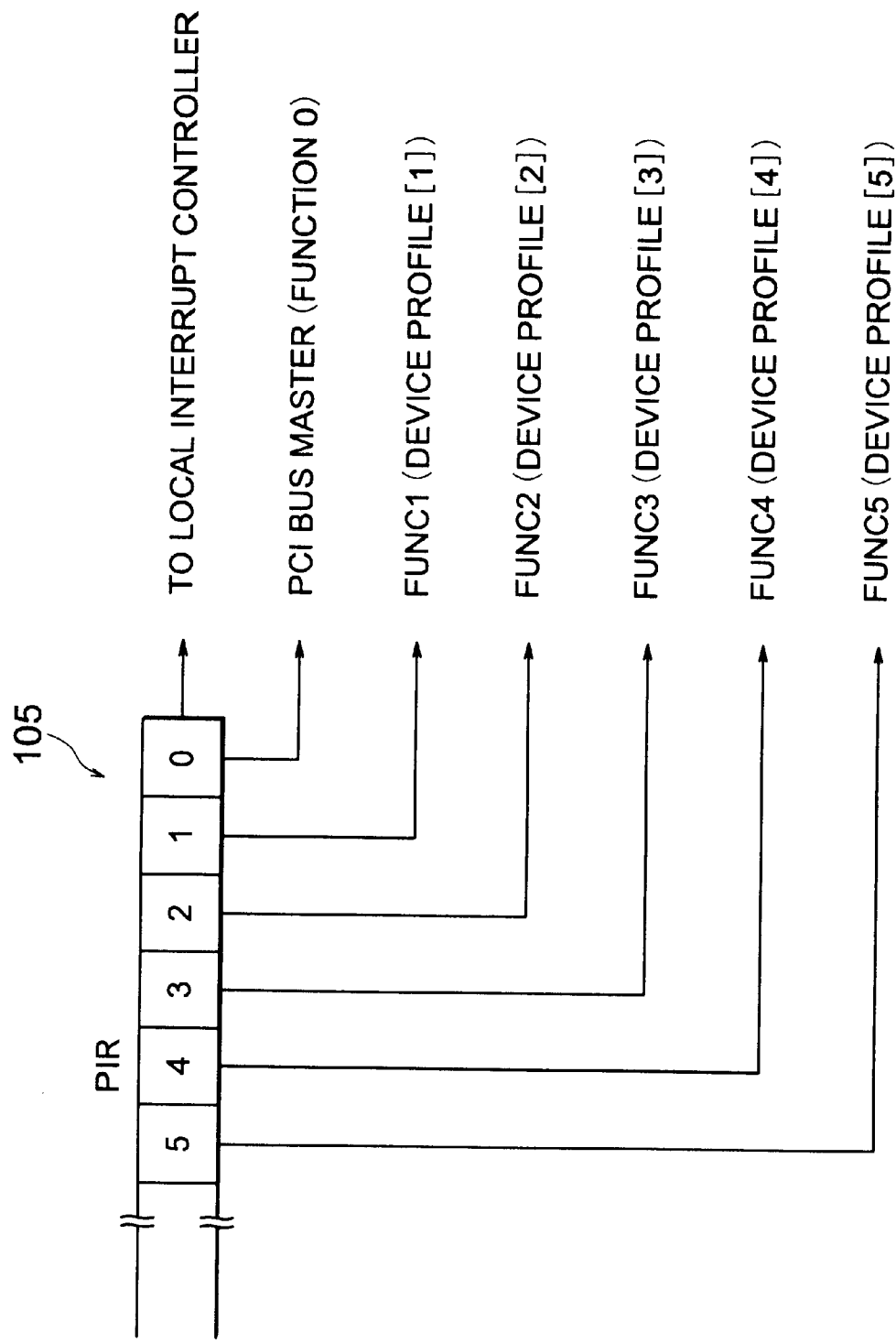
FIG. 40 illustrates the mapping of the bits in FIG. 39.

When one device function sends a command to a target device function, it uses the PCI interrupt request register 105 to alert the target function and inform it of the source of the command. Accordingly, the bits in the PCI interrupt request register 105 are mapped onto the device functions as illustrated in FIG. 40. The least significant bit (bit 0) corresponds to the PCI bus master (FUNC0). The next bit (bit 1) corresponds to the function described by device profile[1] in the device control table; that is, to FUNC1. The next bit corresponds to FUNC2, and so on. The correspondence between bits and device functions is not hard-wired, but is determined by software during the initialization process, matching the correspondence between device functions and their device profiles in the device control tables distributed by the PCI bus master 2.

FIG. 41 lists the actual contents of the PCI interrupt request register 105 in hexadecimal and binary notation when one interrupt flag is set, in order of the corresponding function number. The most significant bit, indicated by an X in binary notation, cannot be set and cleared as can the other bits, so only the function numbers from zero to thirty have valid interrupt flags.

Figure 42:
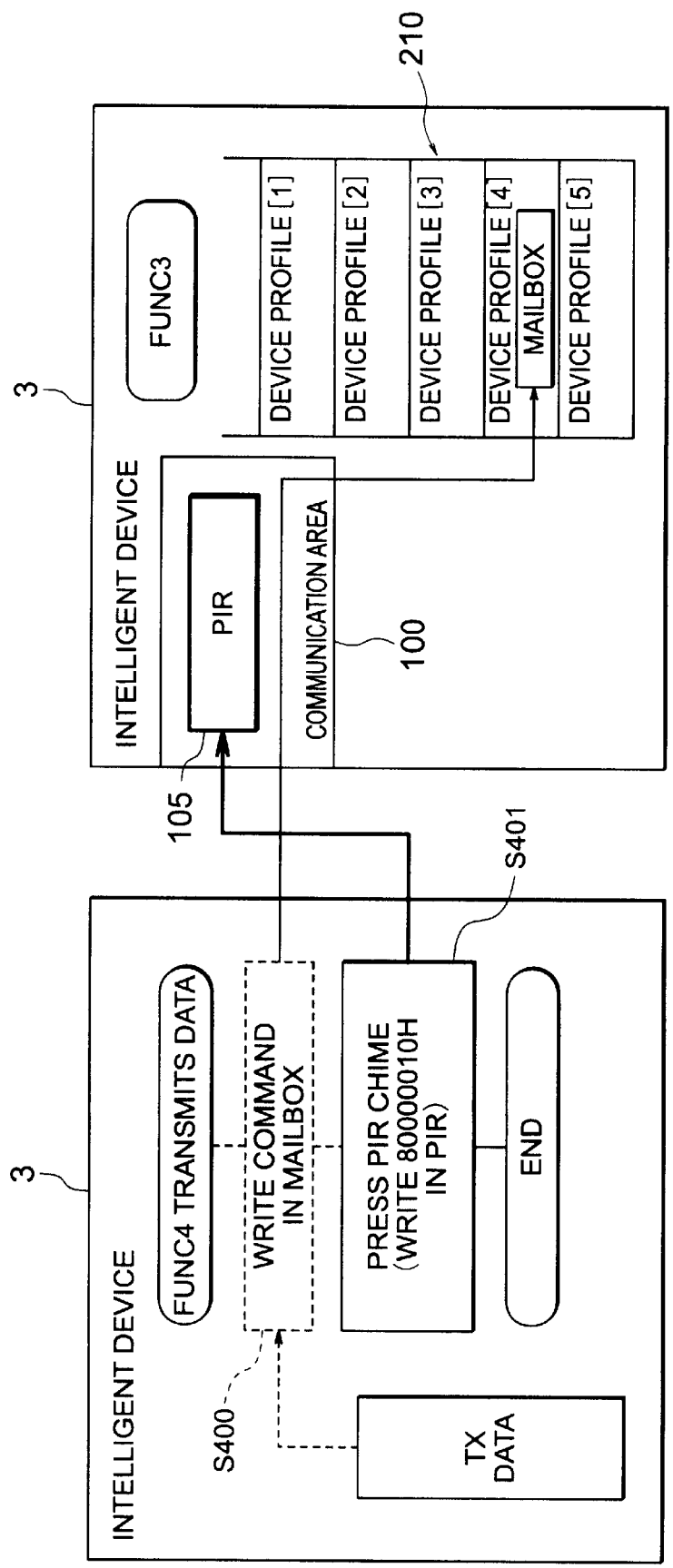
FIG. 42 illustrates the transmission of a command.

FIG. 42 illustrates the operation by which FUNC4 uses FUNC3's PCI interrupt request register 105 to send data to FUNC3. First, FUNC4 places a command in its own mailbox in FUNC3's device control table 210 (step S400), giving the starting address and size of the data and requesting that FUNC3 copy the data. Next, in an action analogous to pressing a door chime, FUNC4 sets bit four in the PCI interrupt request register 105 in FUNC3's communication area 100, by writing the hexadecimal value 80000010H (step S401).

Figure 43:
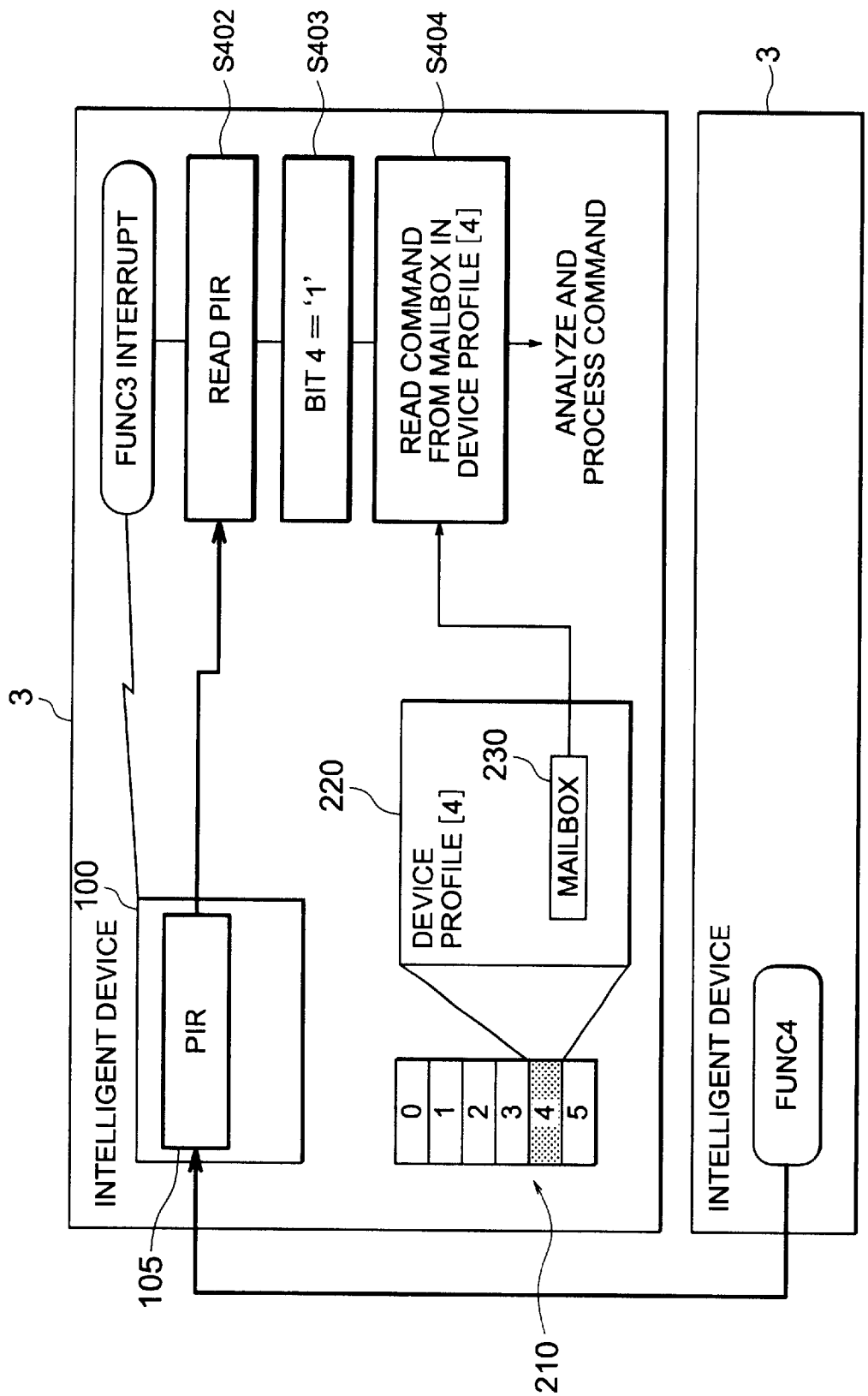
FIG. 43 illustrates the reception of the command.

FIG. 43 illustrates the reception of this command by FUNC3. The appearance of a non-zero value in FUNC3's PCI interrupt request register 105 generates an interrupt in the processing of FUNC3. The interrupt-processing routine reads the PIR contents (step S402), determines that bit four is set (step S403), and thereby identifies FUNC4 as the source of the interrupt. The routine then reads the contents of the mailbox 230 in FUNC4's device profile 220 in FUNC3's device control table 210 (step S404) to obtain the command and its arguments, which are passed to the appropriate command-analysis routine and data-copying routine. After these processes, the interrupt flag is cleared (by writing 00000010H in the PCI interrupt request register).

If several different device functions send commands to the same target function within a short span of time, the interrupt-processing routine in the target function may find that several of the bits in the PCI interrupt request register 105 are set. In this case, the corresponding mailboxes are read one by one and each command is processed in turn.

One advantage of the seventh embodiment is that the target device function can identify the source of a command quickly, simply by checking its PCI interrupt request register, without having to check all of the mailboxes in its device control table.

Another advantage is that if multiple commands are received at substantially the same time, they can be processed in an orderly manner, by the same procedure as if they had been received at different times.

Next, an eighth embodiment will be described. The eighth embodiment provides for the continuous reception of data blocks with PCI headers linked by next pointers.

Figure 44:
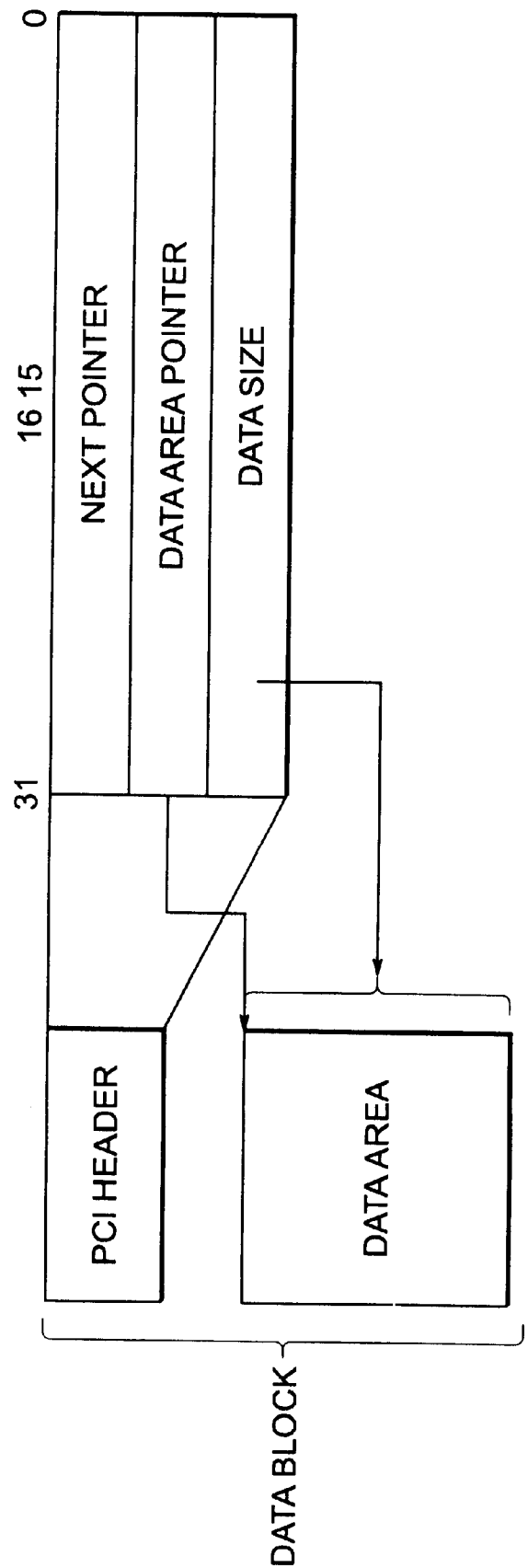
FIG. 44 illustrates a PCI header used in an eighth embodiment of the invention.

Referring to FIG. 44, the PCI header employed in the eighth embodiment is similar to the PCI header employed in the fourth embodiment, comprising a next pointer, a data area pointer, and a data size field. The least significant bit of the next pointer may be used as a continue flag, as in the fourth embodiment, but this is not necessary in the eighth embodiment.

Figure 45:
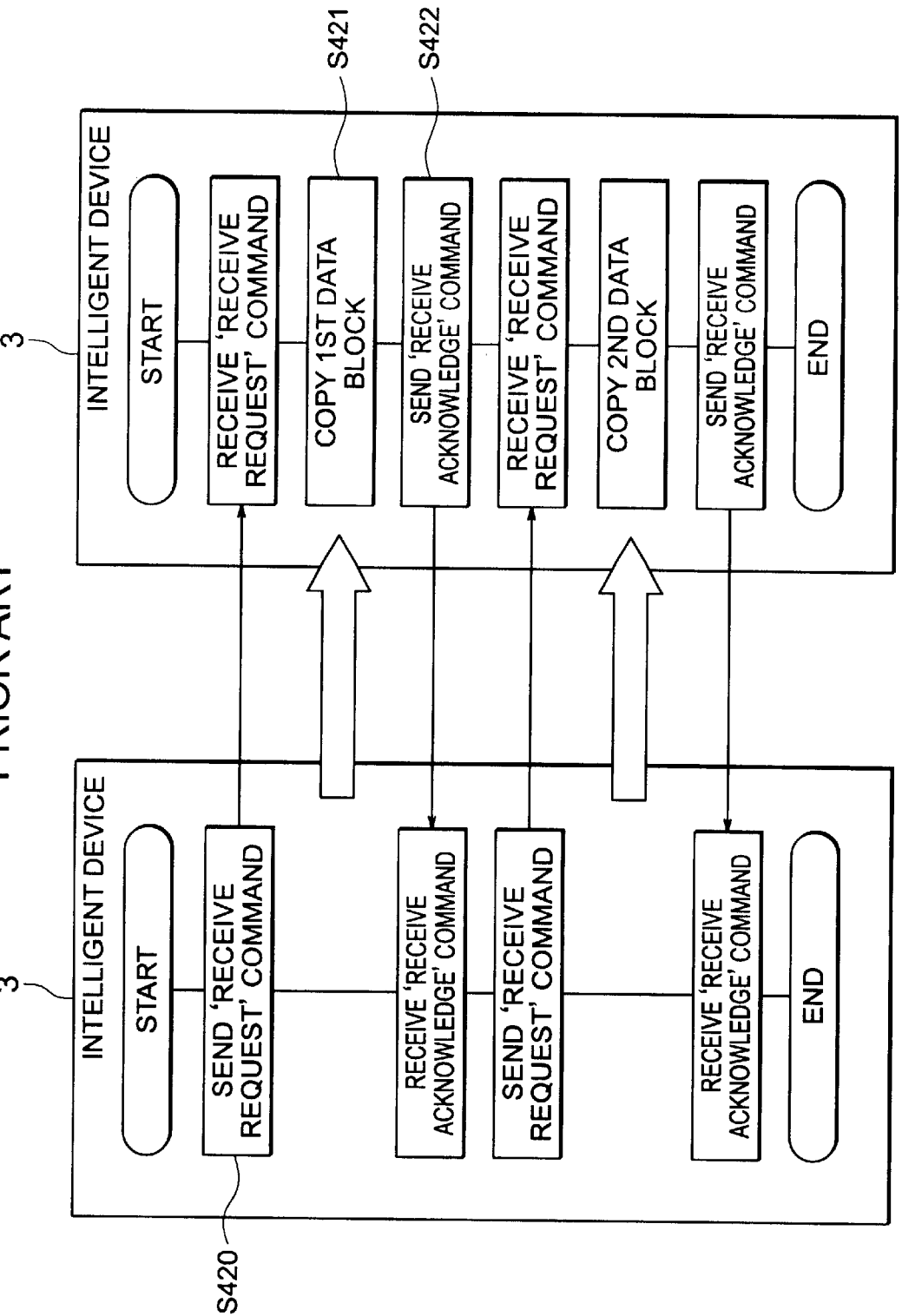
FIG. 45 illustrates a conventional procedure for transmitting data in the eighth embodiment.

FIG. 45 illustrates the conventional procedure for transmitting data. The transmitting device begins by sending a 'receive request' command to the receiving device, giving the address and size of a data block and asking the receiving device to receive the data (step S420). The receiving device copies the data block (step S421), then responds to the command, within two seconds, by sending back an acknowledging command (step S422). To transmit further data, the transmitting device may send another command. The receiving device copies the data, then sends back another acknowledging command. This procedure is reliable, because every data block is acknowledged, but for the same reason, it is not suitable for the high-speed transfer of a series of data blocks.

Figure 46:
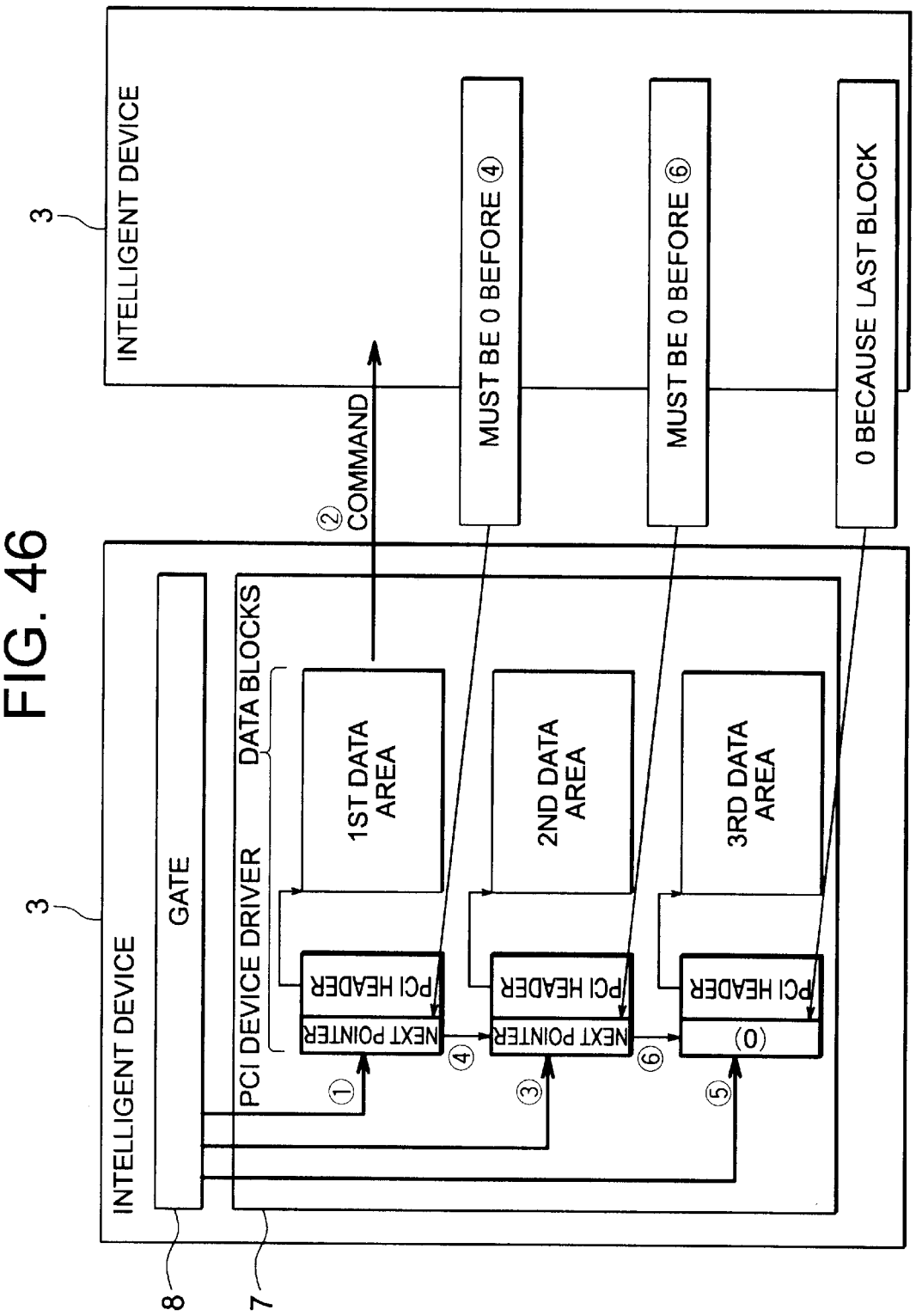
FIG. 46 illustrates the operation of the transmitting device in the eighth embodiment.

FIG. 46 shows an example of the procedure in the present embodiment. The PCI device driver 7 in the transmitting device receives a first data block from an upper layer, via the gate layer 8 in the transmitting device, and adds a PCI header in which the next pointer is initially cleared to zero (1). Then the PCI device driver 7 sends the receiving device a 'receive request' command (2) requesting that the receiving device receive the data.

Before the receiving device responds to this command, the PCI device driver 7 receives a second data block from the upper layer. The PCI device driver 7 cannot issue another 'receive request' command to the receiving device yet, because the receiving device has not responded to the first command. Nevertheless, the PCI device driver links a PCI header, in which the next pointer is initially cleared to zero, to this second data block (3), and writes the address of this PCI header in the next pointer of the PCI header of the first data block (4).

Next, the PCI device driver 7 receives a third and final data block from the upper layer, while the receiving device still has not responded to the original command (2). In similar fashion, the PCI device driver 7 links another PCI header (5) to this third data block, clearing the next pointer in this PCI header to zero, and writes the address of this PCI header in the next pointer of the second data block (6).

As will be shown below, the receiving device can check the next pointers written by the transmitting device at various timings. Depending on these timings, before responding to the original command from the transmitting device, the receiving device may discover that the transmitting device has changed the next pointer of the first data to a non-zero value. In this case, the receiving device will use this next pointer to find the PCI header of the second data block, and copy the second data block.

Figure 47:
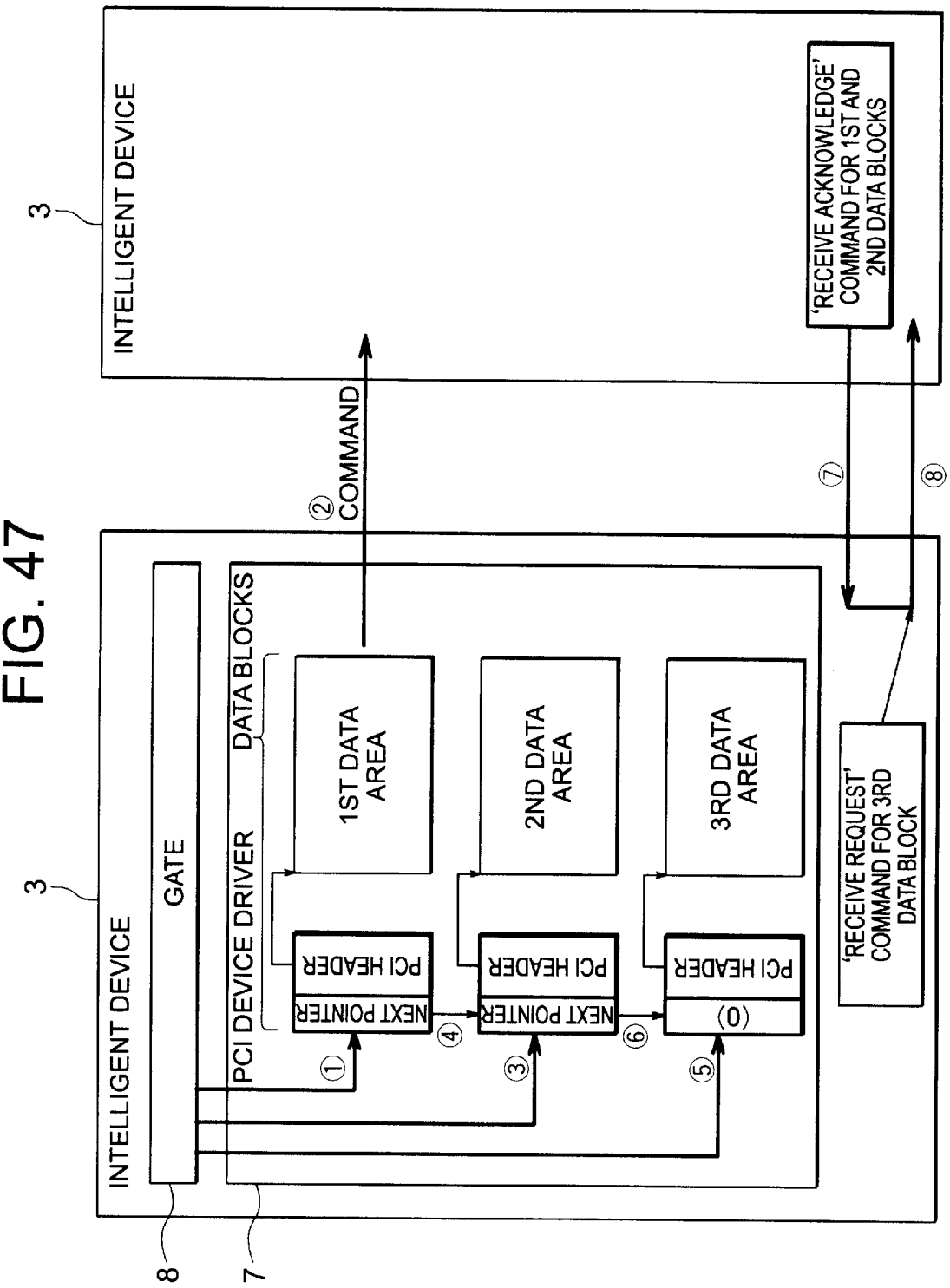
FIG. 47 illustrates the operation of the receiving device.

FIG. 47 illustrates a case in which, after copying the second data block, the receiving device acknowledges (7) the transmitting device's command (2) without checking the next pointer of the second block, possibly because it is obligated to respond within two seconds. As was indicated in FIG. 13, the arguments of the acknowledging command give the address of the last data block received and the number of blocks received. From this information, the transmitting device learns that the receiving device has not copied the third data block, and sends another command (8) asking the receiving device to receive the third data block.

Figure 48:
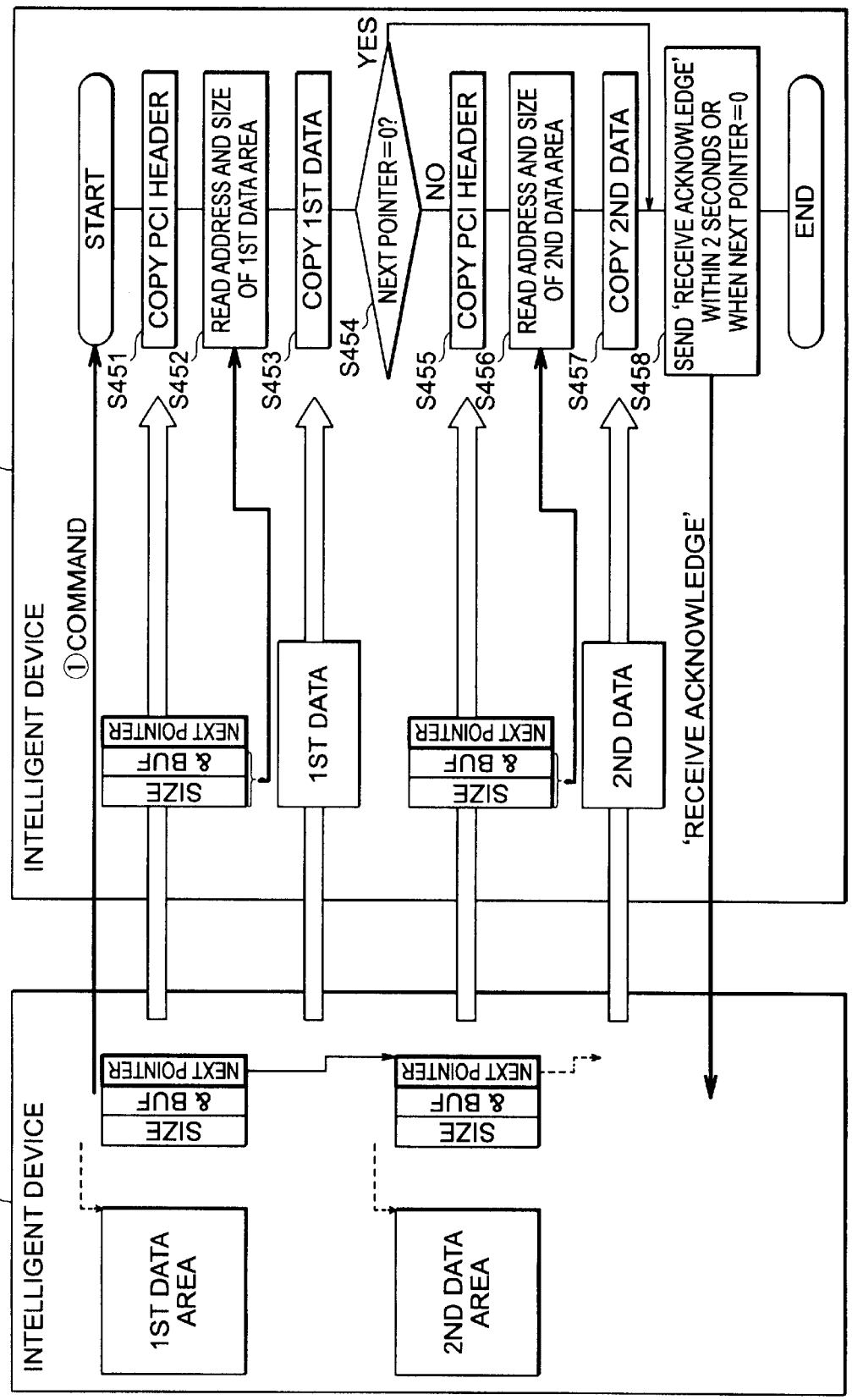
FIG. 48 illustrates a preferred data receiving sequence.

FIG. 48 illustrates one preferred sequence for receiving consecutive data blocks in the eighth embodiment. For simplicity, only two data blocks are shown, but the same principle applies to any number of blocks. The data blocks have PCI headers linked by next pointers as explained above.

The procedure starts when the receiving device is sent a receive-request command from the transmitting device (1). The PCI device driver in the receiving device begins by copying the PCI header (step S451). After reading the starting address and size of the first data block from the first PCI header (step S452), the device driver copies the data block (step S453). After copying the data block, the device driver checks the next pointer in the PCI header (step S454).

If the next pointer has a non-zero value, the device driver copies the second PCI header from the address given by the non-zero value (step S455). After reading the starting address and size of the second data block from the second PCI header (step S456), the device driver copies the second data block (step S457), then checks the next pointer in the second PCI header.

When the next pointer in either the first or second PCI header is a null pointer, that is, a pointer with a zero value, or when nearly two seconds have elapsed since the original command (1) was received, the PCI device driver in the receiving device sends an acknowledging command to the transmitting device to confirm that the data blocks have been copied (step S458).

This procedure allows an arbitrary number of data blocks to be copied with the transmission of only one command by each device driver.

Figure 49:
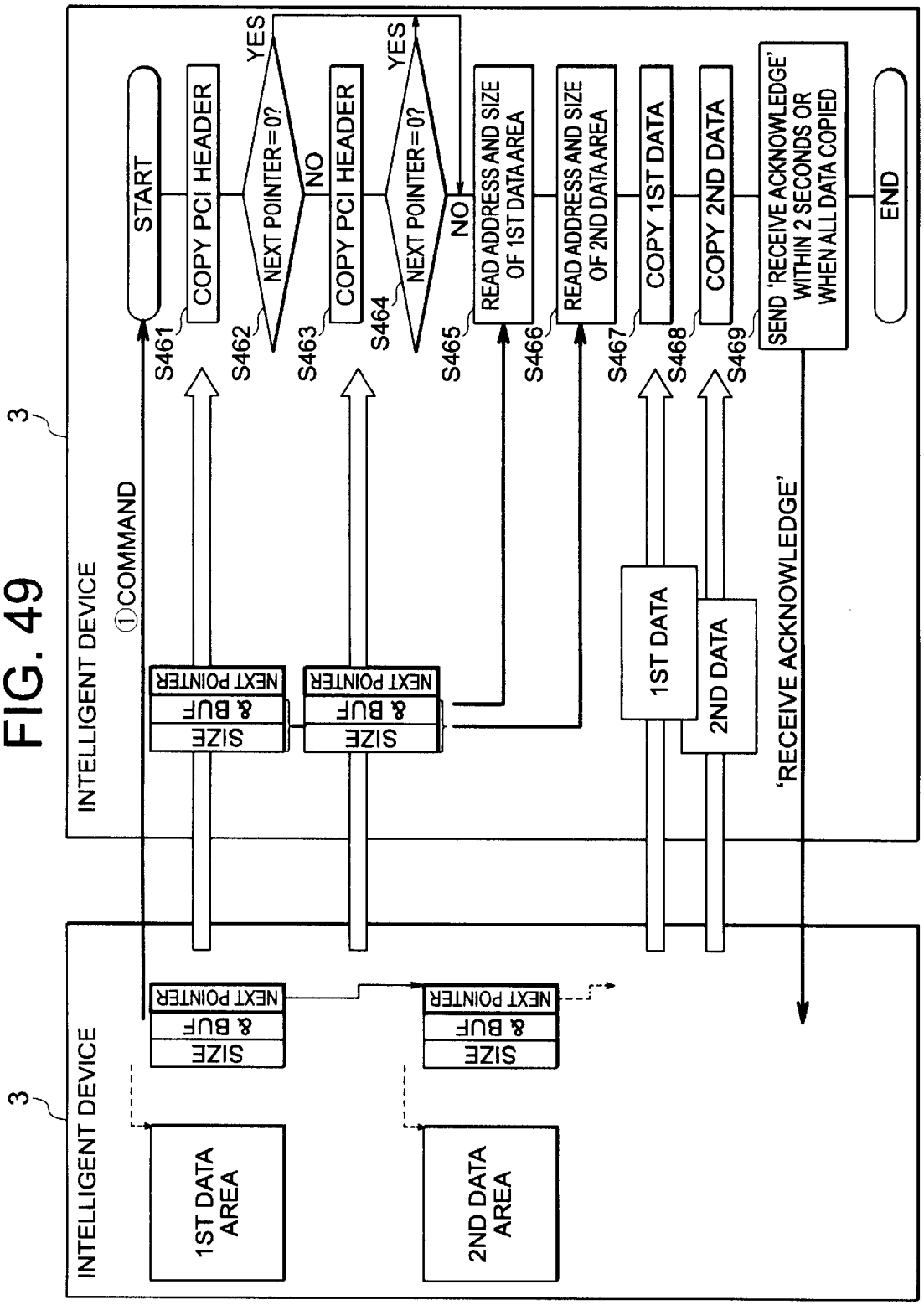
FIG. 49 illustrates another preferred data receiving sequence.

FIG. 49 illustrates another preferred sequence for receiving consecutive data blocks in the eighth embodiment.

On command (1) from the PCI driver in the transmitting device, the PCI device driver in the receiving device copies the first PCI header (step S461), and checks its next pointer (step S462). If the next pointer is non-zero, the next PCI header is read from the indicated non-zero address (step S463), and its next pointer is checked (step S464). An arbitrary number of linked PCI headers can be copied and checked in this way, although due to space limitations, the sequence is shown as stopping with just two PCI headers.

After all of the PCI headers have been copied, the PCI device driver checks the starting addresses and sizes of the data blocks, as given in the PCI headers (steps S465 and S466), then copies the data blocks one by one (steps S467 and S468). After copying all of the data, or when nearly two seconds has elapsed, the PCI driver in the receiving device sends an acknowledging command to the transmitting device (step S469).

The procedure in FIG. 49 enables the PCI device driver in the receiving device to calculate the combined size of the data blocks ahead of time, and thus to secure adequate space for storing the copied data.

Needless to say, data can also be transmitted by the procedure shown in FIG. 45, with separate commands for each data block. The eighth embodiment thus enables data to be transmitted flexibly, in a variety of ways. This is an important consideration on a PCI bus, as many different types of devices may have to be connected to the bus.

In addition to this flexibility, the eighth embodiment enables data to be transferred at high speed, since a separate command and response are not required for each data block.

Next, a ninth embodiment will be described. The ninth embodiment pad's gate headers to align data on four-byte boundaries.

Referring once more to FIG. 3, when a data block prepared by an upper layer is passed to a PCI driver, it may pass through two intermediate layers: a protocol layer such as an IEEE 1284.4 layer 10, and a gate layer 8. In this process, the data block acquires both a protocol header and a gate header. The size of the protocol header is variable, depending on the details of the protocol. The size of a conventional gate header is fixed.

Figure 50:
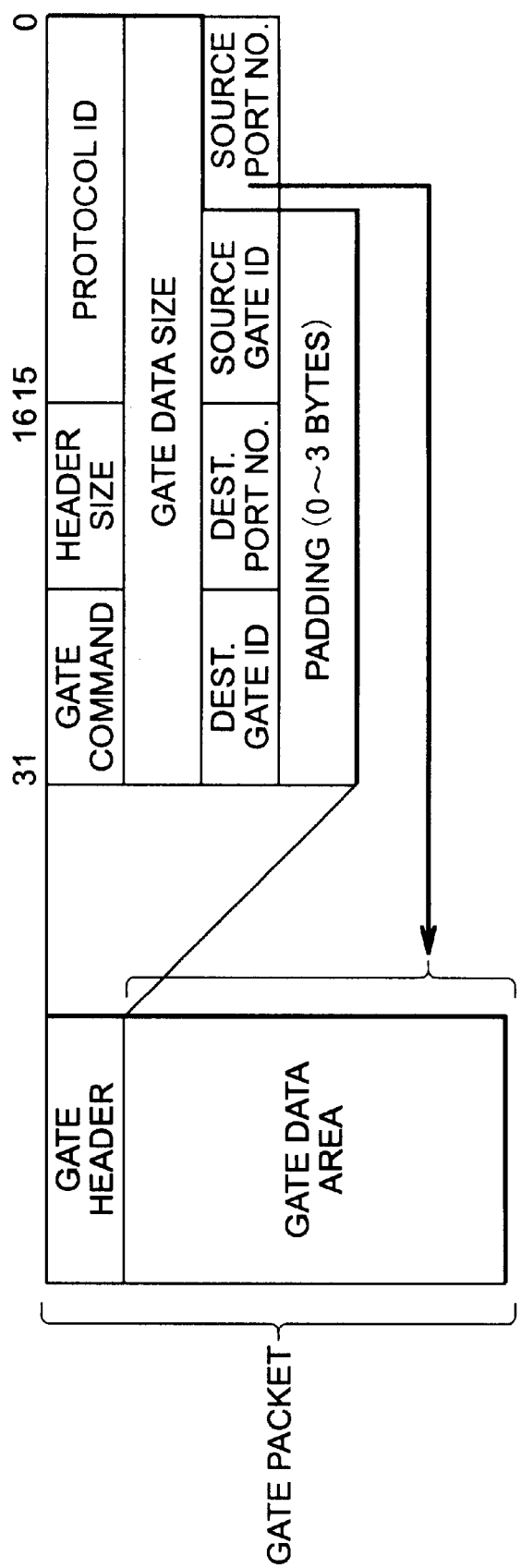
FIG. 50 illustrates a gate header used in a ninth embodiment of the invention.

FIG. 50 shows the format of the gate header in the ninth embodiment. The gate header begins with twelve bytes giving a gate command, the gate header size, a protocol ID, the gate data size, the destination (Dest.) gate ID, the destination port number, the source gate ID, and the source port number. These twelve bytes are followed by zero, one, two, or three padding bytes. The gate header and the gate data together form what is called a gate packet.

Figure 51:
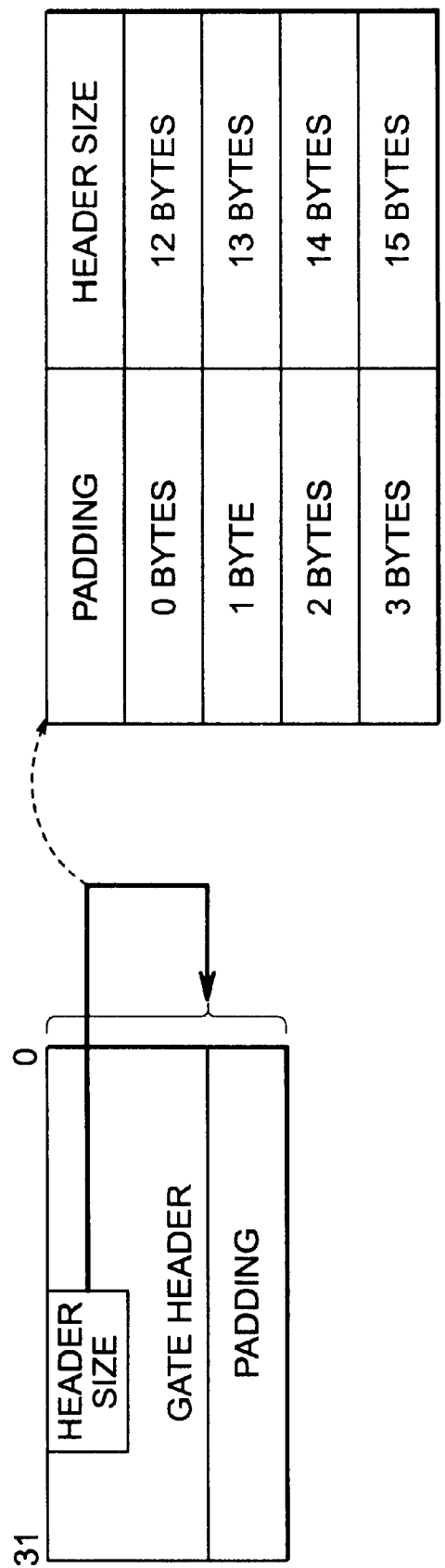
FIG. 51 illustrates the relationship of gate header size to padding size.

Referring to FIG. 51, the header size field in the gate header indicates the total size of the gate header, including the padding bytes. As the number of padding bytes varies from zero to three, the total gate header size varies from twelve to fifteen bytes.

Figure 52:
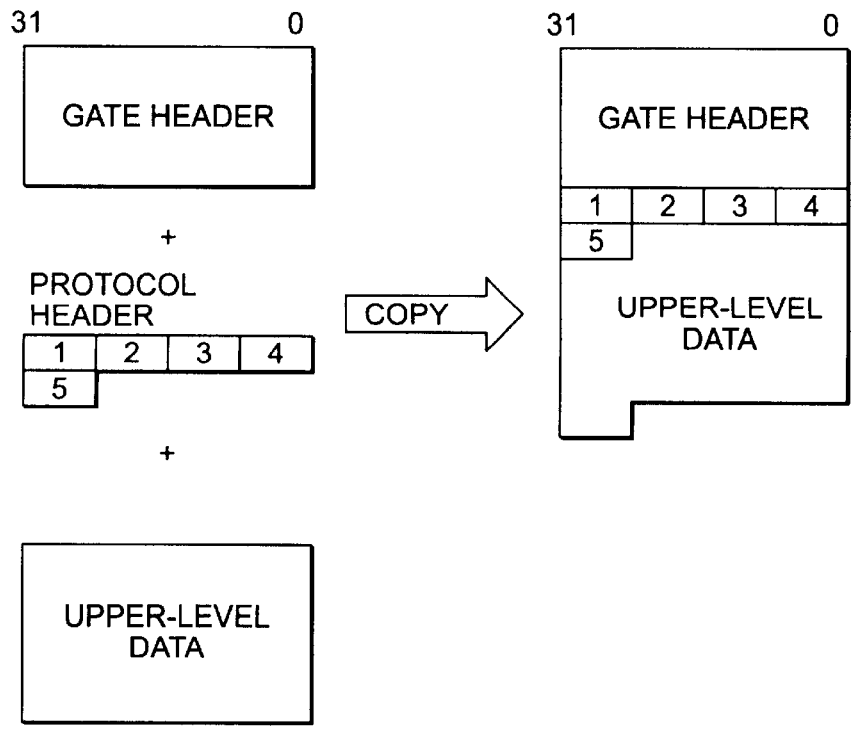
FIG. 52 illustrates the attachment of a conventional gate header without padding.

The padding bytes are used to compensate for the variable size of the protocol header, so that the data passed to the upper layer in the receiving device will be aligned on four-byte boundaries. FIG. 52 shows an example in which the protocol header is five bytes long. If no padding is included in the gate header, the combined length of the twelve-byte gate header and five-byte protocol header will be seventeen bytes, which is not divisible by four. If the destination device stores the gate header, protocol header, and upper-level data in a continuous area, starting on a four-byte boundary, the upper-level data will not start on a four-byte boundary. As a result, after receiving the data from the protocol layer, with the protocol header removed, the upper level will not be able to process the data efficiently.

Figure 53:
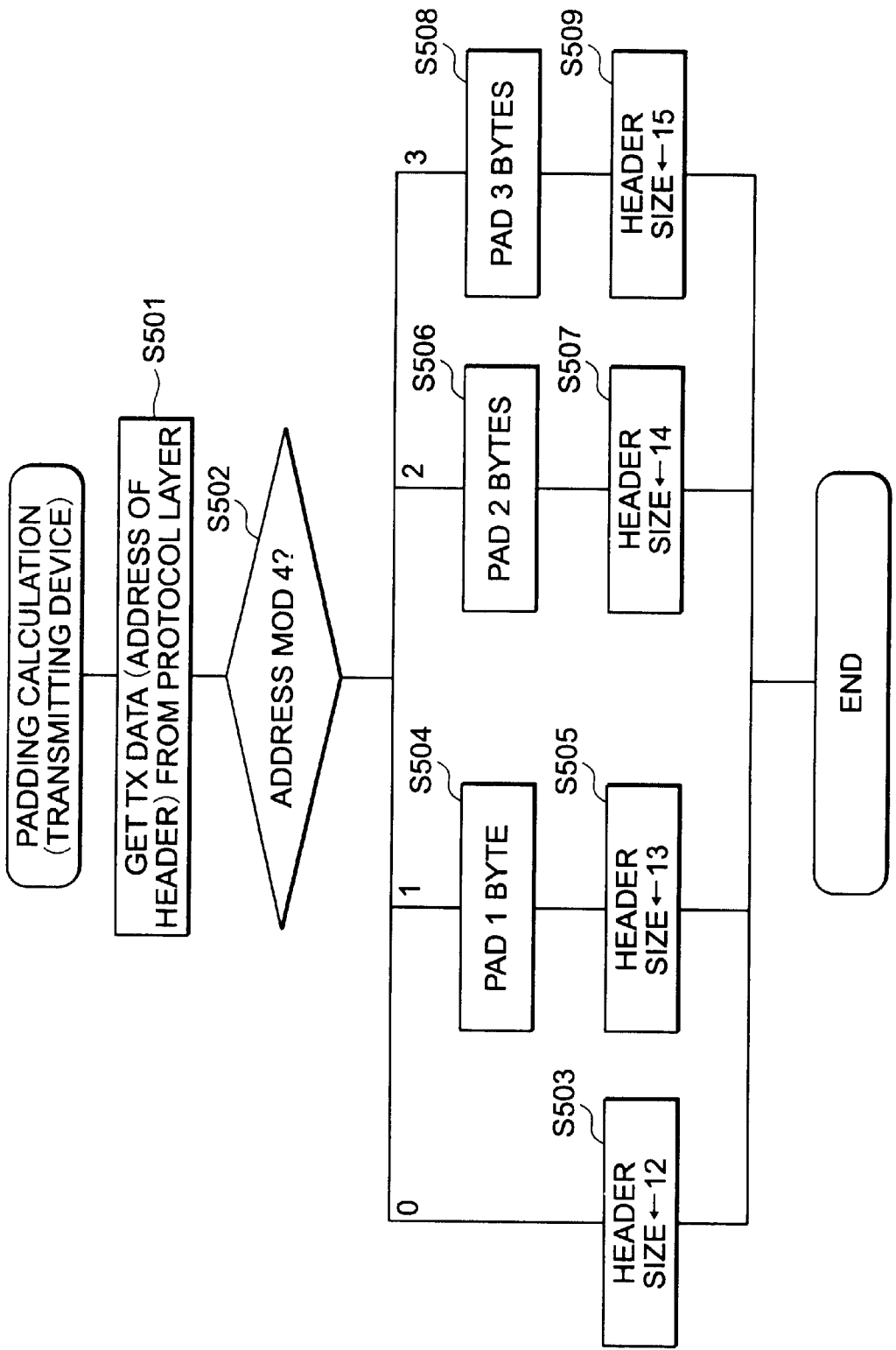
FIG. 53 is a flowchart illustrating the selection of padding size.

The gate layer in the transmitting device calculates the number of padding bytes by the procedure shown in FIG. 53. First, the gate layer receives the data from the protocol layer (step S501). This means that the protocol layer informs the gate layer of the starting address of the protocol header. It will be assumed here that the protocol layer has received upper-layer data aligned on a four-byte boundary, and has prefixed a protocol header that ends at the four-byte boundary marking the beginning of the upper-level data. Accordingly, the protocol header may start on an arbitrary boundary.

The starting address of the protocol header is now divided by four and the remainder (the address modulo four) is tested (step S502). If the remainder (address mod 4) is zero, no bytes are padded, and twelve (12) is set in the header size field of the gate header (step S503). If the remainder is one, one padding byte is added (step S504), and thirteen (13) is set in the header size field of the gate header (step S505). If the remainder is two, two padding bytes are added to the gate header (step S506), and fourteen (14) is set in the header size field (step S507). If the remainder is three, three padding bytes are added to the gate header (step S508), and fifteen (15) is set in the header size field (step S509).

Figure 54:
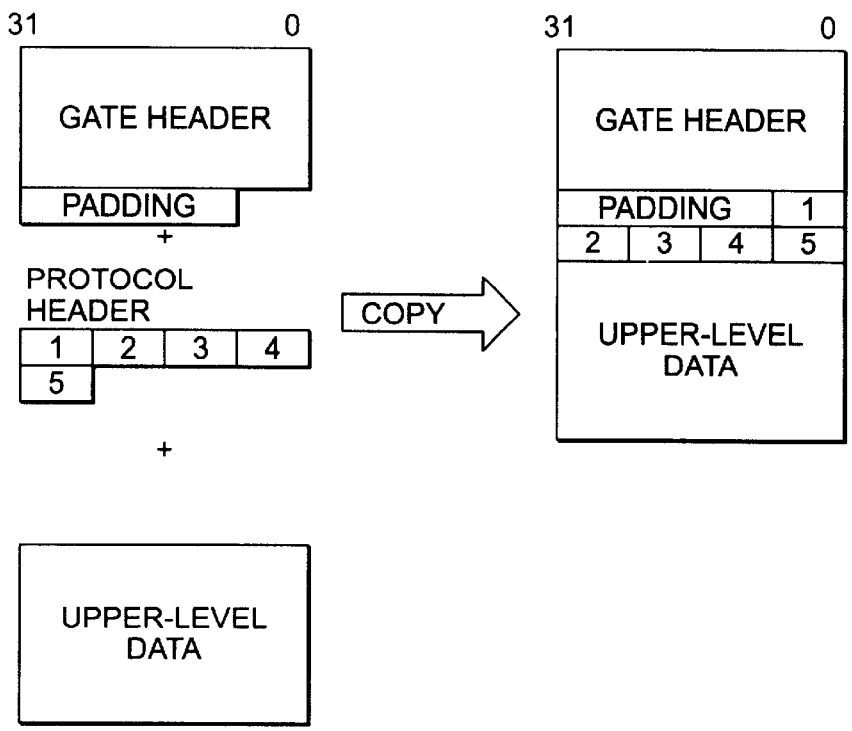
FIG. 54 illustrates the attachment of a gate header with padding.

FIG. 54 illustrates the case in which the protocol header is five bytes long and the calculated remainder is three, so three padding bytes are added. The destination device stores the gate header, including the padding bytes, immediately before the protocol header, which immediately precedes the upper-level data. As illustrated, the padding bytes align the upper-level data on a four-byte boundary.

FIG. 55 illustrates the operation of the gate layer in the destination device. The gate layer receives the data from the PCI device driver in the destination device; that is, the PCI device driver informs the gate layer of the starting address of the received data, including the gate header and protocol header data (step S511). By reading the gate header, the gate layer determines the gate header size (step S512).

In passing the received data to the protocol layer, the gate layer removes the gate header by informing the protocol layer only of the address at which the protocol header starts. The gate layer calculates this address by adding the header size to the address received from the PCI device driver (steps S513, S514, S515, S516), and informs the protocol layer of the calculated address (step S517).

The protocol layer then removes the protocol header and passes the upper-level data to the upper level, by informing the upper level of the starting address of the upper-level data. As illustrated in FIG. 54, this starting address is aligned on a four-byte boundary.

By padding the gate header as necessary, the ninth embodiment aligns the data passed to the upper level on a desirable boundary, regardless of the size of the protocol header, while also allowing the entire gate packet to start from a desirable boundary.

In a variation of the ninth embodiment, in the transmitting device, the gate header, protocol header, and data are all stored starting from four four-byte boundaries, as shown in FIG. 54. The PCI device driver in the source device uses the byte-enable signal lines (C/BE) to indicate which header bytes are valid. Invalid header bytes are not stored at the destination device. In this variation, the number of padding bytes is calculated from the size of the protocol header.

Next, a tenth embodiment will be described. The tenth embodiment allows an arbitrary intelligent device to act as the device master mentioned in the first embodiment.

The tenth embodiment differs from the first embodiment in that the PCI bus master operates as a unique temporary initialization master, and in that one intelligent device may possess functions for initializing another device.

Figure 56:
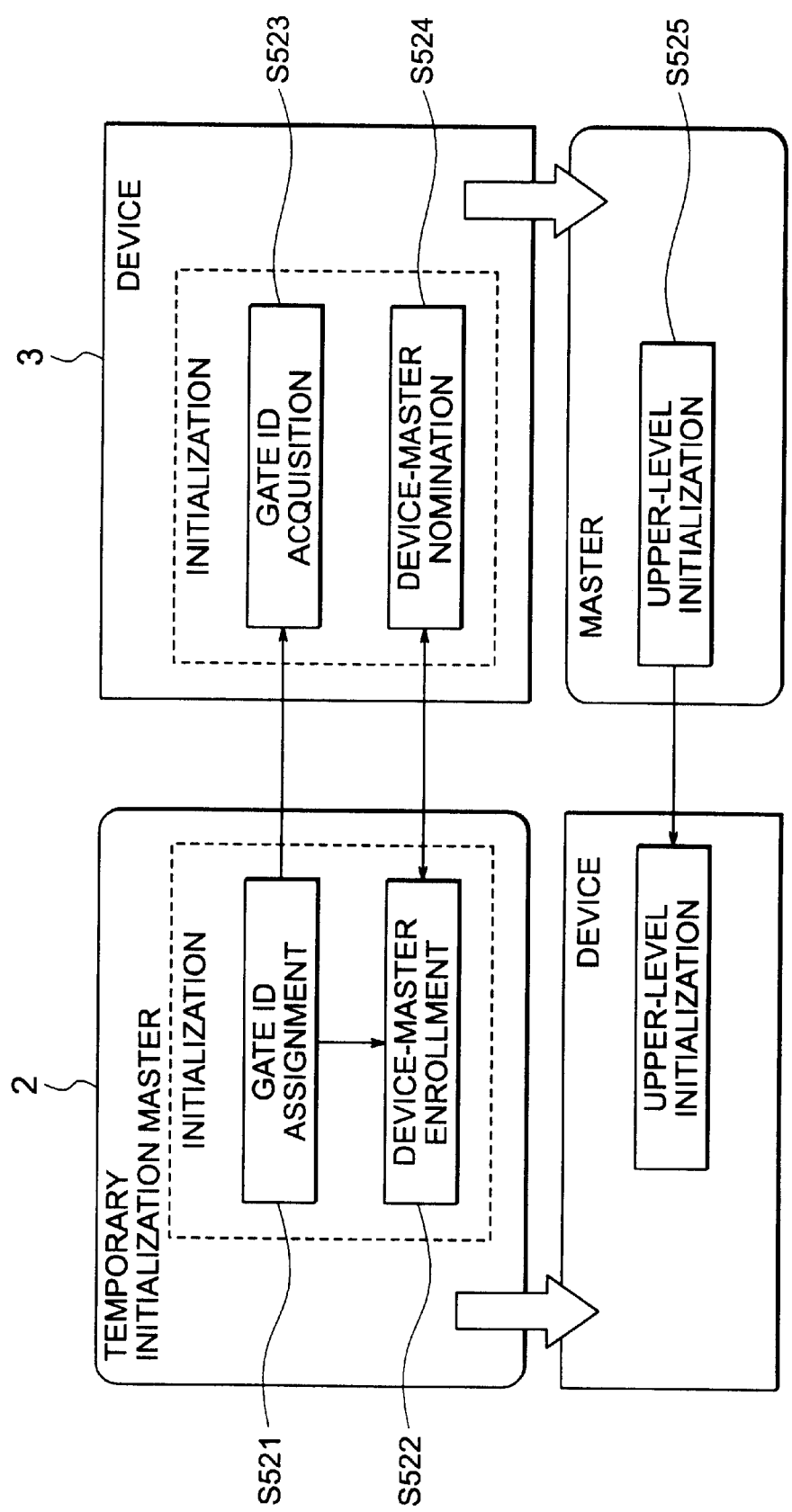
FIG. 56 is a diagram illustrating the functions of the temporary initialization master and a slave device in a tenth embodiment of the invention.

Referring to FIG. 56, the processes performed by the temporary initialization master include the assignment of gate IDs (step S521), and the enrollment of candidate device masters (step S522). The processes performed on the device side include the acquisition of gate IDs (step S523), and the process of self-nomination as a device-master candidate (step S524). When a device is appointed as device master, it proceeds to initialize other devices (step S525).

The initialization processes described in the present embodiment are gate-level and higher-level initialization processes, performed after the PCI bus master 2 has already completed initialization at the PCI device-driver level. The temporary initialization master function, which initiates these initialization processes, operates as an upper layer in the hierarchical processing structure of the PCI bus master 2.

In these initialization processes, it is first necessary for the upper layers in different devices to be able to recognize one another. That is the purpose of the gate IDs assigned by the temporary initialization master. It is also necessary for the upper-level initialization processes to be managed to avoid peer conflicts. Accordingly, some module needs to take charge of each aspect of the initialization process, but the upper-level software in the PCI bus master 2 does not necessarily have this capability. That is why the PCI bus master 2 may need to assign device-master responsibilities to another intelligent device 3. If another intelligent device 3 becomes the device master, the PCI bus master 2 functions as an ordinary slave device while the device master proceeds with upper-level initialization of the PCI bus system.

Figure 57:
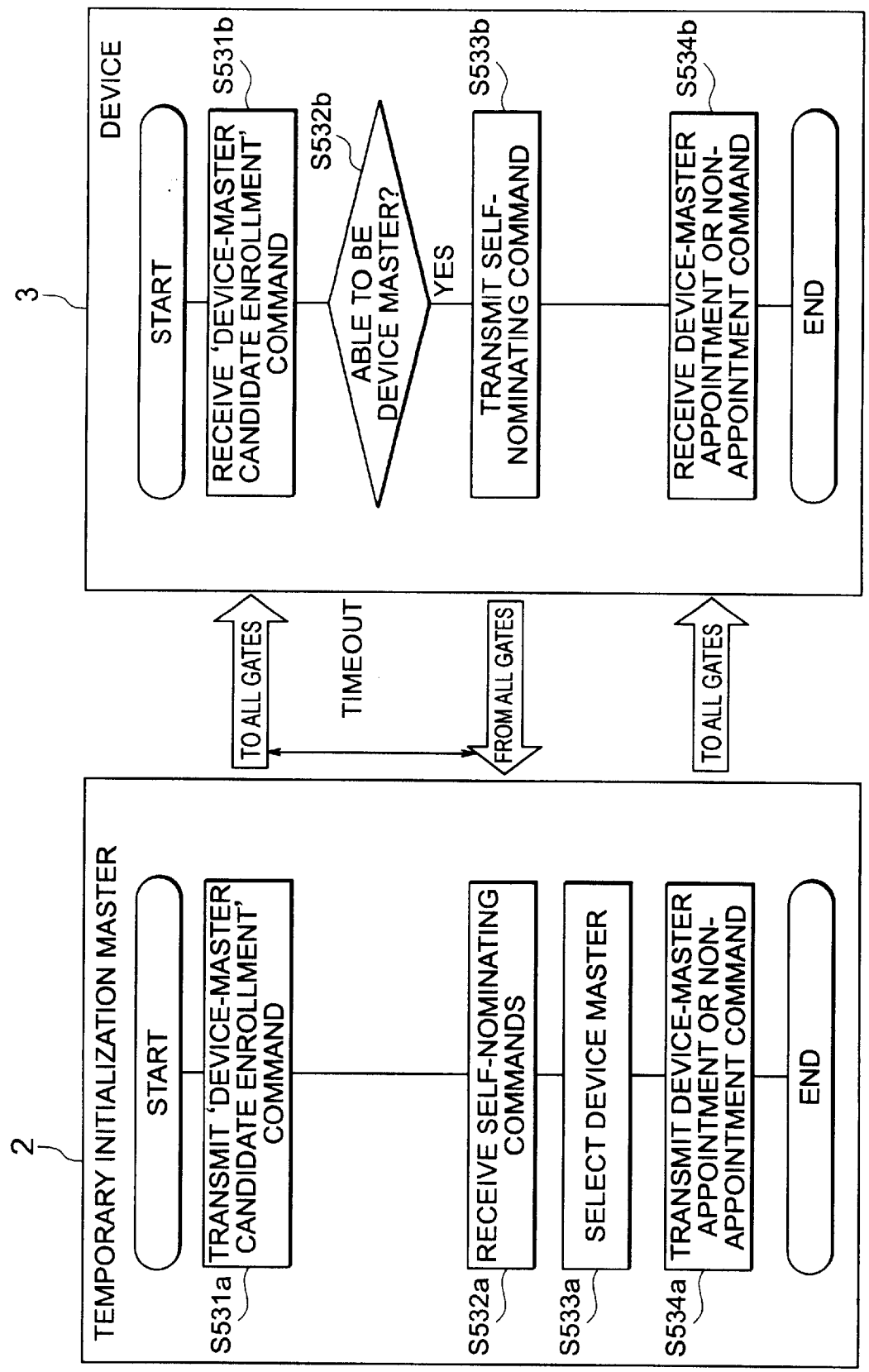
FIG. 57 is a flowchart illustrating these functions in more detail.

The procedure for selecting a device master is described below, with reference to FIG. 57.

First, the processing of the temporary initialization master, which is performed by the PCI bus master 2, will be described. The temporary initialization master transmits a device-master candidate enrollment command to each intelligent device 3 (step S531a), and receives answering commands from the intelligent devices, indicating whether they are or, are not able to become the device master (step S532a). After all intelligent devices have responded to the device-master candidate enrollment command, one of them is selected to become device master (step S533a). The temporary initialization master then sends the selected intelligent device a command appointing it as device master, thereby calling on this intelligent device to carry out subsequent device initialization, and sends other intelligent devices commands informing them that they have not been selected (step S534a).

Next, the processing performed by intelligent devices 3 other than the PCI bus master will be described. When an intelligent device 3 receives the device-master candidate enrollment command from the temporary initialization master (step S531b), it polls its own upper-level functions to see whether they include the necessary device-mastering capabilities (step S532b). If they do, the intelligent device 3 responds to the device-master candidate enrollment command with a self-nominating command (step S533b). If they do not, the intelligent device 3 sets an argument in the self-nominating command to indicate that the intelligent device does not nominate itself as a candidate device master. Alternatively, the intelligent device 3 sends back a device-master refusal command.

After replying to the device-master candidate enrollment command, or refusing to be device master, the intelligent device 3 receives a command from the temporary initialization master either selecting it as device master or informing it that it has not been selected (step S534b). If selected as the device master, the intelligent device 3 then acts as master in upper-level system initialization. If not selected, the intelligent device 3 continues to operate as an ordinary device.

Now in the present embodiment, as in the preceding embodiments, there is a gate layer above the PCI device driver layer. The gate layer is primarily the layer that selects and controls the routes between a plurality of upper layers (protocol layers) and a plurality of lower layers (device drivers).

After gate-layer initialization, accordingly, the device master uses the gate-layer communication functions to take charge of cross-system initialization. There is no intrinsic need for the gate layer itself to have device-mastering functions, but it will be assumed in the following description that the device-mastering functions reside in the gate layer.

Figure 58:
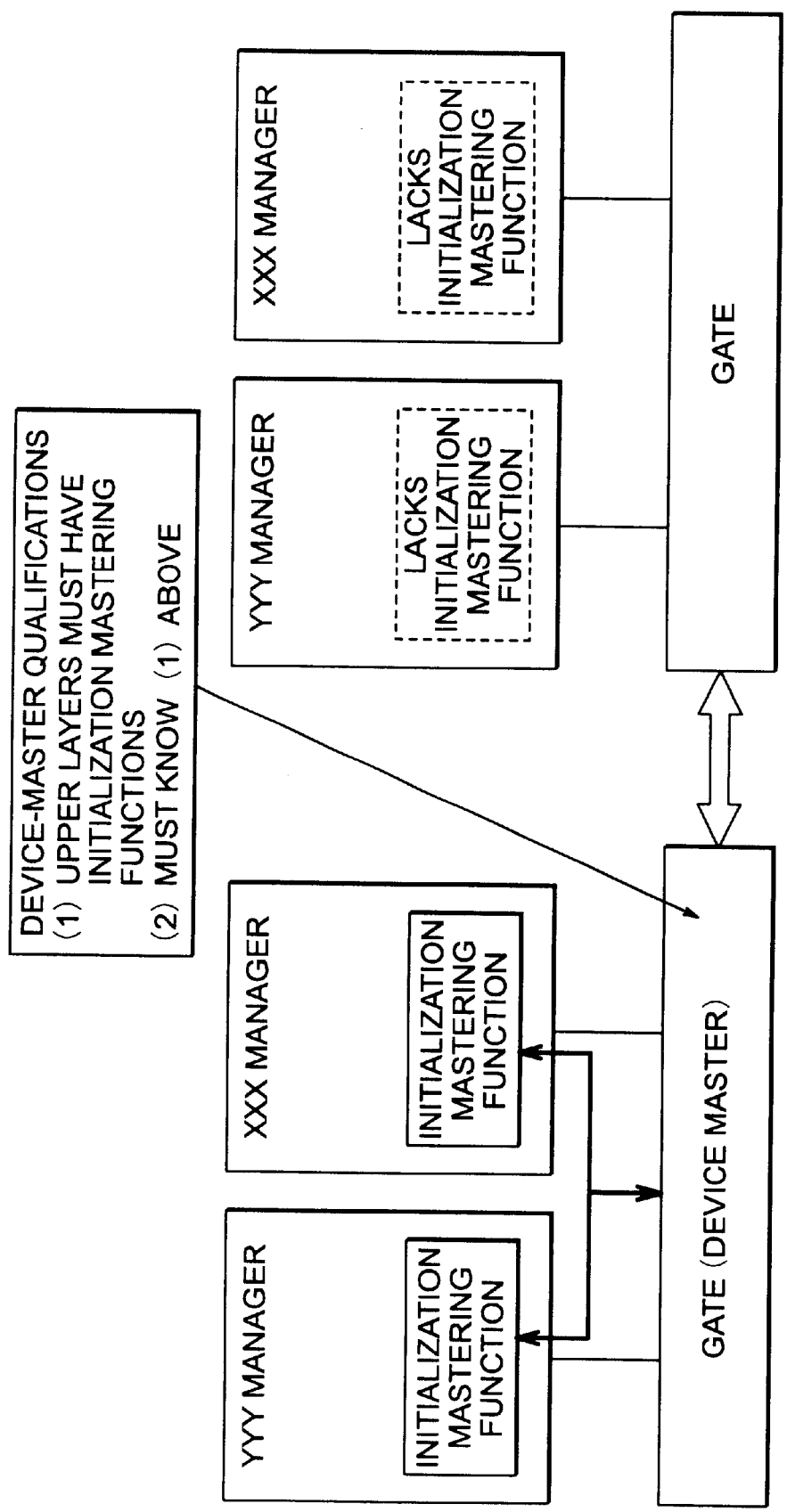
FIG. 58 is a diagram illustrating the qualifications for becoming a device master.

Under this assumption, FIG. 58 illustrates the qualifications necessary for becoming a device-master candidate. First (1), the layers above the gate layer must have initialization mastering functions. Second (2), the candidate device-master function in the gate layer must know that its upper-level layers have these initialization mastering functions.

Figure 59:
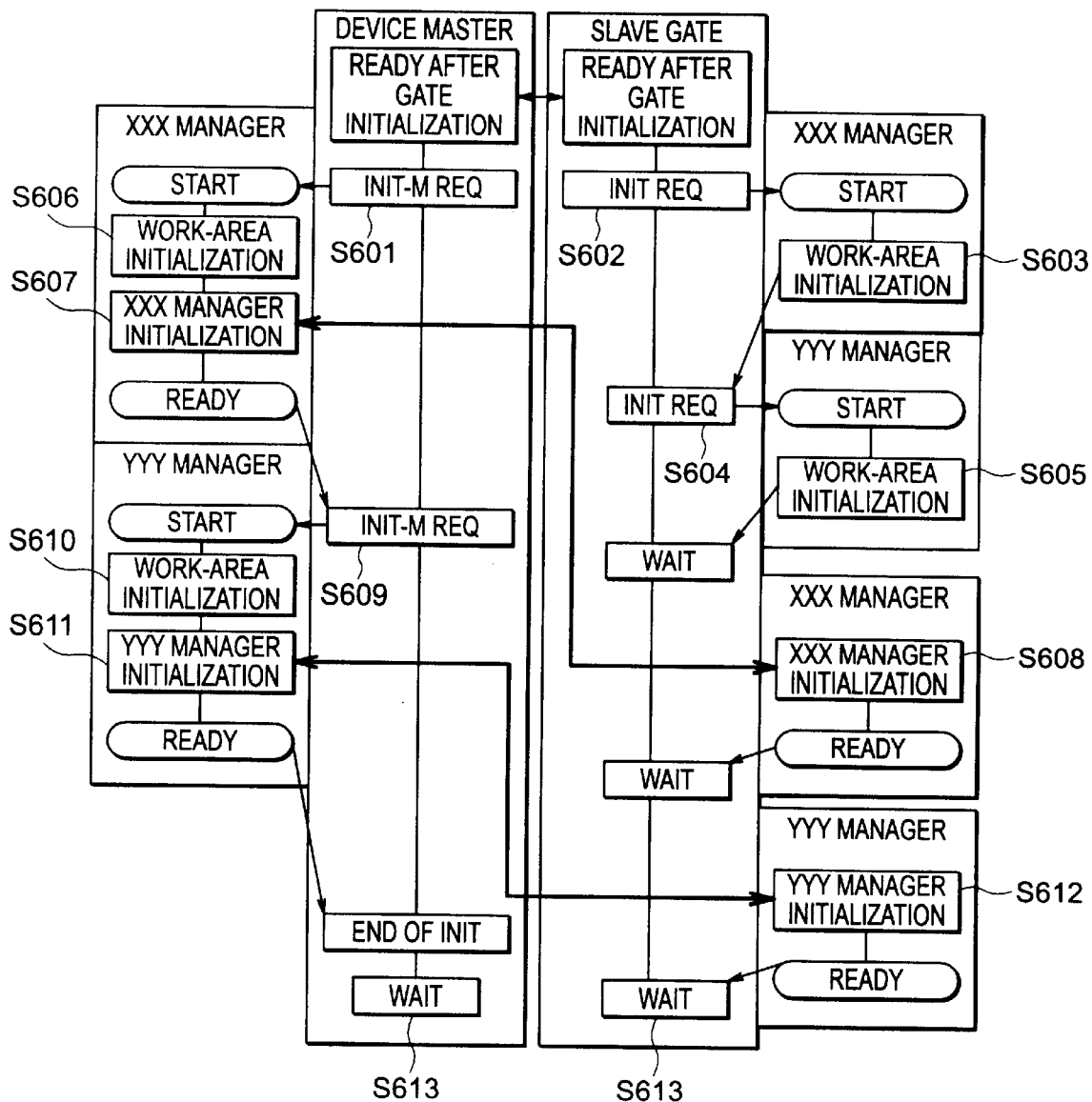
FIG. 59 is a flowchart illustrating upper-level initialization in the tenth embodiment.

FIG. 59 shows an outline of upper-level initialization as performed by a device master. More specifically, it shows an example of the initialization of an XXX manager and a YYY manager in the device-master device, and an XXX manager and a YYY manager in a slave device, the XXX manager and YYY manager being arbitrary upper layers.

Following gate initialization, the device master issues an initialization mastering (INIT-M) request (REQ) to its XXX manager (step S601), and the slave gate issues an initialization (without mastering) request (INIT REQ) to its XXX manager (step S602). The XXX manager in the slave device initializes a work memory area (step S603), then enters a waiting state, returning control to the slave gate. The slave gate next issues an initialization request to its YYY manager (step S604), which also initializes a work area (step S605) and enters a waiting state. Alternatively, depending on program specifications, the slave gate may not issue these initialization requests.

In the device-master device, the XXX manager initializes a work area (step S606), then proceeds with XXX manager initialization (step S607), including initialization of the XXX manager in the slave device (step S608). The XXX managers in both devices are now ready for operation. Next, the device master issues an initialization mastering request to its YYY manager (step S609). The YYY manager similarly initializes a work area (step S610), and proceeds with YYY initialization (step S611), including initialization of the YYY manager in the slave device (step S612). The YYY managers in both devices are then ready for operation. After the end of initialization, the gate layers are in a waiting state (step S613).

As illustrated, the device master has responsibility for giving the stimulus or 'kick' that causes the upper layers in its own software system to begin performing cross-system initialization. The upper layers in other devices receive no such stimulus, so they wait to be initialized by the device-master device. Synchronization between peer layers in different systems is thereby achieved, and initialization conflicts are avoided.

As described above, in the tenth embodiment, the device that controls upper-level system initialization is not necessarily the PCI bus master 2, but is selected by the bus master 2 from among the devices having the necessary qualifications. One advantage of this arrangement is that another system can be developed on an equal basis with the system possessing the PCI bus master, and when connected to the PCI bus, this other system can become the device master. This simplifies the development of the other system, because it can be developed as a single unit. Out-sourcing of system development is thereby facilitated. Another advantage is that if the initialization functions of the PCI bus master do not operate correctly, the other system can be used as a back-up. System reliability and maintainability are thereby improved.

A few variations of the preceding embodiments have been noted above, but those skilled in the art will recognize that further variations are possible within the scope claimed below.

What is claimed is:

1. A PCI bus control system for controlling a plurality of devices interconnected by a PCI bus, the devices including a PCI bus master, a plurality of intelligent devices able to initiate communication on the PCI bus, and a plurality of non-intelligent devices unable to initiate communication on the PCI bus, wherein:

each non-intelligent device among said non-intelligent devices is owned and managed by one intelligent device among said intelligent devices, the intelligent device relaying access requests from other of said devices to the owned non-intelligent device;

the PCI bus master designates one of said intelligent devices as a pre-owner; and the intelligent device designated as the pre-owner accesses the plurality of non-intelligent devices until final ownership of the non-intelligent devices is assigned, transmits information from the PCI bus master to the plurality of non-intelligent devices, and transmits information from the plurality of non-intelligent devices to the PCI bus master.

2. The PCI bus control system of claim 1, wherein each said non-intelligent device is owned and managed by one said intelligent device, the intelligent device relaying access requests from other of said devices to the owned non-intelligent device, each said device has a configuration register that is referenced during initialization, said configuration register having a predetermined number of leading bits that are set to a first value to identify said device as intelligent, and to a second value to identify said device as non-intelligent.

3. The PCI bus control system of claim 2, wherein said configuration register is a device identification register.

4. The PCI bus control system of claim 2, having a memory address space mapped onto respective functions of said devices, wherein said first value identifies said device as intelligent by indicating that said device has at least one PCI device driver and has a communication area, disposed at a predetermined location in a part of the memory address space mapped onto a function of said device, for use in initialization of said PCI device driver.

5. The PCI bus control system of claim 4, wherein said part of the memory address space begins at said communication area.

6. The PCI bus control system of claim 1, having a memory address space mapped onto respective functions of said devices, wherein each said intelligent device has at least one PCI device driver and has a communication area, disposed at a predetermined location in a part of the memory address space mapped onto a function of said intelligent device, for use in initialization of said PCI device driver.

7. The PCI bus control system of claim 6, wherein said part of the memory address space begins at said communication area.

8. The PCI bus control system of claim 1, wherein a first device among said devices transmitting a series of data blocks to a second device among said devices provides a PCI header for each data block, the PCI header of each said data block including a data size field indicating a size of said data block, a data area pointer giving an address of said data block and a next pointer giving an address of the PCI header of a next data block in said series.

9. The PCI bus control system of claim 2, wherein a first device among said devices transmitting a series of data blocks to a second device among said devices provides a PCI header for each data block, the PCI header of each said data block including a data area pointer giving an address of said data block and a next pointer giving an address of the PCI header of a next data block in said series, the next pointer having a least significant bit, said least significant bit indicating whether said second device must copy said data block and said next data block to mutually contiguous memory areas.

10. The PCI bus control system of claim 2, wherein:

said PCI bus master has an intelligent function, and each said intelligent device also has at least one intelligent function;

the intelligent function of said PCI bus master, and each said intelligent function of each said intelligent device, has a device control table including device profiles of respective intelligent functions of all intelligent devices among said devices;

the intelligent function of said PCI bus master, and each said intelligent function of each said intelligent device, has a PCI interrupt request register for receiving interrupt requests;

each device profile in said device control table includes a mailbox, a mailbox pointer, and a PCI interrupt request register pointer;

for any two intelligent functions X and Y, the PCI interrupt request register pointer in the device profile of function Y in the device control table of function X indicates an address of the PCI interrupt request register of function Y; and the mailbox pointer in the device profile of function Y in the device control table of function X indicates an address of the mailbox in the device profile of function X in the device control table of function Y.

11. The PCI bus control system of claim 10, wherein said PCI bus master creates the device control table of each said intelligent function, and each said intelligent function in each said intelligent device copies the device control table created for it by said PCI bus master.

12. The PCI bus control system of claim 11, wherein said PCI bus master comprises:

a copy address inquiry unit for obtaining, from each said intelligent function in each said intelligent device, an address of a memory area to which the device control table of said intelligent function will be copied; and a mailbox pointer calculation unit for calculating the address indicated by the mailbox pointer of each said device profile in each said device control table according to the address obtained by the copy address inquiry unit.

13. The PCI bus control system of claim 10, wherein:

each said PCI interrupt request register comprises a plurality of bits, each bit uniquely corresponding to one said intelligent function; and said function X generates an interrupt in the processing of said function Y by setting the bit corresponding to function X in the PCI interrupt request register of function Y.

14. The PCI bus control system of claim 2, wherein
said PCI bus master, and each said intelligent device, has a hierarchical processing structure with an intermediate layer through which data are passed from an upper layer to a lower layer; and
in passing data from the upper layer to the lower layer, the intermediate layer attaches a header to the data, adds padding to the header to align the data on a predetermined type of boundary, and places header size information in the header indicating the combined size of the header and the padding.

15. The PCI bus control system of claim 14, wherein said lower layer is a device-driver layer.

16. The PCI bus control system of claim 2, wherein:
said PCI bus master, and each said intelligent device, has a hierarchical processing structure;
said PCI bus master performs comparatively low-level initialization of said hierarchical processing structure;
said PCI bus master then functions as a temporary initialization master for comparatively high-level initialization of said hierarchical processing structure, by issuing a request to each said intelligent device to function as a device master;
each said intelligent device responds to said request by indicating whether it is able to become the device master;
the temporary initialization master selects one said intelligent device to be the device master; and
the intelligent device selected as the device master coordinates the comparatively high-level initialization of the PCI bus master and each said intelligent device.

17. A method of controlling a plurality of devices interconnected by a PCI bus, the devices including a PCI bus master, a plurality of intelligent devices able to initiate communication on the PCI bus, and a plurality of non-intelligent devices unable to initiate communication on the PCI bus, comprising the steps of:
assigning one intelligent device among said intelligent devices to each non-intelligent device among said intelligent devices to own and manage the non-intelligent device by relaying access requests from other of said devices to the non-intelligent device;
designating one of said intelligent devices as a pre-owner;
accessing the plurality of non-intelligent devices from the intelligent device designated as the pre-owner, until final ownership of the non-intelligent devices is assigned;
transmitting information from the PCI bus master through the intelligent devices; and
transmitting information from the plurality of non-intelligent devices through the intelligent device designated as the pre-owner to the PCI bus master.

18. The method of claim 17, wherein each said device has a configuration register that is referenced during initialization of the PCI bus system, further comprising the step of:
deciding whether said device is intelligent by reading a predetermined number of leading bits of said configuration register.

19. The method of claim 18, wherein said configuration register is a device identification register.

20. The method of claim 17, wherein said PCI bus system has a memory address space mapped onto respective functions of said devices, further comprising the step of:
communicating with said at least one intelligent device through a communication area disposed at a predetermined location in a part of the memory address space mapped onto a function of said intelligent device, during initialization of said PCI bus system.

21. The method of claim 20, wherein said part of the memory address space begins at said communication area.

22. A method of controlling a plurality of devices interconnected by a PCI bus, the devices including a PCI bus master, at least one intelligent device able to initiate communication on the PCI bus, and at least one non-intelligent device unable to initiate communication on the PCI bus, comprising the step of:
assigning one said intelligent device to each said non-intelligent device to own and manage the non-intelligent device by relaying access requests from other of said devices to the non-intelligent device,
wherein a first device among said devices transmits a series of data blocks to a second device among said devices by providing a PCI header for each data block, the PCI header of each said data block including a data size field indicating a size of said data block, a data area pointer giving an address of said data block and a next pointer giving an address of the PCI header of a next data block in said series, and the second device receives said data blocks by copying said data blocks, further comprising the step of:
reading the next pointer of each said data block after said second device copies said data block, to determine whether said data block is a last data block in said series;
said step of reading being performed by said second device.

23. A method of controlling a plurality of devices interconnected by a PCI bus, the devices including a PCI bus master, at least one intelligent device able to initiate communication on the PCI bus, and at least one non-intelligent device unable to initiate communication on the PCI bus, comprising the step of:
assigning one said intelligent device to each said non-intelligent device to own and manage the non-intelligent device by relaying access requests from other of said devices to the non-intelligent device,
wherein a first device among said devices transmits a series of data blocks to a second device among said devices by providing a PCI header for each data block, the PCI header of each said data block including a data size field indicating a size of said data block, a data area pointer giving an address of said data block and a next pointer giving an address of the PCI header of a next data block in said series, and the second device receives said data blocks by copying said data blocks, further comprising the steps of:
reading the next pointer of every data block in said series before said second device copies any of the data blocks in said series;
said step of reading being performed by said second device.

24. A method of controlling a plurality of devices interconnected by a PCI bus, the devices including a PCI bus master, at least one intelligent device able to initiate communication on the PCI bus, and at least one non-intelligent device unable to initiate communication on the PCI bus, comprising the step of:
assigning one said intelligent device to each said non-intelligent device to own and manage the non-intelligent device by relaying access requests from other of said devices to the non-intelligent device, wherein a first device among said devices transmits a series of data blocks to a second device among said devices by providing a PCI header for each data block, the PCI header of each said data block including a data area pointer giving an address of said data block and a next pointer giving an address of the PCI header of a next data block in said series, further comprising the step of:

setting a least significant bit of said next pointer to a predetermined value to indicate that said second device must copy said data block and said next data block to mutually contiguous memory areas.

25. A method of controlling a plurality of devices interconnected by a PCI bus, the devices including a PCI bus master, at least one intelligent device able to initiate communication on the PCI bus, and at least one non-intelligent device unable to initiate communication on the PCI bus, comprising the step of:

assigning one said intelligent device to each said non-intelligent device to own and manage the non-intelligent device by relaying access requests from other of said devices to the non-intelligent device, wherein said PCI bus master has an intelligent function, and each said intelligent device also has at least one intelligent function, further comprising the steps of:

creating, for the intelligent function of said PCI bus master and each said intelligent function of each said intelligent device, a device control table including device profiles of respective intelligent functions of all intelligent devices among said devices, each device profile having a mailbox and a mailbox pointer such that for any two intelligent functions X and Y, the mailbox pointer in the device profile of function Y in the device control table of function X indicates an address of the mailbox in the device profile of function X in the device control table of function Y; and sending commands from said function X to said function Y by placing said commands in the mailbox in the device profile of said function X in the device control table of said function Y.

26. The method of claim 25, wherein said step of creating is performed by said PCI bus master, further comprising the step of:

copying each device control table from said PCI bus master to the intelligent function for which the device control table is created.

27. The method of claim 26, wherein said step of creating further comprises the steps of:

obtaining, from each said intelligent function in each said intelligent device, an address of a memory area to which the device control table of said intelligent function will be copied; and calculating the address indicated by the mailbox pointer of each said device profile in each said device control table according to the address obtained in said step of obtaining.

28. The method of claim 25, wherein:

the intelligent function of said PCI bus master, and each said intelligent function of each said intelligent device, has a PCI interrupt request register for receiving interrupt requests;

the device profile of said function Y in the device control table of said function X includes a PCI interrupt request register pointer indicating an address of the PCI interrupt request register of function Y; and said step of sending commands further comprises the step of setting a non-zero value in the PCI interrupt request register of said function Y.

29. The method of claim 28, wherein:

each said PCI interrupt request register comprises a plurality of bits, each bit uniquely corresponding to one said intelligent function; and said step of setting a non-zero value comprises setting the bit corresponding to function X in the PCI interrupt request register of function Y.

30. A method of controlling a plurality of devices interconnected by a PCI bus, the devices including a PCI bus master, at least one intelligent device able to initiate communication on the PCI bus, and at least one non-intelligent device unable to initiate communication on the PCI bus, comprising the step of:

assigning one said intelligent device to each said non-intelligent device to own and manage the non-intelligent device by relaying access requests from other of said devices to the non-intelligent device, wherein said PCI bus master, and each said intelligent device, has a hierarchical processing structure with an intermediate layer through which data are passed from an upper layer to a lower layer, and in passing data from the upper layer to the lower layer, the intermediate layer attaches a header to the data, further comprising the steps of:

adding padding to said header to align said data on a predetermined type of boundary; and placing header size information in said header indicating the combined size of the header and the padding.

31. The method of claim 30, wherein said lower layer is a device-driver layer.

32. A method of controlling a plurality of devices interconnected by a PCI bus, the devices including a PCI bus master, at least one intelligent device able to initiate communication on the PCI bus, and at least one non-intelligent device unable to initiate communication on the PCI bus, comprising the step of:

assigning one said intelligent device to each said non-intelligent device to own and manage the non-intelligent device by relaying access requests from other of said devices to the non-intelligent device, wherein said PCI bus master, and each said intelligent device, has a hierarchical processing structure, and said PCI bus master performs comparatively low-level initialization of said hierarchical processing structure, further comprising the steps of:

issuing a request from said PCI bus master to each said intelligent device to function as a device master during comparatively high-level initialization of said hierarchical processing structure;

receiving responses to said request, indicating whether each said intelligent device is able to become the device master;

selecting one said intelligent device to be the device master; and coordinating the comparatively high-level initialization of the PCI bus master and each said intelligent device under control of the selected device master.

\* \* \* \* \*